US009912816B2

(12) United States Patent
Ristock et al.

(10) Patent No.: US 9,912,816 B2
(45) Date of Patent: Mar. 6, 2018

(54) WORKLOAD DISTRIBUTION WITH RESOURCE AWARENESS

(71) Applicant: GENESYS TELECOMMUNICATIONS LABORATORIES, INC., Daly City, CA (US)

(72) Inventors: Herbert Willi Artur Ristock, Walnut Creek, CA (US); Bob Pigott, Prairie Village, KS (US); Adam Rosen, San Francisco, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 111 days.

(21) Appl. No.: 13/689,750

(22) Filed: Nov. 29, 2012

(65) Prior Publication Data

US 2014/0146961 A1 May 29, 2014

(51) Int. Cl.

| | |
|---|---|
| ***H04M 3/00*** | (2006.01) |
| ***H04M 5/00*** | (2006.01) |
| ***H04M 3/523*** | (2006.01) |
| ***G06Q 10/06*** | (2012.01) |

(52) U.S. Cl.

CPC .. *H04M 3/5234* (2013.01); *G06Q 10/063112* (2013.01); *H04M 3/523* (2013.01); *H04M 2203/402* (2013.01)

(58) Field of Classification Search

CPC .. H04M 3/5233; H04M 3/523; H04M 3/5232; H04M 2203/402

USPC ............ 379/265.02, 265.11, 265.12, 265.13

See application file for complete search history.

(56) References Cited

U.S. PATENT DOCUMENTS

| | | | |
|---|---|---|---|
| 4,852,180 | A | 7/1989 | Levinson |
| 5,625,748 | A | 4/1997 | McDonough et al. |
| 6,212,178 | B1 | 4/2001 | Beck et al. |
| 6,308,154 | B1 | 10/2001 | Williams et al. |

(Continued)

FOREIGN PATENT DOCUMENTS

| | | | |
|---|---|---|---|
| CN | 102257800 | A | 11/2011 |
| CN | 102300012 | A | 12/2011 |

(Continued)

OTHER PUBLICATIONS

International Search Report for PCT/US2013/072484, dated Feb. 28, 2014, 3 pages.

(Continued)

*Primary Examiner* — Nafiz E Hoque

(74) *Attorney, Agent, or Firm* — Lewis Roca Rothgerber Christie LLP

(57) ABSTRACT

A method for workload distribution for a contact center includes identifying a work item for distribution based on an assigned distribution criteria; identifying a target for routing the work item; determining availability of the target; in response to determining that the target is available, transmitting a routing request for the work item to a routing server, and in response to the request, the routing server is configured to independently determine availability of the work item for routing the work item to the target; and in response to determining that the target is not available, refraining from transmitting the routing request for the work item to the routing server.

20 Claims, 65 Drawing Sheets

(56) References Cited

U.S. PATENT DOCUMENTS

| | | | | |
|---|---|---|---|---|
| 6,363,346 | B1 | 3/2002 | Walters | |
| 6,404,857 | B1 | 6/2002 | Blair et al. | |
| 6,542,602 | B1 | 4/2003 | Elazar | |
| 6,594,629 | B1 | 7/2003 | Basu et al. | |
| 6,678,658 | B1 | 1/2004 | Hogden et al. | |
| 6,687,671 | B2 | 2/2004 | Gudorf et al. | |
| 6,721,416 | B1 | 4/2004 | Farrell | |
| 6,724,887 | B1 | 4/2004 | Eilbacher et al. | |
| 6,895,083 | B1 | 5/2005 | Bers et al. | |
| 6,910,072 | B2 | 6/2005 | Macleod Beck et al. | |
| 6,959,080 | B2 | 10/2005 | Dezonno et al. | |
| 7,065,493 | B1 | 6/2006 | Homsi | |
| 7,092,888 | B1 | 8/2006 | McCarthy et al. | |
| 7,487,094 | B1 | 2/2009 | Konig et al. | |
| 8,275,110 | B2 | 9/2012 | Vendrow | |
| 8,463,606 | B2 | 6/2013 | Scott et al. | |
| 8,600,756 | B2 | 12/2013 | Pickering et al. | |
| 8,612,272 | B1 | 12/2013 | Aykin | |
| 8,654,963 | B2 | 2/2014 | Anisimov et al. | |
| 8,767,947 | B1 | 7/2014 | Ristock et al. | |
| 9,262,213 | B1 | 2/2016 | Gralhoz et al. | |
| 2002/0029161 | A1 | 3/2002 | Brodersen et al. | |
| 2002/0112055 | A1 | 8/2002 | Capers et al. | |
| 2003/0088403 | A1 | 5/2003 | Chan et al. | |
| 2003/0145071 | A1 | 7/2003 | Straut et al. | |
| 2004/0024598 | A1 | 2/2004 | Srivastava et al. | |
| 2004/0062364 | A1 | 4/2004 | Dezonno et al. | |
| 2004/0083195 | A1 | 4/2004 | McCord et al. | |
| 2005/0240594 | A1 | 10/2005 | McCormack et al. | |
| 2006/0067506 | A1* | 3/2006 | Flockhart | H04M 3/5237 379/265.09 |
| 2006/0146998 | A1* | 7/2006 | Mello | H04M 3/5183 379/88.18 |
| 2006/0209797 | A1* | 9/2006 | Anisimov | H04L 29/06 370/352 |
| 2007/0038499 | A1 | 2/2007 | Margulies et al. | |
| 2007/0198322 | A1 | 8/2007 | Bourne et al. | |
| 2007/0198330 | A1 | 8/2007 | Korenblit et al. | |
| 2008/0120164 | A1* | 5/2008 | Hassler | 705/9 |
| 2009/0018890 | A1 | 1/2009 | Werth et al. | |
| 2009/0043634 | A1 | 2/2009 | Tisdale | |
| 2009/0048868 | A1 | 2/2009 | Portnoy et al. | |
| 2009/0190744 | A1* | 7/2009 | Xie | H04M 3/5232 379/265.11 |
| 2009/0204470 | A1 | 8/2009 | Weyl et al. | |
| 2009/0225971 | A1 | 9/2009 | Miller et al. | |
| 2009/0326947 | A1 | 12/2009 | Arnold et al. | |
| 2010/0107165 | A1 | 4/2010 | Koskimies et al. | |
| 2010/0158239 | A1 | 6/2010 | Anisimov et al. | |
| 2010/0165977 | A1 | 7/2010 | McCord | |
| 2010/0172485 | A1 | 7/2010 | Bourke et al. | |
| 2010/0246784 | A1 | 9/2010 | Frazier et al. | |
| 2010/0296417 | A1 | 11/2010 | Steiner | |
| 2011/0010173 | A1 | 1/2011 | Scott et al. | |
| 2011/0047002 | A1 | 2/2011 | Flockhart et al. | |
| 2011/0125498 | A1 | 5/2011 | Pickering et al. | |
| 2011/0153378 | A1 | 6/2011 | Costello et al. | |
| 2011/0178803 | A1 | 7/2011 | Petrushin | |
| 2011/0191106 | A1 | 8/2011 | Khor et al. | |
| 2011/0255682 | A1 | 10/2011 | Flockhart et al. | |
| 2011/0255683 | A1 | 10/2011 | Flockhart et al. | |
| 2012/0227044 | A1 | 9/2012 | Arumugham et al. | |
| 2013/0083916 | A1 | 4/2013 | Flockhart et al. | |
| 2013/0132583 | A1 | 5/2013 | McCord | |
| 2013/0179208 | A1 | 7/2013 | Chung et al. | |
| 2013/0246053 | A1 | 9/2013 | Scott et al. | |
| 2013/0254139 | A1 | 9/2013 | Lei | |
| 2014/0079210 | A1* | 3/2014 | Kohler et al. | 379/265.12 |
| 2014/0119535 | A1 | 5/2014 | Anisimov et al. | |
| 2014/0278640 | A1 | 9/2014 | Galloway et al. | |
| 2014/0337072 | A1 | 11/2014 | Tamblyn et al. | |
| 2015/0089466 | A1 | 3/2015 | Rodgers et al. | |

FOREIGN PATENT DOCUMENTS

| | | | |
|---|---|---|---|
| EP | 1402520 | B1 | 3/2002 |
| EP | 1484903 | A2 | 12/2004 |
| EP | 1402520 | B1 | 10/2006 |
| JP | 2005504452 | A | 2/2005 |
| JP | 2005012781 | A | 6/2012 |
| JP | 2012513165 | A | 6/2012 |
| JP | 5616357 | B2 | 10/2014 |
| KR | 1020110097853 | A | 8/2011 |
| WO | 2002065741 | A2 | 8/2002 |
| WO | 2010080323 | A2 | 7/2010 |
| WO | 2014085760 | A1 | 6/2014 |
| WO | WO 2014/085760 | A1 | 6/2014 |

OTHER PUBLICATIONS

Chinese Office Action dated May 13, 2013 for Chinese Application 200980151195.7 with English Translation, 15 pages.

Examination Office Letter dated Jan. 24, 2013 for Japanese Application 2011-542265, 4 pages.

International Search Report dated Feb. 28, 2014 for PCT/US2013/072484, 4 pages.

International Search Report dated Sep. 12, 2014 for PCT/US2014/037587, 13 pages.

Johnson, Sue, Describe what is meant by the term "keyword spotting" and describe the techniques used to implement such a recognition system, Mphil Computer Speech and Language Processing Speech Recognition Essay, Apr. 24, 1997, 26 pages.

Korean Preliminary Rejection dated Jul. 17, 2012 for Korean Application No. 10-2011-7014074, with English Translation, 10 pages.

Koutras A., et al., "Blind Speech Separation of Moving Speakers in Real Reverberant Environments," WCL, Electrical & Computer Engineering Department, University of Patras, 26100 Patras, Hellas, 4 pages.

Written Opinion of the International Searching Authority for International Application PCT/US09/67441 dated Jun. 28, 2010, 5 pages.

European Patent Office Action for Application No. 13859246.4, dated Sep. 16, 2016, 4 pages.

Chinese Office Action with English Translation for Application No. 201380071818.6, dated Nov. 16, 2017, 22 pages.

* cited by examiner

300

500

1003

WORKLOAD DISTRIBUTION WITH RESOURCE AWARENESS

FIELD OF THE INVENTION

The present invention relates to a system and method for workload distribution for a contact center, and more particularly to a system and method for workload distribution for a contact center that uses resource awareness to distribute work items.

BACKGROUND

Many enterprises use customer contact centers staffed by customer service agents (also referred to as customer service representatives or customer service associates) to interact with customers and provide customer support. A contact center may serve as one gateway for customer service interactions and the enterprise may also utilize resources outside of the contact center, such as a team of back-office employees, to process the interactions. In some cases, the back-office team may be much larger than the contact center team, and may include skilled workers paid at a higher salary. These skilled workers (referred to as knowledge workers) generally have the training and expertise to handle customer interactions, such as fulfilling customer service requests.

However, service request processing and workload distribution techniques for contact centers often result in several inefficiencies. For example, work may be arbitrarily distributed to employees based on rudimentary factors such as whether or not an employee is currently available. In addition, human latencies may exist when employees of the enterprise (e.g., supervisors) set the pace of work and manage the priorities. For example, manual allocation of work by supervisors can result in inefficiencies due to time spent manually selecting tasks and distributing them across many employees' workbins. Managers and supervisors may also experience difficulty gaining insight into resource availability and work distribution, due to the inaccuracies and subjectivity associated with employees' "self-reported" data. Continuous improvement in workload distribution is hindered by this limited insight. Further, customers may experience frustration with long wait times and inefficient customer service. An enterprise's inability to meet customer expectations and commitments (e.g., due dates and response times) may result in the customer ending the business relationship.

In addition, enterprises may experience a lack of business agility by being unable to respond to market opportunities that arise during customer interactions. For instance, enterprises may want to direct offers regarding particular products or services (either within or across departments or brands) to certain customers, but standard interaction processing systems lack the ability to leverage customer interactions to take advantage of these market opportunities.

Accordingly, there is a need to reduce human latency in workflows, optimize utilization of employees in terms of occupancy rate and skills/proficiency, increase visibility into resources and availability, improve the quality of customer outcomes, and improve business agility.

In addition, rules for defining business logic of the enterprise may need to be changed depending on the enterprise's business needs. However, there is no efficient way to test such rules after making changes to ensure proper operation of the rules.

SUMMARY OF THE INVENTION

According to embodiments of the present invention, a method for workload distribution for a contact center includes identifying a work item for distribution based on an assigned distribution criteria; identifying a target for routing the work item; determining availability of the target; in response to determining that the target is available, transmitting a routing request for the work item to a routing server, and in response to the request, the routing server is configured to independently determine availability of the work item for routing the work item to the target; and in response to determining that the target is not available, refraining from transmitting the routing request for the work item to the routing server.

The distribution criteria may include at least one of a priority value, a business value, a creation date, or a due date for the work item.

The identifying the target for routing the work item may include receiving a request for a particular target.

The identifying the target for routing the work item may include evaluating information about occupancy, skills, or location of targets.

The method may further include assessing the determined availability to identify the target for routing of the work item.

The determining the availability of the target may include identifying capacity of the target to handle the work item.

The work item may be in a queued state in a first server, and in response to the request, the work item may be removed from the queued state in the first server and may be placed in a queued state in the routing server.

The first server and the routing server may be coupled over a local area network.

In response to determining that the target is not available, modifying the distribution criteria for the work item.

The modifying the distribution criteria may include modifying priority of the work item.

The work item may be a non-telephony interaction with an end user.

According to another embodiment of the present invention, a system for workload distribution for a contact center includes a processor and a memory. In one embodiment, the memory stores instructions that, when executed by the processor, cause the processor to: identify a work item for distribution based on an assigned distribution criteria; identify a target for routing the work item; determine availability of the target; in response to determining that the target is available, transmit a routing request for the work item to a routing server, and in response to the request, the routing server is configured to independently determine availability of the work item for routing the work item to the target; and in response to determining that the target is not available, refrain from transmitting the routing request for the work item to the routing server.

The distribution criteria may include at least one of a priority value, a business value, a creation date, or a due date for the work item.

The identifying the target for routing the work item may include receiving a request for a particular target.

The identifying the target for routing the work item may include evaluating information about occupancy, skills, or location of targets.

The processor may further assess the determined availability to identify the target for routing of the work item.

The determining the availability of the target may include identifying capacity of the target to handle the work item.

The work item may be in a queued state in a first server, and in response to the request, the work item may be removed from the queued state in the first server and may be placed in a queued state in the routing server.

The first server and the routing server may be coupled over a local area network.

In response to determining that the target is not available, modifying the distribution criteria for the work item.

The modifying the distribution criteria may include modifying priority of the work item.

The work item may be a non-telephony interaction with an end user.

Embodiments of the present invention are also directed to verifying a rule for a contact center that includes configuring one or more parameters of a rule; receiving a command to test the rule; identifying a data set for testing the rule; executing the rule based on the data set and receiving a test result; comparing the test result with an expected result; and in response to the test result satisfying the expected result, deploying the rule to a rules engine.

According to one embodiment, the one or more parameters comprise at least one of a business attribute, an employee group, an employee list, and a skill group.

According to one embodiment, each of the one or more parameters has a parameter type and the parameter type is selected from the group consisting of an integer, a range of integers, a numeric value, a string, a date, a time, and an enumeration.

According to one embodiment, the enumeration is a static value selected from a pre-defined list.

According to one embodiment, the enumeration is a dynamic value obtained from an external source.

According to one embodiment, the configuring one or more parameters of the rule further comprises configuring functions, and the configured parameters and functions are used to define conditions and actions for the rule.

According to one embodiment, the data set comprises given values and expectation values.

According to one embodiment, the identifying the data set for testing the rule further comprises identifying at least one of a phase, a business hierarchy level, simulated date, a simulated time, and a time zone.

According to one embodiment, the executing the rule based on the data set and receiving the test result comprises mapping the one or more parameters to one or more variables of a fact model.

DETAILED DESCRIPTION

Embodiments of the present invention are directed to a system and method for distributing deferred media interactions (also referred to as non-real time interactions), tasks, and/or other work items to contact center resources. The terms interaction, task, and work item are used interchangeably herein. The distribution of work items is generally termed intelligent workload distribution (iWD). The intelligent workload distribution according to exemplary embodiments is based on resource awareness that provides efficiencies to, for example, a routing server.

Embodiments of the present invention are also directed to a system and method for generating and invoking business rules where such rules may be tested prior to deployment. The business rules may be invoked, for example, for the workload distribution to ensure that tasks are routed to resources that are best suited to handle them. According to one embodiment, outcomes of such testing may be compared to desired objectives (e.g. business objectives) to determine whether any of the rule attributes should be changed prior to deployment.

Throughout this disclosure, the terms "employee" and "agent" are used to refer to a contact center agent (who may be working in a contact center building or from his home location), front-office employee, back-office employee, knowledge worker, or an outsourcing partner of the enterprise.

Figure 1:
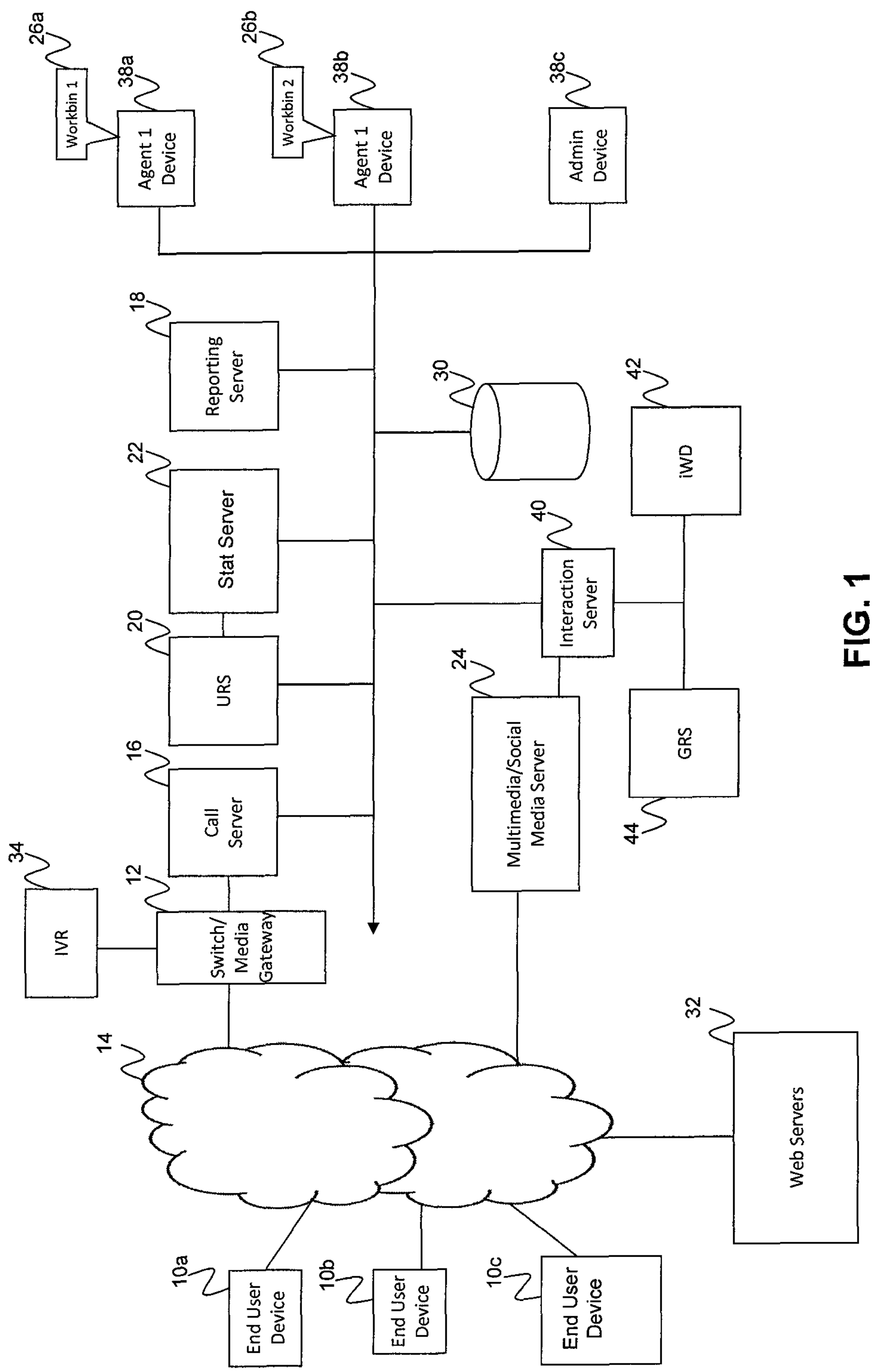
FIG. 1 is a schematic block diagram of a system for supporting a contact center according to one exemplary embodiment of the present invention.

FIG. 1 is a schematic block diagram of a system for supporting a contact center according to one exemplary embodiment of the invention. In one embodiment, the system is configured to distribute information and tasks (also referred to as work) relating to interactions with end users (also referred to as customers), to employees of an enterprise. The contact center may be an in-house facility of the enterprise and may serve the enterprise by performing the functions of sales and service relative to the products and services available through the enterprise. In another aspect, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as end users) desiring to receive services from the contact center may initiate inbound calls to the contact center via their end user devices 10*a*-10*c* (collectively referenced as 10). Each of the end user devices 10 may be a communication device conventional in the art, such as, for example, a telephone, wireless phone, smart phone, personal computer, electronic tablet, and/or the like.

Inbound calls from, and outbound calls to, the end user devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 16 which may, for example, serve as an adapter or interface between the switch and the remainder of the routing, monitoring, and other call-handling systems of the contact center.

According to one exemplary embodiment of the invention, the switch 12 is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the call is to be routed to an agent, the call is forwarded to the call server 16 which interacts with a routing server (referred to as a Universal Routing Server) 20 for finding the most appropriate agent or employee for processing the call. The call server 16 may be configured to process PSTN calls, VoIP calls, and the like. For example, the call server 16 may include a session initiation protocol (SIP) server for processing SIP calls.

In one example, while an agent is being located and until such agent becomes available, the call server may place the call in a call queue. The call queue may be implemented via any data structure conventional in the art, such as, for example, a linked list, array, and/or the like. The data structure may be maintained, for example, in buffer memory provided by the call server 16.

Once an appropriate agent is located and available to handle a call, the call is removed from the call queue and transferred to the corresponding agent device 38*a*-38*b*. Collected information about the caller and/or the caller's historical information may also be provided to the agent device for aiding the agent in better servicing the call. The information may also be provided to an administrator device 38*c* for monitoring and training purposes. In this regard, each agent/administrator device 38*a-c* may include a telephone adapted for regular telephone calls, VoIP calls, and the like. The agent and administrator devices 38*a-c* may also include a computer for communicating with one or more servers of the contact center and performing data processing associated with contact center operations.

The selection of an appropriate agent for routing an inbound interaction (e.g. a telephony call or other multimedia interaction) may be based, for example, on a routing strategy employed by the routing server 20, and further based on information about agent availability, skills, agent location, and other routing parameters provided, for example, by a statistics (stat) server 22. For example, the stat server 22 may accumulate data about places, agents, and place/agent groups, convert the data into statistically useful information, and pass the calculations to other software applications. According to one embodiment, the stat server 22 may provide information to the routing server about agents' capabilities in terms of interactions they are handling, the media type of an interaction, and so on.

An exemplary routing strategy employed by the routing server 20 may be that if a particular agent, agent group, or department is requested, the interaction is routed to the requested agent, agent group, or department as soon the requested entity becomes available. If a particular agent has not been requested, the interaction may be routed to agents with the requested skill as soon as those agents become available. If a particular agent group or department has not been requested, the interaction is removed from the routing server queue and routed to an agent group or department handling back-office work. The interaction may be placed into a queue, or for deferred media, the interaction may be placed in a workbin associated with a back-office agent group or department. In some embodiments, the interaction may be routed directly to agents for immediate processing. In this regard, the routing server 20 may be enhanced with functionality for managing back-office/offline activities that are assigned to enterprise employees. Such activities may include, for example, responding to emails and letters, attending training seminars, or performing any other activity (whether related to the contact center or not) that does not entail synchronous, real-time communication with end users. For example, a non-contact center activity that may be routed to a knowledge worker may be to fill out forms for the enterprise, process claims, and the like. Once a work item is assigned to an agent, the work item may appear in the agent's workbin 26a-26b (collectively referenced as 26) as a task to be completed by the agent. The agent's workbin may be implemented via any data structure conventional in the art, such as, for example, a linked list, array, and/or the like. The workbin may be maintained, for example, in buffer memory of each agent's computer device.

According to one exemplary embodiment, the contact center may also include various multimedia/social media servers 24 coupled to the communications network 14 for engaging in media interactions other than telephony calls (PSTN or VoIP) with the end user devices 10 and/or web servers 32. The media interactions may be related, for example, to email, chat, text-messaging, social messaging, web interactions, and the like.

The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), web forms submission, or the like.

According to one exemplary embodiment of the invention, the multimedia/social media servers 24 are coupled to an interaction server 40, which is a hub that manages multimedia/social media interactions other than telephony calls, as well as offline (asynchronous, non-real time) tasks for the contact center. The interaction server 40 communicates with the routing server 20 to route the multimedia interactions and tasks to agents or other employees.

The system in FIG. 1 also includes a rules system 44 for generating, deploying, and invoking various rule sets for the contact center. Such rules may be business rules that may change from time to time based on, for example, promotions that the business enterprise may want to offer. The rules may also relate to assignment of priorities for various tasks that need to be distributed to employees. According to one embodiment, the rules system integrates other rules for workflow distribution that eliminates the need for separate rules generating.

According to one exemplary embodiment of the invention, the contact center also includes one or more mass storage devices 30 for storing data related to contact center operations such as, for example, information related to agents, customers, customer interactions, and the like. The mass storage devices may take the form of hard disks or disk array as is conventional in the art.

The contact center may also include a reporting server 18 configured to generate reports from data aggregated by the stat server 22. Such reports may include near real-time reports or historical reports concerning the state of resources, such as, for example, average waiting time, abandonment rate, agent occupancy, and the like. The reports may be generated automatically or in response to specific requests (e.g. from an agent/administrator, contact center application, and/or the like).

The various servers and systems of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2:
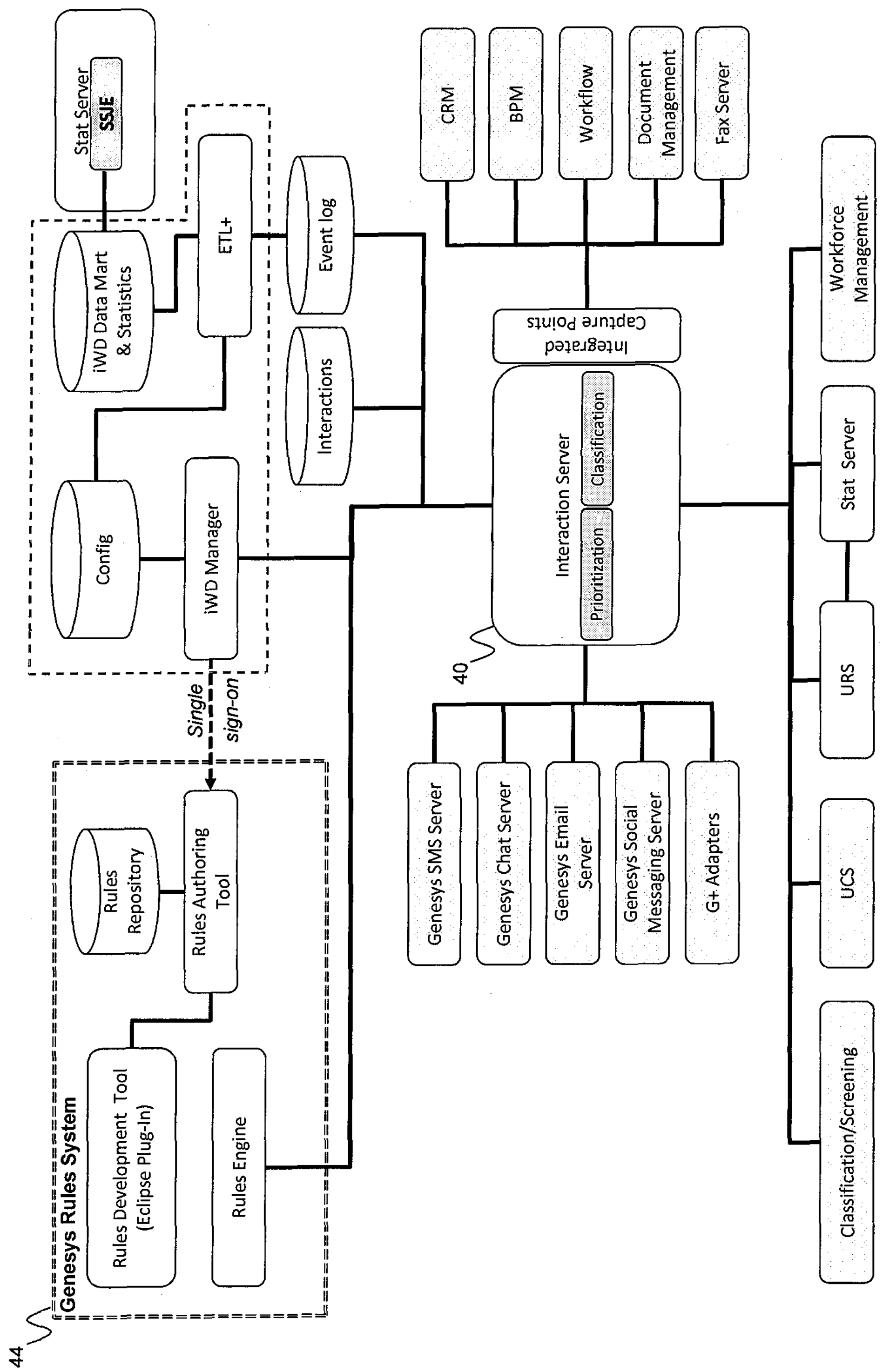
FIG. 2 is a more detailed schematic diagram of some of the components of FIG. 1 for providing an iWD solution and rules generation/processing according to one exemplary embodiment of the present invention.

FIG. 2 is a more detailed schematic diagram of some of the components of FIG. 1 for providing an iWD solution and rules generation/processing according to one exemplary embodiment of the invention. As depicted in the embodiment of FIG. 2, the interaction server 40 includes various integrated capture adapters (referred to as capture points) 162 that provide an interface for receiving work from one or more work source systems 172-180. The work source systems may be, for example, external to the contact center. For example, a third party customer relationship management system 172, business process management system 174, or different media servers may supply work to the contact center via the integrated capture points. An exemplary work item to be routed to an agent may relate, for example, to insurance claims processing. Another work item may be, for example, a technical service request. According to embodiments of the present invention, any task originating system may supply work to the interaction server for routing to employees.

According to one embodiment, the capture adapters are bi-directional and help ensure that changes in the work source systems 172-180 are updated by the interaction server 40. The capture adapters may support several different types of interfaces such as, for example, web services, Extensible Markup Language (XML) files, enterprise services buses, or databases. For example, web services may expose iWD functionality to any enterprise application that can communicate via a web service. When XML files are used, tasks may be submitted to the interaction server 40 in batch mode, for example from point-of-sale systems or from an external business partner where a real-time Web service or enterprise service bus connection is not available. With an enterprise service bus, such as IBM WebSphere MQ or JMS, existing messages can be submitted to the interaction server 40 to create, update, and cancel tasks.

According to one embodiment, the capture points include a built-in transformation service so that customers are not required to create iWD-specific message formats. The transformation service allows the interaction server 40 to accept existing message formats and communicate back in the same format. In addition, database connectivity may be supported for custom applications or legacy applications that are not Web service- or service bus-enabled.

The interaction server 40 also receives multimedia interactions from the various multimedia/social media servers 24 for routing to contact center resources (e.g. IVR, agent, or the like). The multimedia/social media servers 24 may include one or more of a text messaging server 182, chat server 184, email server 186, social messaging server 188, and other multimedia servers/adapters 190. According to one embodiment, the received interactions are logged in an interactions database 156. Other events generated by the system are also logged in, for example, in an event database 158.

According to one exemplary embodiment, the interaction server 40 includes a prioritization module 41 and a classification module 43. These modules may be implemented via computer program instructions that are stored in memory of the interaction server and executed by a processor for routing the various tasks and interactions to contact center resources. A person of skill in the art should recognize that all or portions of the modules may also be implemented via firmware (e.g. ASIC), hardware, or a combination of software, firmware, and/or hardware. Furthermore, although the modules are depicted as being hosted by the interaction server 40, a person of skill in the art should recognize that the modules may be hosted by one or more other application servers. For example, the classification module 43 may hosted by a separate classification server 192.

According to one exemplary embodiment, the interaction server 40 has access to various contact center servers and resources for intelligently routing tasks to target destinations. For example, a universal contact server 194 is configured to maintain and provide contact profiles, including customer contact information (e.g. names, addresses, phone numbers), contact history (previous interactions with the different contacts), and other data used in processing interactions, such as standard responses and screening rules. The stat server 22 provides real-time visibility of interactions and resource utilization within the contact center, including, for example, agents' capacities in terms of the number of interactions they are handling, the media type of an interaction, and the like. The routing server 20 interacts with the stat server 22 to route work items based on an appropriate routing strategy.

According to one exemplary embodiment, the interaction server 40 has access to other system components which give it visibility to resource availability and utilization. For example, the interaction server 40 may be coupled to a workforce management system 118 for obtaining agent schedule information. According to one exemplary embodiment, the interaction server 40 may leverage the visibility to resource availability and utilization within the contact center to determine whether a routing request should be transmitted to the routing server 20. Thus, instead of blindly requesting routing of current work items to the routing server 20 based, on for example, priority information, the interaction server 40 may hold off in making such a request if, for example, a particular resource is not available.

In one embodiment, the iWD system 42 includes, but is not limited to, a configuration database 148, an iWD database 150, and an iWD manager/server 146. According to one embodiment, the system of FIG. 2 provides various iWD applications including, for example, the iWD manager/server 146 that allows an administrator to monitor workload distribution, interface with the rules system 44 to author rules, generate reports, perform various operations with respect to tasks, and the like. According to one embodiment, the iWD manager/server 146 is an application which is hosted in the administrator device 38*c*. According to one embodiment, the iWD manager/server 146 accesses the configuration database 148 for retrieving configuration data (e.g., definition of objects required for operation of iWD, such as departments, processes, Java services, service type, customer segment, organizational hierarchy, skills, segment parameters to control percentage submission to routing, and the like), and audit data (e.g., history of which users made changes to specific iWD configuration objects, and when those changes were made).

The iWD manager/server 146 may also access an iWD database 150 for performing reporting based on contact center activities. For example, in one embodiment, the iWD database 150 provides a data schema that is organized around departments and business processes, and also provides information about activities outside of the contact center, such as back-office (i.e., non-agent) workload distribution. A manager may access the data in the iWD database 150 to determine the workload both within and outside of her department.

Figure 3:
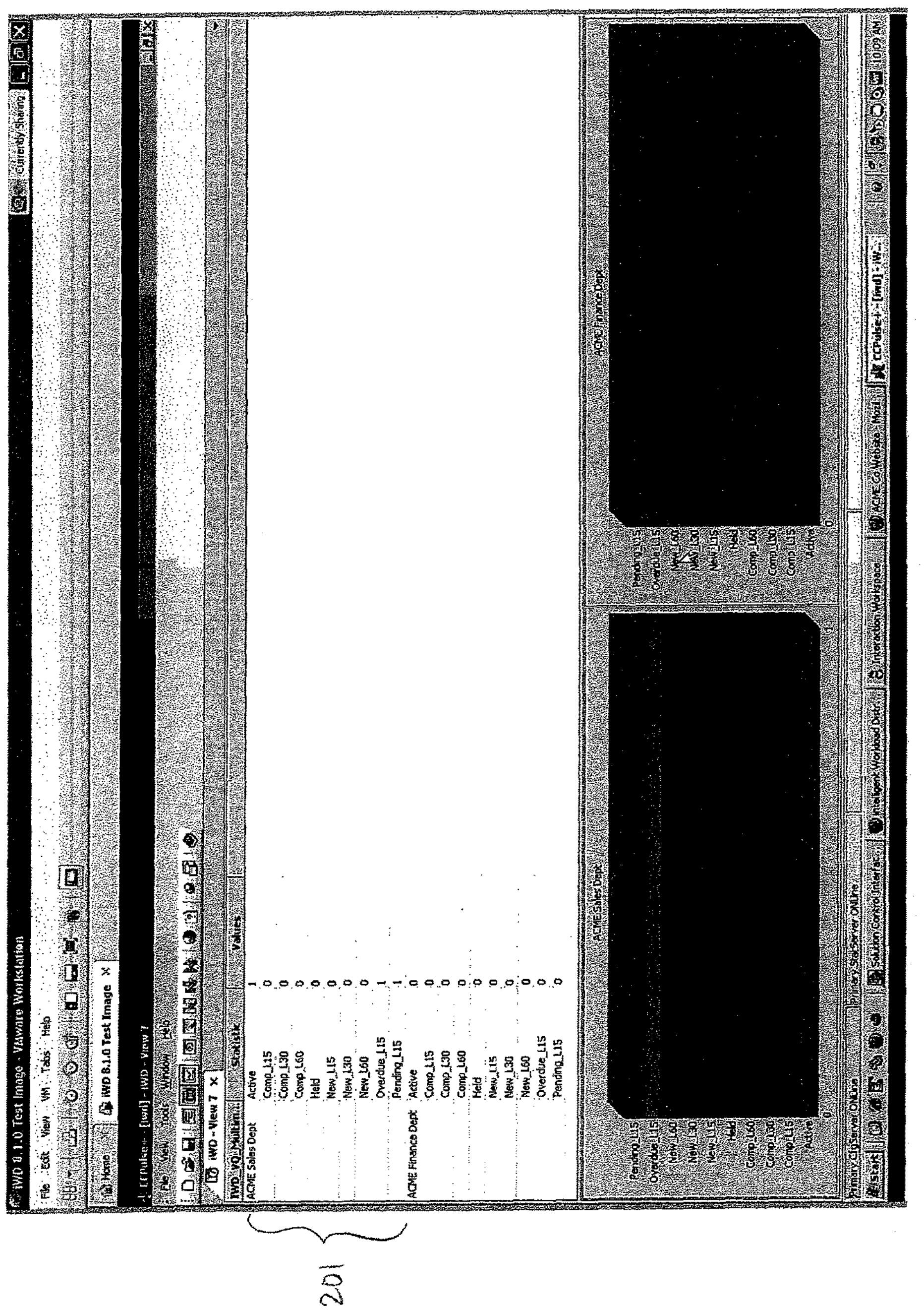
FIG. 3 is a screen shot of a report generated by a reporting application, according to an embodiment of the present invention.

FIG. 3 is a screen shot of a report generated by a reporting application (e.g. CCPulse+) based on information in the iWD database, according to an embodiment of the present invention. In other embodiments, reports may be generated based on information from other data sources. As shown in FIG. 3, information may be reported on a department-specific basis. A list 201 for the ACME Sales Department summarizes the number of active tasks and held tasks, the number of overdue and pending tasks within the last 15 minutes, and the number of completed and new tasks within the last 15, 30, and 60 minutes. A chart 203 shows the same information as provided in the list 201, albeit in a bar chart. However, embodiments of the present invention are not limited thereto, and the data may be presented in any number of ways.

Referring again to FIG. 2, rules generation and processing for the contact center is enabled via the rules system 44. The rules generated via the rules system may be used by various contact center clients including, for example, the interaction server 40. According to an embodiment, the rules system 44 includes a rules development tool 166 that allows users (e.g., technical users) to create and manage rule templates. According to one embodiment, rule templates provide a way to map the underlying data model to business language that is understandable by business users.

The rules system 44 further includes a rules authoring tool 170 which may be accessed by, for example, non-technical (e.g. business) users to access rule templates defined by the rules development tool 166 and create specific business rules. In this regard, the rules authoring tool provides an interactive graphical user interface (GUI) that may run, for example, in a web browser. Rule templates enable business users to create business-driven rules with reduced user error while allowing technical personnel (e.g., information technology staff) to focus on technical tasks involved in generating the templates.

Once a rule is generated based on a particular template, the rule may be stored in a rules repository 168. According to one embodiment, the rules repository 168 is a database where rule development and authoring information is stored. For example, the rule repository 168 may consist of business rules, templates, test cases, and other assets that are managed in a multi-user environment.

The rules system 44 further includes a rules engine 164 which, according to one embodiment, is an execution platform for rules defined by the rules authoring tool 170. Rules or rule packages may be deployed to the rules engine 164 as specified by business users. When the rules engine 164 is notified that a rule or rule package is to be deployed, the rules engine retrieves the rule or rule package from the rules repository 168.

Figure 4:
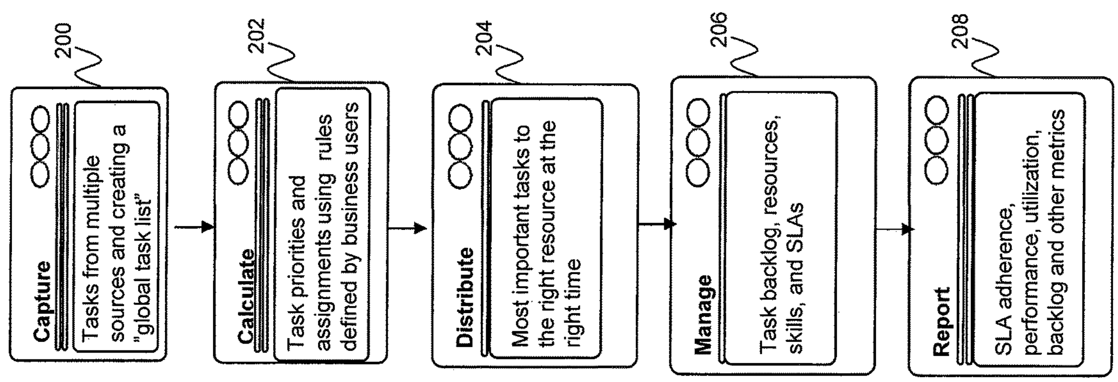
FIG. 4 is a flowchart of an iWD flow according to an embodiment of the present invention.

FIG. 4 is a flowchart of an iWD flow according to an embodiment of the present invention. The process may be described in terms of a software routine executed by one or more processors based on computer program instructions stored in memory. A person of skill in the art should recognize, however, that the routine may be executed via hardware, firmware, or in combination of software, firmware, and/or hardware. Furthermore, the sequence of steps of the process is not fixed, but may be altered into any desired sequence as recognized by a person of skill in the art.

In step 200, new tasks are captured (e.g., in electronic form) from multiple work sources, for example via the integrated capture points 162 (FIG. 2). According to one embodiment, the classification module 43 may be invoked to classify the tasks. In this regard, the classification module may be configured to invoke the rules engine 164 to classify the task according to business processes, department, priority, or any other criteria specified by the applied rules.

According to one embodiment, the interaction server 40 creates a global task list (GTL) based on the captured tasks. The GTL is an inventory of tasks across all systems and workbins. The work sources may be any number or combination(s) of systems from a variety of applications and business support systems throughout the enterprise, such as, for example, any combination of the work source systems 172-180 for FIG. 2. However, embodiments of the present invention are not limited thereto, and tasks may be captured by other legacy/host systems, enterprise service bus systems, or any other media server (iWD or non-iWD specific). Each of the work sources may interface with the integrated capture points 162 to create a GTL of tasks that are managed by the interaction server 40.

In step 202, the interaction server 40 invokes the prioritization module 41 for calculating task priorities and assignments based on business rules provided by the rules engine 164. For example, the interaction server 40, based on rules applied by the rules engine 164, may identify service level values such as a task due date, business value, and priority. The particular service level values may depend, for example, on service level agreement (SLA) requirements. Using these values, the interaction server 40 can prioritize tasks from most to least important and monitor and manage tasks to ensure compliance with service level objectives.

According to one embodiment, the interaction server 40 arranges the GTL in order of priority or importance, and may be based on business rules configured for the particular capture point from which the task was captured, based on the business process associated with the task, or based on the contract/department level, spanning all business processes.

According to an aspect of the present invention, business rules facilitate a more informed prioritization decision in leveraging existing enterprise Web services to collect additional task-related information. For example, a rule may be configured such that, when a new customer order is captured, the rule retrieves the customer's current credit score. The score (such as "poor") is then attached to the task and can be utilized downstream by another business rule for setting priority, or by the routing server 20 for determining to whom the task should be routed (for example, a credit-granting department).

To illustrate, referring again to FIG. 2, a technical user creates templates using the rules development tool 166, and a business user configures business rules regarding priority and due dates using the rules authoring tool 170. Once configured, the rules are stored in the rules repository 168. When queried, the rules engine 164 evaluates the business rules stored in the rules repository 168 to see if any are applicable to the task at issue. That is, business rules may be applied to both prioritize tasks and to determine a course of action with respect to a particular task.

For example, a business user could configure a business rule to specify that for certain area codes of end users, a work item should be directed to a particular group of agents. As another example, a business user could specify that if the Form ID of a captured interaction (e.g., the Form ID 304 in FIG. 7B) is associated with a type of service request, then the work item should be sent to a particular department.

After the applicable rules (if any) have been applied, the rules engine 164 may be called again to reprioritize the remaining tasks in the queue. For example, for a low priority work item stored in the interaction server 40, the interaction server 40 periodically asks the rules engine 164 whether to update the priority to a higher (or lower) priority.

In step 204, tasks are selected for distribution to employees (including customer service agents, front-office resources, back-office resources, knowledge workers, or outsourcing partners). In some embodiments, the interaction server is configured to leverage resource and skill awareness for distributing tasks to the appropriate resource (e.g., by push or pull to the right resource at the right time). Such resource and skill awareness may be provided, for example, by the stat server 22, workforce management server 118, and/or the like.

In other embodiments, resource and skill awareness may be considered at the iWD level and incorporated into rules. For example, the iWD system 42 may obtain employee schedule information from the workforce management server 118 and hold a given task until employees with the required skill are scheduled for work. Real-time resource awareness may also be utilized, for example, to submit a task for routing if the number of available agents with the required skill is greater than a defined lower threshold. As a further example, the iWD system 42 may be configured to directly reserve agents to ensure that an identified target agent is not occupied with other tasks while the given interaction is routed to that agent. In this regard, no new tasks are assigned to a reserved agent until the given interaction is routed to this agent.

Distribution may be accomplished, for example, by way of distribution points (or targets) that define the location to which the tasks will be routed for processing. According to one embodiment, the system of FIG. 2 is configured to support multiple distribution points, further enhancing work distribution. For example, an enterprise may have the option of routing lower-value tasks, as determined by the SLA rules, to a lower-cost region, such as third-party business processes or outsourcing partners of the enterprise.

In one embodiment, work is distributed to targets according to a push model where work items are pushed to employees one at a time. For example, a work item may appear or "pop up" on a particular agent device 38. In one embodiment, work is distributed to targets according to a pull model (or "workbin mode"), where multiple tasks (or batches) may be distributed to workbins or the like. According to one embodiment, the number of items that are distributed to the workbins at a time may be configurable. Work may be distributed to personal workbins of individuals or to a group workbin (i.e., shared access to a common workbin). In one embodiment, the size of each batch, as defined by a distribution threshold, is set to the number of tasks that can be completed in a near-term period (e.g., within the next 4 to 6 hours). Following the initial distribution of tasks through a distribution point, at a certain intervals, the interaction server may be configured to automatically update or top-up the queue with the next highest priority tasks.

In step 206, tasks are managed by the iWD manager/server 146 (FIG. 2). According to one embodiment, the iWD manager/server 146 accesses the GTL to provide to a business user a list of tasks associated with different business contexts, and a view of details and history for each task. The iWD manager/server 146 provides a graphical user interface (GUI) that allows the business user to perform manual task operations such as hold, resume, cancel, and modify. The GUI may further allow updating of task attributes, such as customer segment or priority. The GUI may further allow the user to use filters to refine the list of tasks visible in the view, by defining filter criteria and selecting which task attributes to display. For example, through the GTL, a user may cancel, restart, or hold a task when the task is an "Assigned" status (i.e., open on an agent desktop). In addition, through the GTL, a user may also cancel, restart, resume, or update a task when the task is in a "Held" status. According to an aspect of embodiments of the present invention, the iWD manager/server 146 provides users with visibility into workload distribution, availability, and productivity of employees. The iWD manager/server 146 therefore improves resource management by allowing a business user to manage backlog tasks, priorities, SLAs, resources, and skills.

Figure 5A:
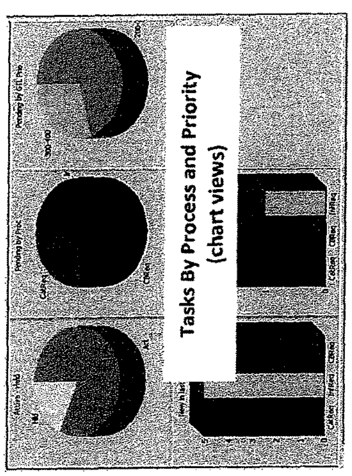
FIGS. 5A-5D are reports showing graphs of pending tasks, organized by business process and priority, by due time, by business process only, and by business value.
Figure 5B:
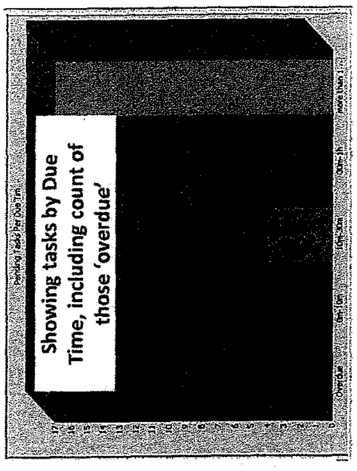
Figure 5C:
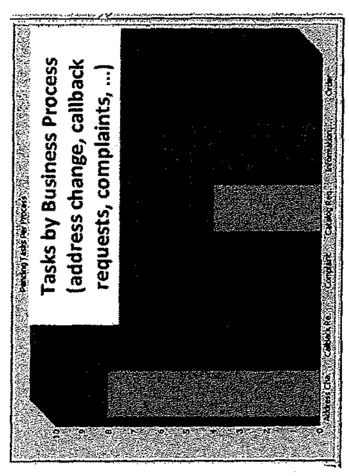
Figure 5D:
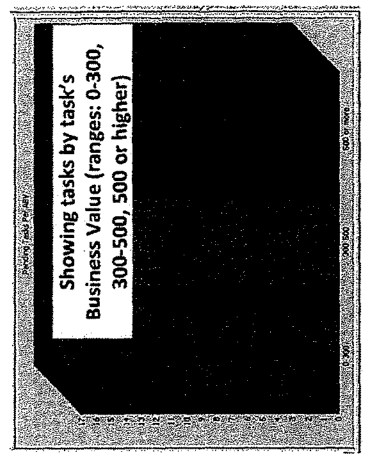

In step 208, a report may be generated of task-based statistics, based on, for example, data collected by stat server 22. The report may present data (such as SLA adherence, performance, utilization, backlog, overdue work, amount of work completed in a certain time period, and length of time a particular agent took to complete a task) in a number of different ways. For example, as shown in FIGS. 5A-5D, tasks may be organized and reported according to both business process and priority (FIG. 5A); by due date and time (including a count of those overdue) (FIG. 5B); according to business process only (e.g., address change, callback requests, complaints) (FIG. 5C); and by a numeric business value assigned to each task (FIG. 5D). The data may be reported in both real time (e.g., through current day statistics) and on a historical basis.

According to aspects of embodiments of the present invention, such reports can provide insight into business performance and permit business users to compare the reported metrics against key performance indicators defined by the business users. Business users can also leverage task backlog information to improve workforce planning.

Figure 6:
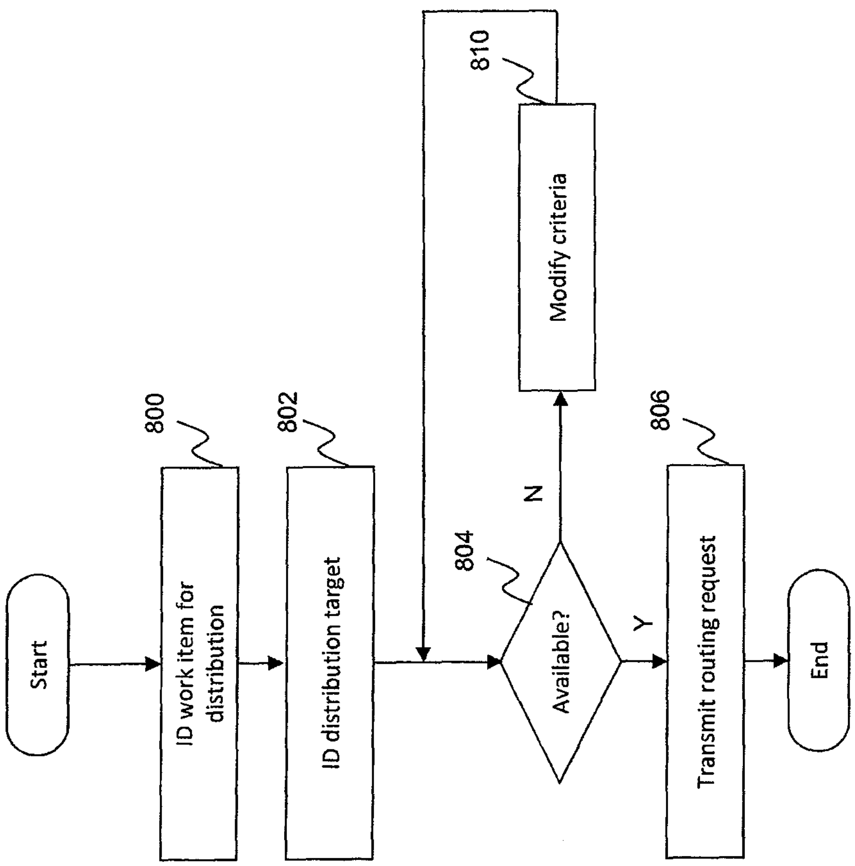
FIG. 6 is a flow diagram of a process for distributing work items to distribution targets according to one exemplary embodiment of the invention.

FIG. 6 is a flow diagram of a process for distributing work items to distribution targets according to one exemplary embodiment of the invention. The process may be described in terms of a software routine executed by one or more processors in the interaction server 40 (or iWD server) based on computer program instructions stored in memory. A person of skill in the art should recognize, however, that the process may be executed via hardware, firmware, or a combination of software, firmware, and/or hardware. Furthermore, the sequence of steps of the process is not fixed, but may be altered into any desired sequence as recognized by a person of skill in the art.

The process starts, and in step 800, the interaction server (or iWD server) identifies one or more work items for distribution. The work items may be retrieved from the global task list which may be stored, for example, in a workflow distribution queue maintained by the interaction server. In this regard, the interaction server (or iWD server) may be configured to periodically access the global task list and identify one or more queued work items for distribution. The work items may be selected based on, for example, one or more distribution criteria. The distribution criteria may be, for example, a priority assigned to the various work items based on rules applied by the rules engine 164. In some embodiments, the distribution criteria may be a business value assigned by the rules engine. A business value may reflect a possibility of up-sell, cross-sell, or other business opportunity with the customer. The distribution criteria may also be the creation date of the interaction, a due date of the work item, and the like.

According to one exemplary embodiment, one or more work items with the highest priorities are selected first for distribution.

According to some embodiments, resource awareness may be implemented at the interaction server (or iWD server) level. In such embodiments, the interaction server (or iWD server) may operate as a proxy or protocol hub between the iWD system 42 and resource status information sources such as the workforce management system 118 and statistics server 22. For example, in step 802, the interaction server (or iWD server) identifies a distribution target. Identification of the distribution target may also be done by the iWD system 42 where the iWD system 42 is aware of contact center resources. In the latter embodiment, information about the intended target is passed to the routing server together with the given task.

The distribution target may be, for example, a specific agent, agent group, workbin, automated response system, and/or any other resource of the contact center. The identification of the distribution target may be based on, for example, data returned upon application of one or more rules by the rules engine 164. For example, if the work item is processing of an order submitted over the web by a customer, the interaction server 40 (or iWD server) may be configured to access the rules engine 164 for getting an assignment of a priority value for the work, and for any other business rules that may be associated with the interaction. In accessing the rules engine, the interaction server 40 (or iWD server) may be configured to pass certain parameters relating to the interaction, such as, for example, a form ID of the form that was used to fill out the order request. A rule stored by the rules engine associated with the form ID may return data on the distribution target (e.g. order processing agent group) to which the work item is to be routed. The distribution target information may be attached to the work item data and stored in the global task list until ready for distribution.

According to one embodiment, upon identification of the distribution target, the interaction server 40 (or iWD server as the embodiment may be) determines, in step 804, whether one or more resources associated with the distribution target are available. For example, if the distribution target is an agent group having a particular skill set, availability may be determined based on capacity settings for each of the agents in the agent group who is eligible to receive an interaction. An agent's capacity may be set to indicate a number of tasks or types of tasks that an agent may be assigned to handle concurrently at any point in time (e.g. concurrently handle three email responses, two chat sessions, or two order processing activities). A work schedule established for each agent may indicate the agent's capacity as well as the types of skills and skill levels associated with the agent. This information may also be provided by the stat server 22. According to one embodiment, the work schedule may be set by contact center administrators having access to the workforce management system 118.

According to one embodiment, the interaction server (or iWD server) has access to agents' schedules and/or real time visibility on activities being handled by the agents. If, based on this information, the interaction server (or iWD server) determines that there are one or more agents with current (or projected) capacity, skills, and the like, for handling the work item, the interaction server (or iWD server) transmits, in step 806, a routing request to the routing server 20. In this regard, the work item may be removed from the queue implementing the global task list and placed in a routing queue maintained by the routing server 20. The routing request may be transmitted over a data communications network (e.g. local area network) connecting the interaction server (or iWD server) and the routing server. The routing request may include, for example, certain data returned by the rules engine (e.g. distribution target data). The routing server, in response to the request and/or data attached to the request, identifies an appropriate available agent and forwards the work item to the agent. In this regard, the work item may be pushed to the agent's device or placed in the agent's workbin 26.

Referring again to step 804, if the interaction server (or iWD server) determines that there are no available agents currently or in a projected future (based on calculations of when an agent is scheduled to be available), the interaction server (or iWD server) refrains from transmitting the routing request to the routing server 20. In this manner, the routing server is not burdened with requests for routing work items that cannot be routed due to lack of resources. This helps avoid unnecessary traffic in the data communications network connecting the interaction server (or iWD server) with the routing server, as well as unnecessary processing by the routing server in determining availability of agents.

If the work item that is ripe for distribution is refrained from being distributed, the interaction server 20 (or iWD server), in step 810, may make a modification to, for example, a distribution criteria associated with the work item. For example, a priority of the work item may be increased, the due date of the work item may be changed, and/or the like.

According to one embodiment, instead of the interaction server 40 (or iWD server) determining availability of an agent, the determination may be incorporated into a rule applied by the rules engine in, for example, assigning a priority for the work item. For example, the rule may base the assignment of the priority on agent availability information, where a lower priority is assigned to work items where resources are not available. When the interaction server (or iWD server) selects work items for distribution based on the priority data, the work items where agents are not available, and hence, have the lower priority, are consequently not immediately selected for distribution.

Figure 7A:
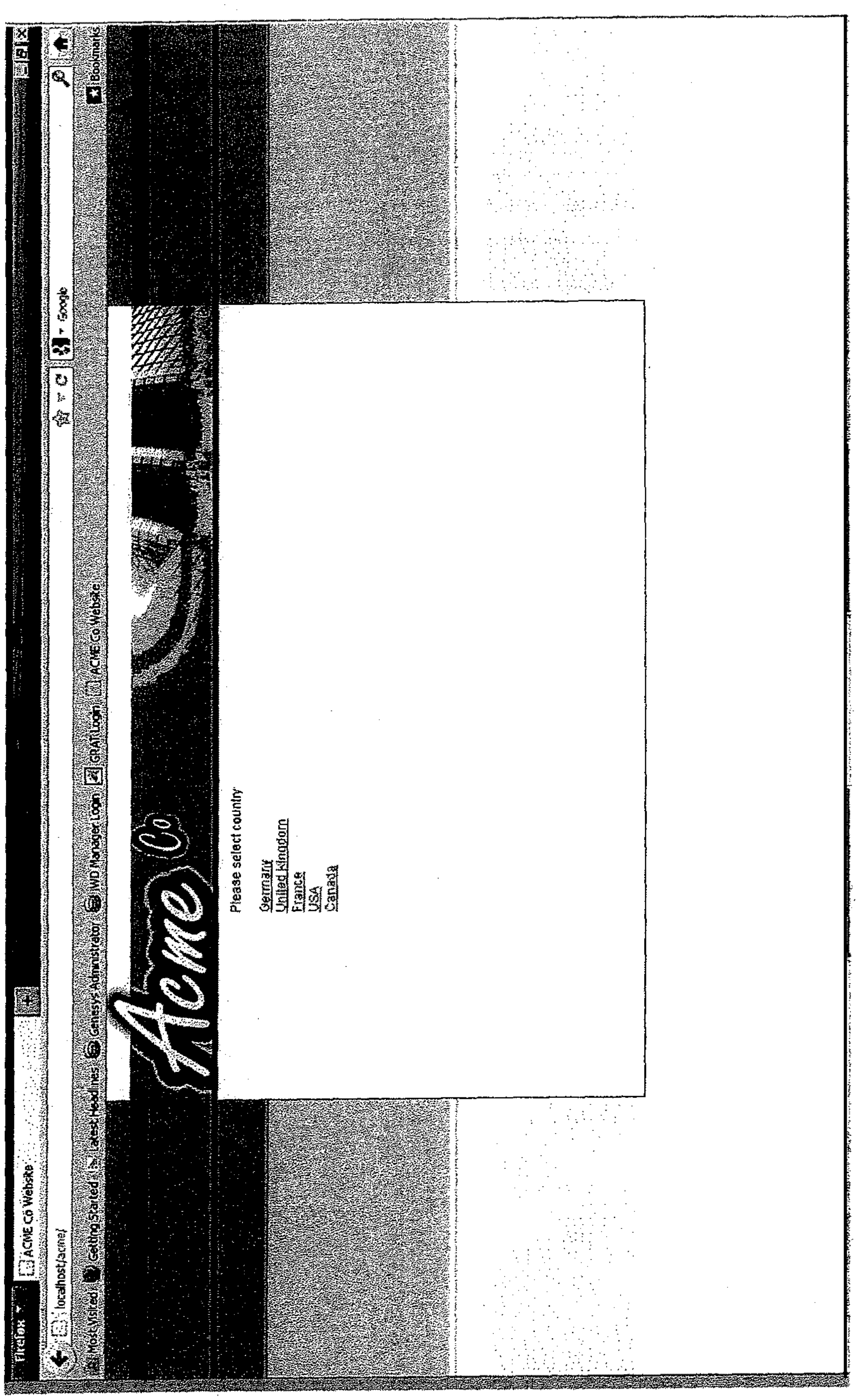
FIGS. 7A-7C are screen shots illustrating an exemplary process of an end user submitting a service request through an enterprise's web site according to one example embodiment of the present invention.
Figure 7B:
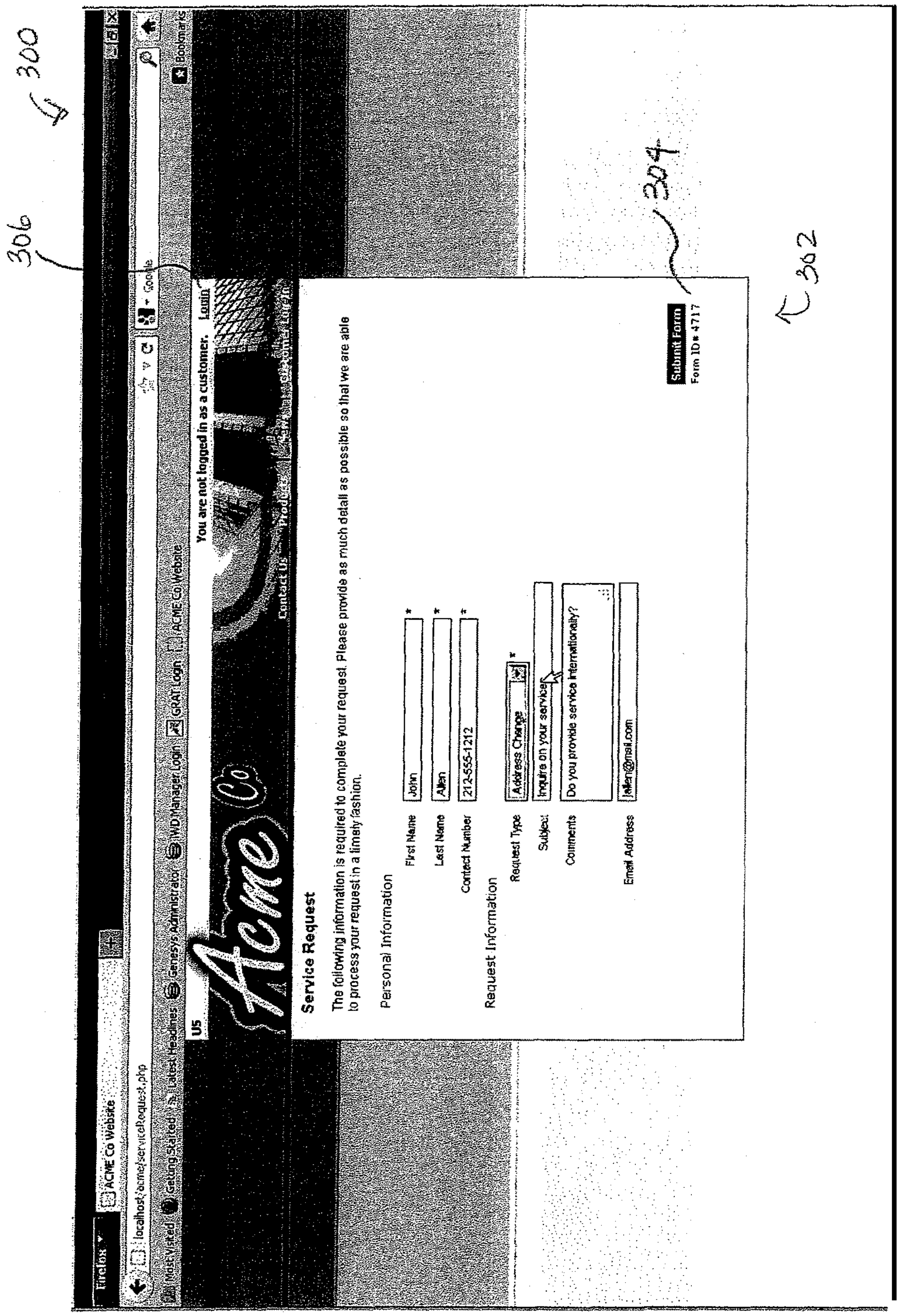
Figure 7C:
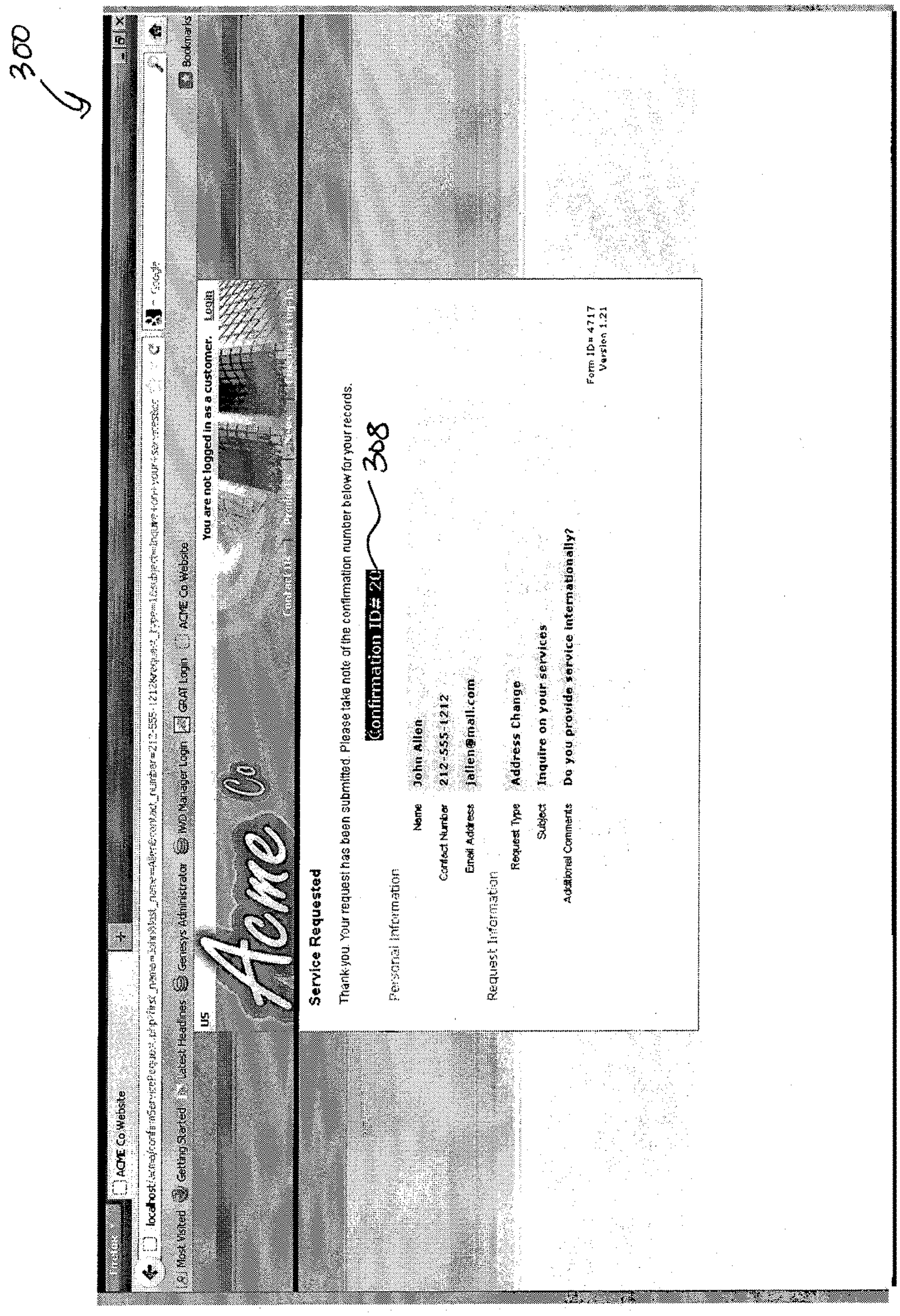

FIGS. 7A-7C are screen shots illustrating an exemplary process of an end user submitting a service request through an enterprise's web site hosted by, for example, the web server 32, according to one example embodiment of the present invention. The service request is an interaction provided to the interaction server 40 for ultimately routing to a contact center resource. The screen shots show example graphical user interface screens encountered by the end user, which may be implemented as Web-based user interfaces. According to an exemplary embodiment, as shown in FIG. 7A, an end user first navigates to a website 300 of an enterprise named Acme Co. After selecting the end user's country as shown in FIG. 7A, the end user is prompted to fill out an online Service Request Form 302 as shown in FIG. 7B. The Service Request Form 302 includes fields for Personal Information (such as first and last name and contact number of the end user) and Request Information (such as the request type, subject, comments, and email address). A Form Identification Number (ID) 304 appears at the bottom of the Service Request Form 302 under the "Submit Form" icon. The Form ID 304 may be associated with a particular type of request such as a service request, or more particularly, an Address Change request. Although a login link 306 is provided on the website for existing customers, as shown in FIG. 7B the end user filling out the form is not required to log in before filling out the Service Request Form 302.

After the end user submits his request, as shown in FIG. 7C, a confirmation number 308 is provided on the screen together with the end user's information as inputted. In some embodiments an estimated response time may also be displayed on the screen. The end user's service request is submitted to the interaction server, which retrieves stored information about the customer. The interaction server determines that the request cannot be satisfied by an automatic response and that the request should be sent to an enterprise employee for further attention.

Figure 8A:
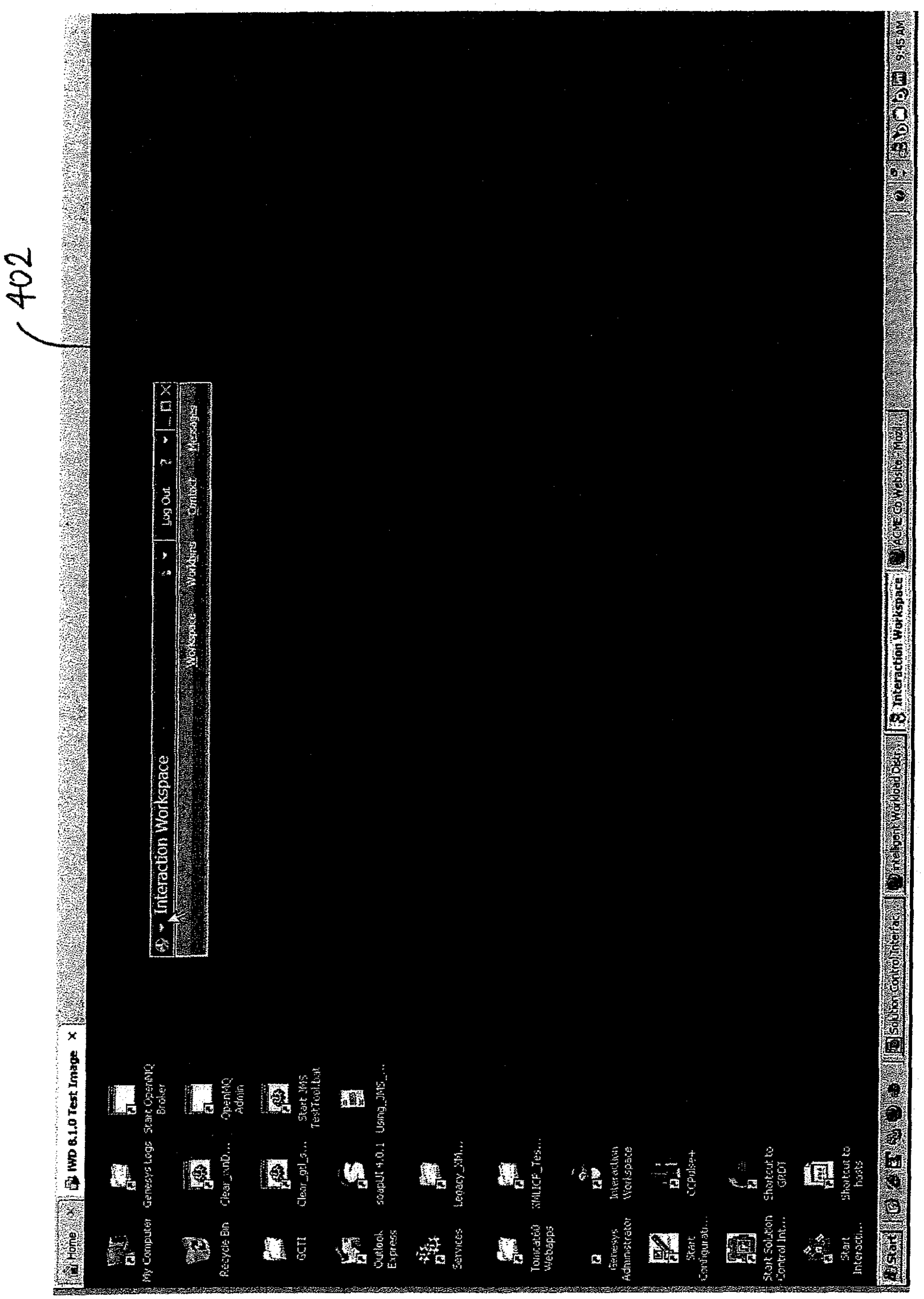
FIGS. 8A-8F are screen shots illustrating the process of an enterprise employee managing interactions and tasks according to one embodiment of the present invention.
Figure 8B:
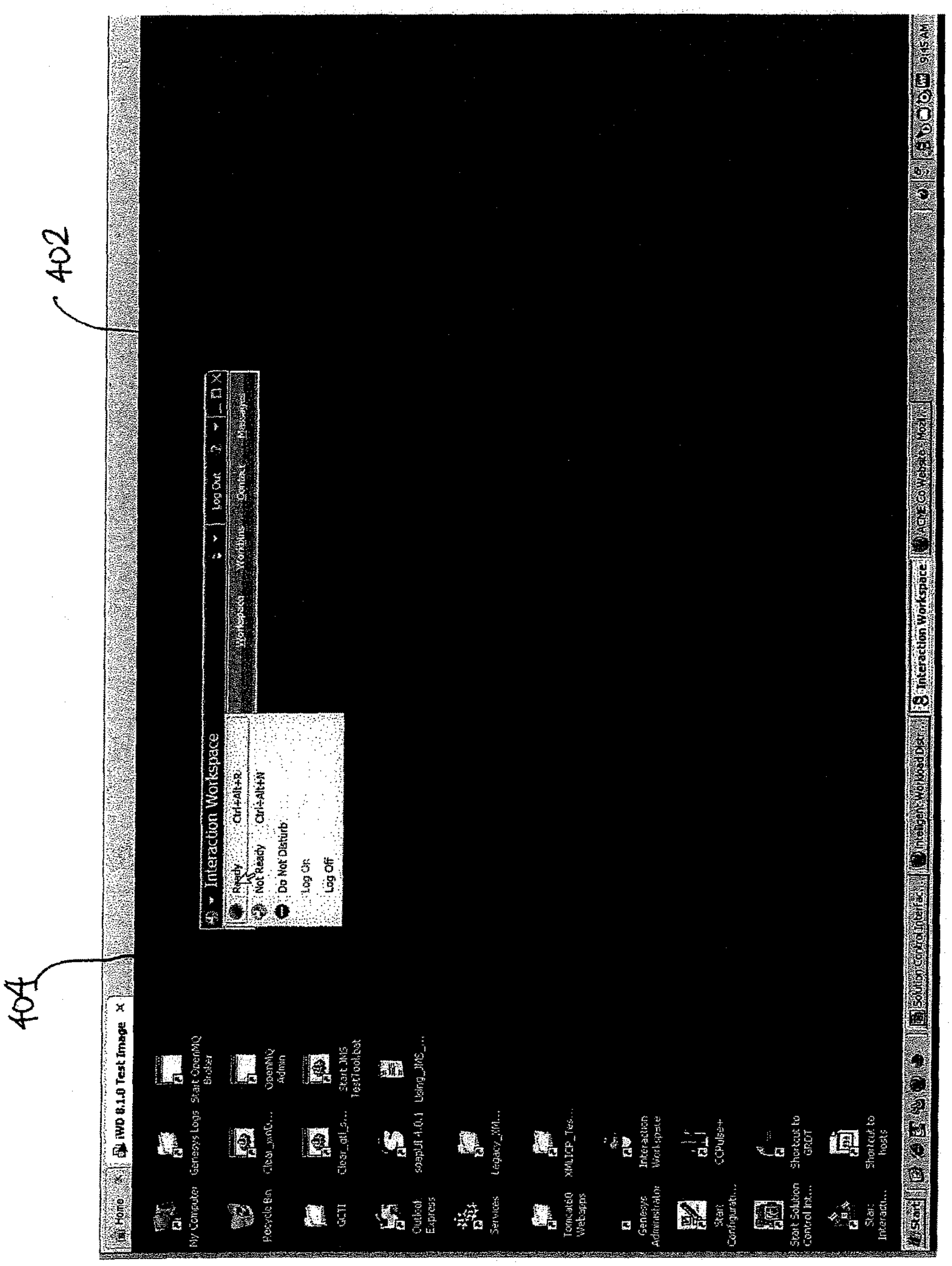
Figure 8C:
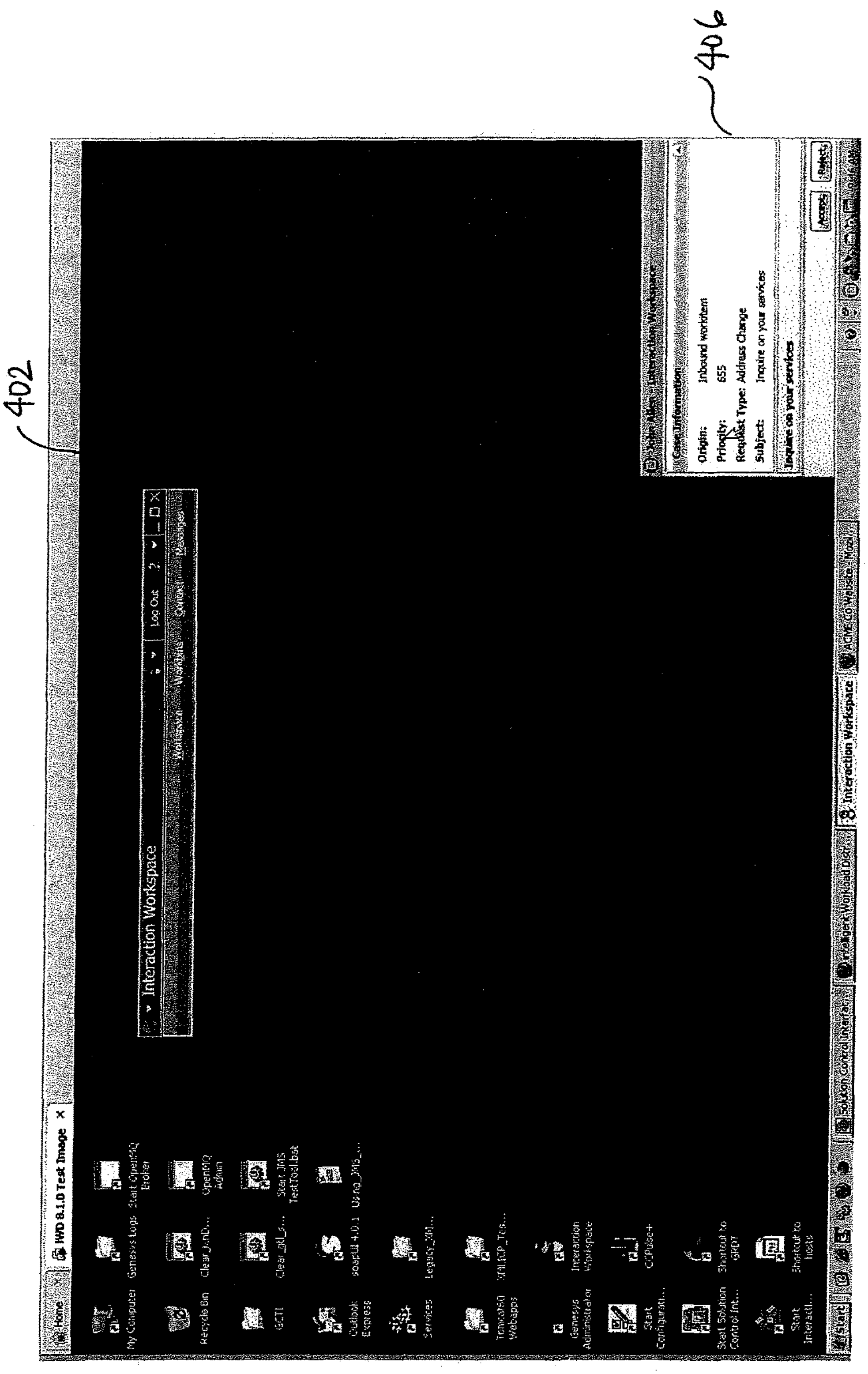

FIGS. 8A-8F are screen shots illustrating the process of an enterprise employee managing interactions and tasks according to one embodiment on the present invention. In exemplary embodiments, the enterprise employee may be a customer service agent or a knowledge worker. As can be seen in FIG. 8A, an employee may manage tasks and interactions using the standalone interaction workspace application 402. According to exemplary embodiments, the interaction workspace application 402 is an application hosted by an agent device 38 for providing different functionalities to the enterprise employee according to one embodiment of the invention. As shown in FIG. 8B, an enterprise employee can use the interaction workspace application 402 to indicate his availability status. For example, the employee can select a status designation from a drop-down list 404 of options such as "Ready," "Not Ready," and "Do Not Disturb."

In one exemplary embodiment, when the enterprise user becomes available, the interaction server, in conjunction with the routing server, may push the next highest priority task to the employee if appropriate to do so. As an example, in FIG. 8C a task based on the end user interaction of FIGS. 7A-7C is pushed from the interaction server 40 to the employee. According to some embodiments, those tasks which are best matched to the agent's skills and availability are pushed to the agent. The task appears on the employee's desktop as shown in the Case Information Window 406. The Case Information Window 406 displays information about the task, including the Origin, Priority, Request Type, and Subject. The employee may accept or reject the task by clicking on the "Accept" or "Reject" icons in the Case Information Window 406.

Figure 8D:
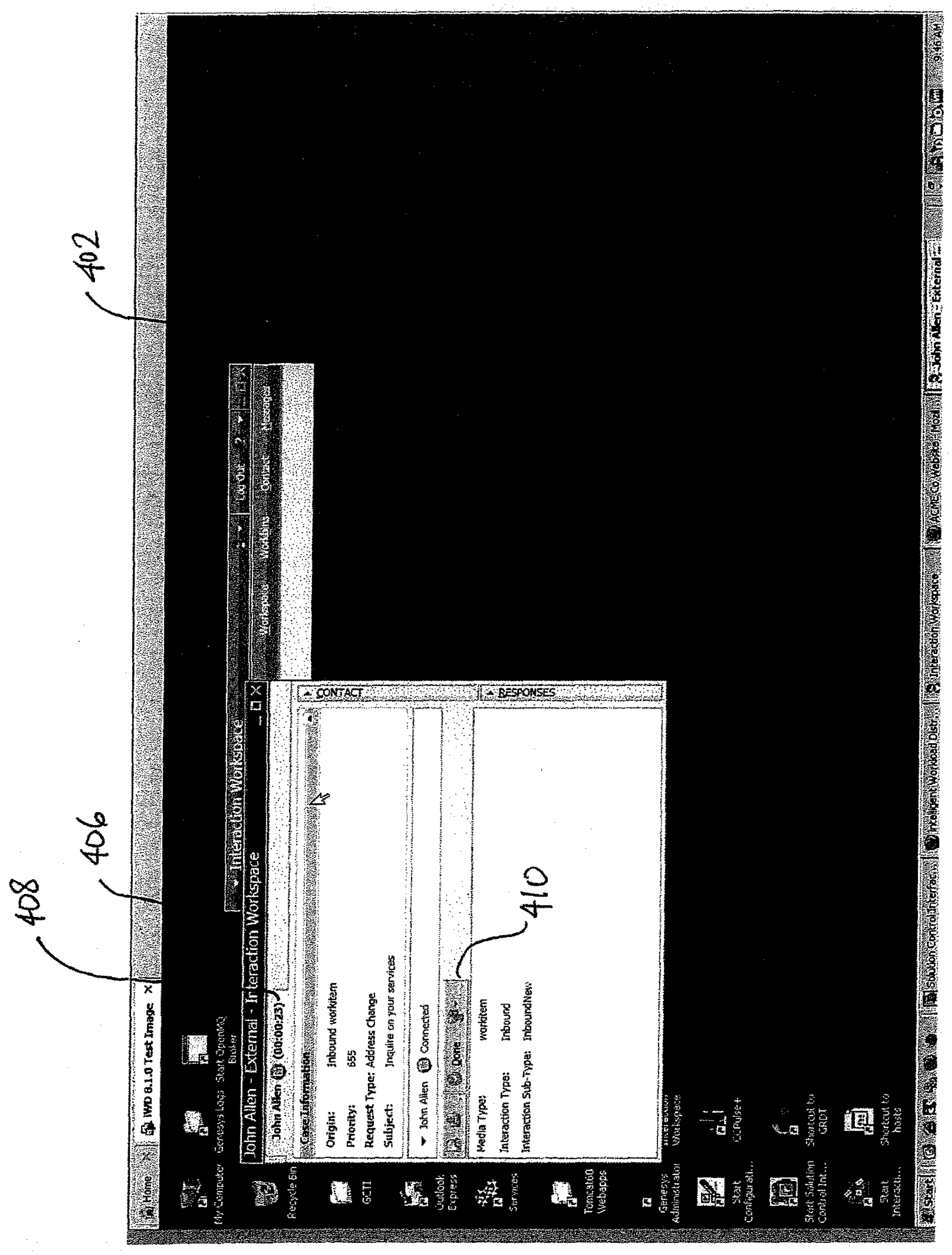
Figure 8E:
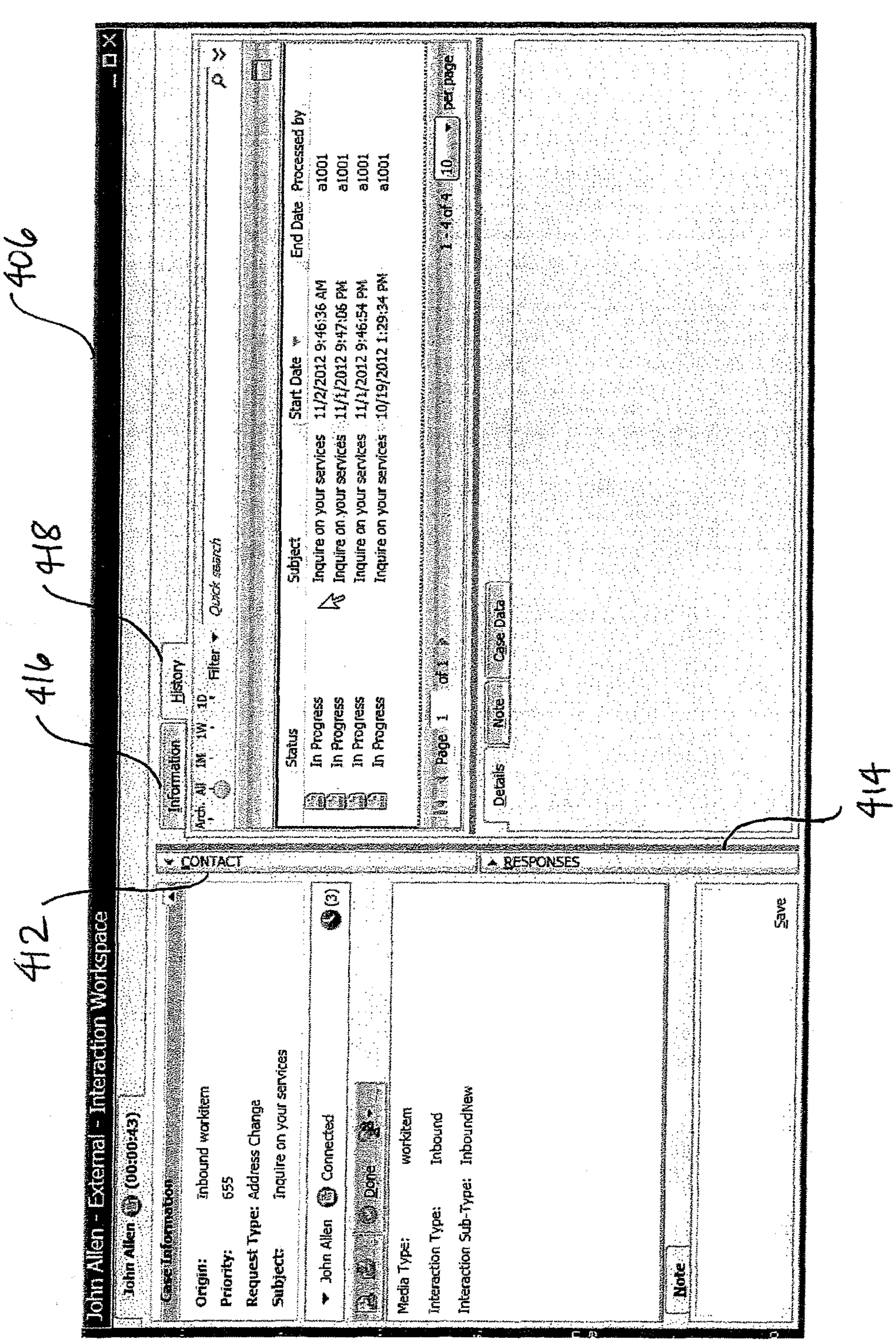
Figure 8F:
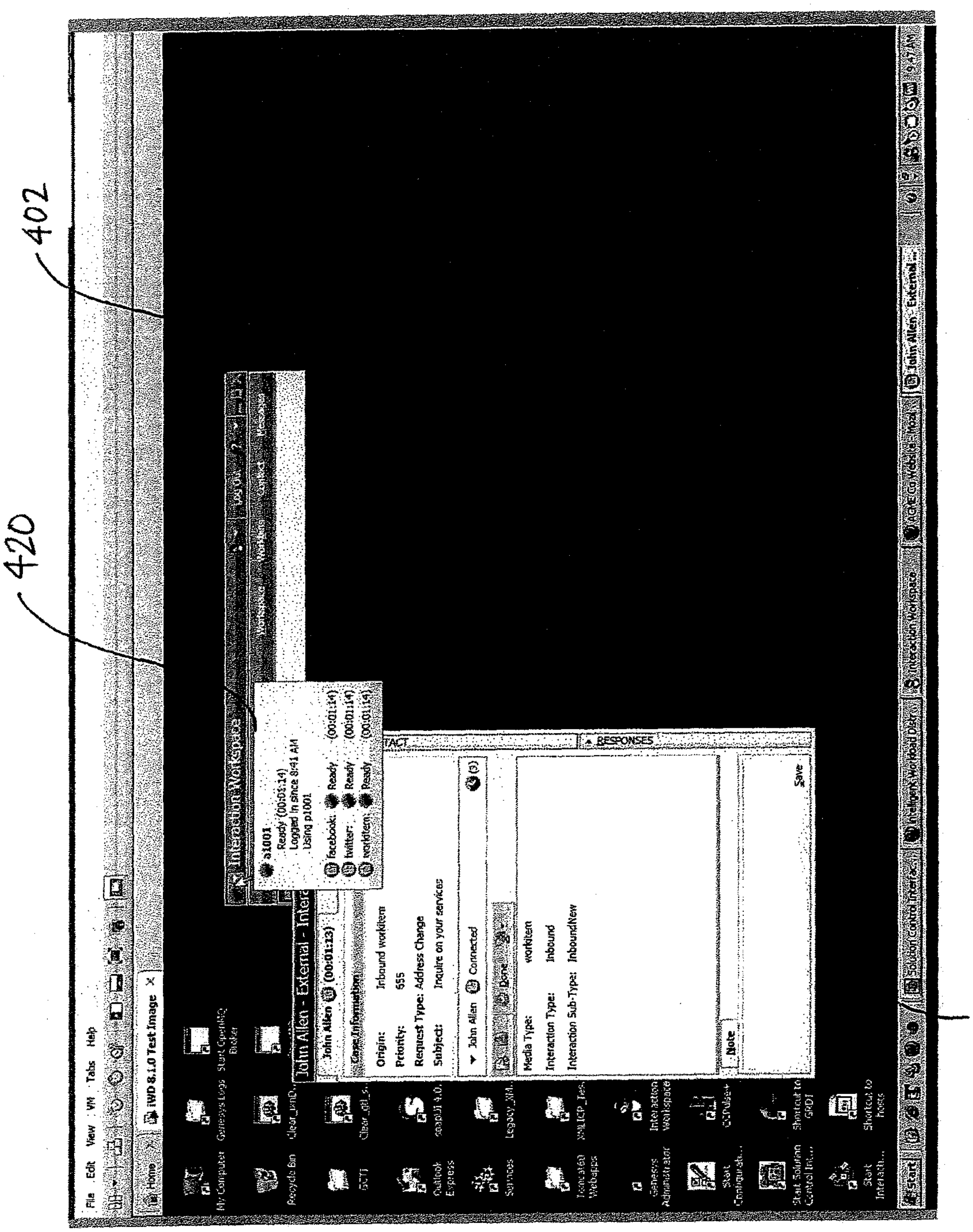

As shown in FIG. 8D, once a task is accepted, the Case Information window 406 displays a timer 408 that shows how long the enterprise employee has been working on the task. The employee may mark the task as completed by clicking on the "Done" icon 410 in the Case Information Window 406. The History menu 418 in FIG. 8E displays the prior history of the task, including the Status, Subject, Start Date, End Date, and who the task was Processed By. In the example shown in FIG. 8E, the Processed By column contains the ID a1001 of the agent who handled the task. In FIG. 8F, a status indicator 420 shows detailed information about the employee's status, such as how long the employee has been in the current status, the employee's log-in time, the employee's device (indicated as p1001, which is a correlation object that correlates the employee to a physical device where he is handling interactions), and the employee's availability to handle interactions from other work sources.

Figure 9A:
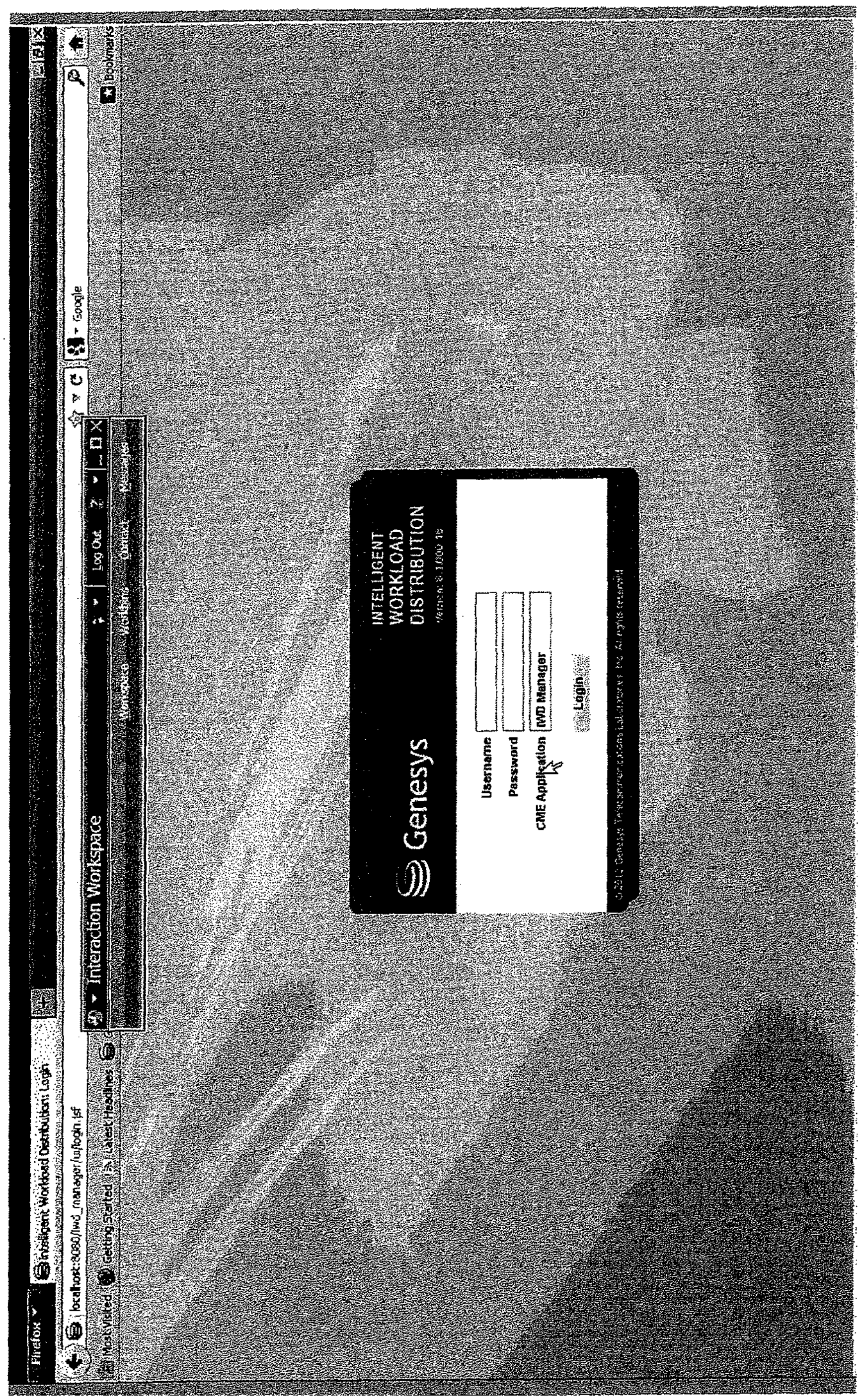
FIGS. 9A-9I are screen shots of the iWD manager/server of FIG. 2 according to an embodiment of the present invention.

FIGS. 9A-9I are screen shots of the iWD manager/server 146 of FIG. 2 according to an embodiment. FIG. 9A is a login screen 500 presented to an employee. As shown, the iWD manager/server 146 may be accessed using a Web-based interface. Once an employee is logged in, depending on the employee's permissions the employee may be able to access all or parts of the user interface 502 shown in FIG.

Figure 9B:
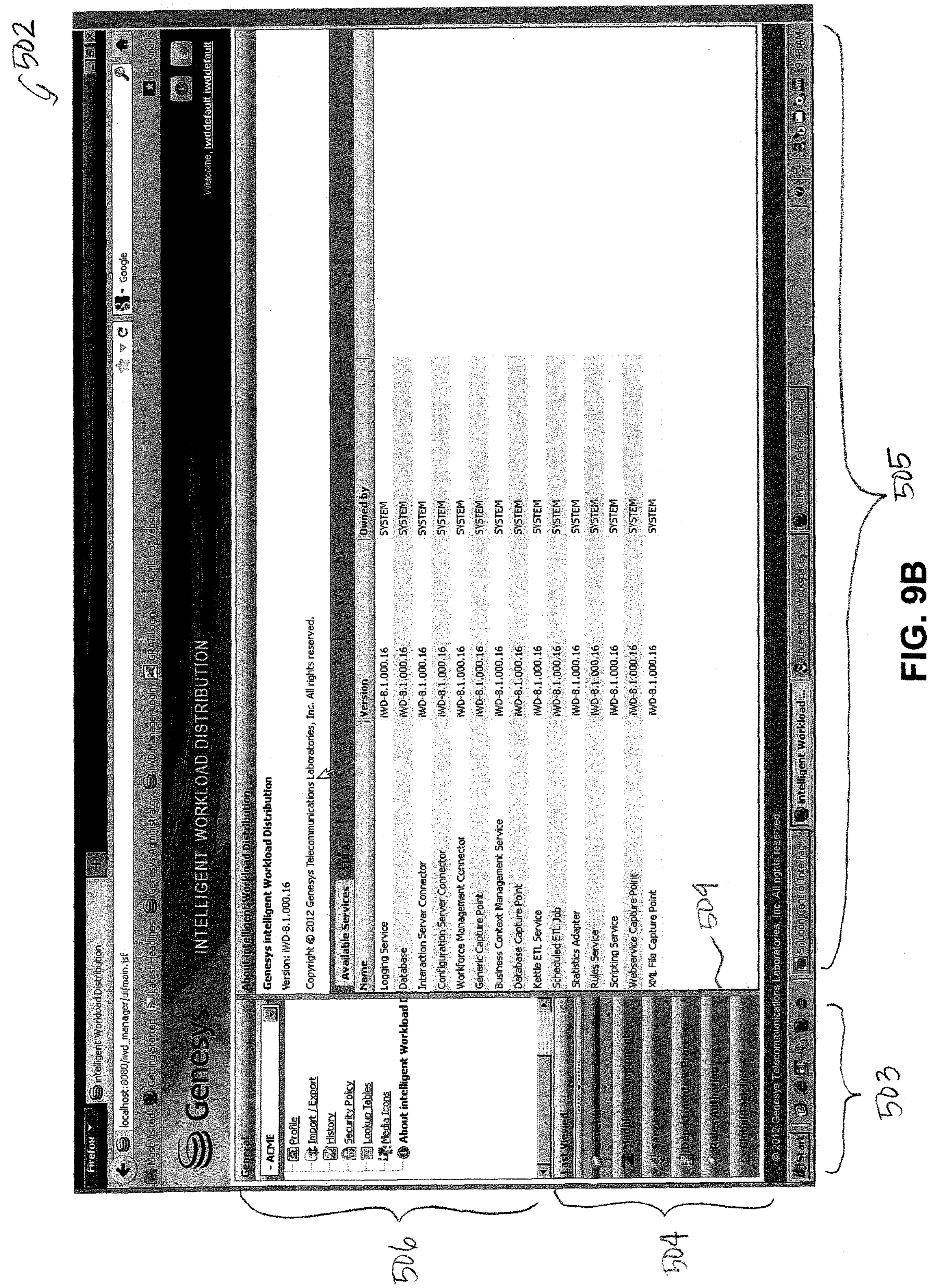

9B. For example, an employee in a particular department may only be able to access tasks assigned to their department. As shown in FIG. 9B, the user interface 502 may be presented as a window split between two window panes. The left window pane 503 includes a control panel 504 of options including "General," "Modules & Components," "Services," "Department and Processes," "Rules Authoring" and "Global Task List," and a navigation panel 506 showing a navigation hierarchy or tree of menus corresponding to the selected option from the control panel 504. The right window pane 505 includes a details view showing information associated with the selected option. In FIG. 9B, for example, the "General" option is selected in the control panel 504 and in the navigation panel 506 the name of the enterprise, in this case "ACME," is selected in the drop down menu.

Aspects of embodiments of the present invention also provide SSO between the iWD manager/server 146 and the rules authoring tool 170 of FIG. 2. For example, referring to FIG. 9B, a user may click on the Rules Authoring icon 509 in the control panel 504 to sign on to a rules authoring tool such as the one described below with reference to FIGS. 15B-15R and 16A-16I. In exemplary embodiments, the Rules Authoring icon 509 acts as a link to the rules authoring tool. The configuration database 148 may be used to authenticate users trying to log into the iWD manager/server and rules authoring tool. End users may use both the iWD manager/server and rules authoring tool via a web browser over a Hypertext Transfer Protocol (HTTP). In one embodiment, a first iteration of the SSO implementation is based on a GRS approach. The GRS expects that the login and password will be passed via an HTTP GET method.

Figure 17:
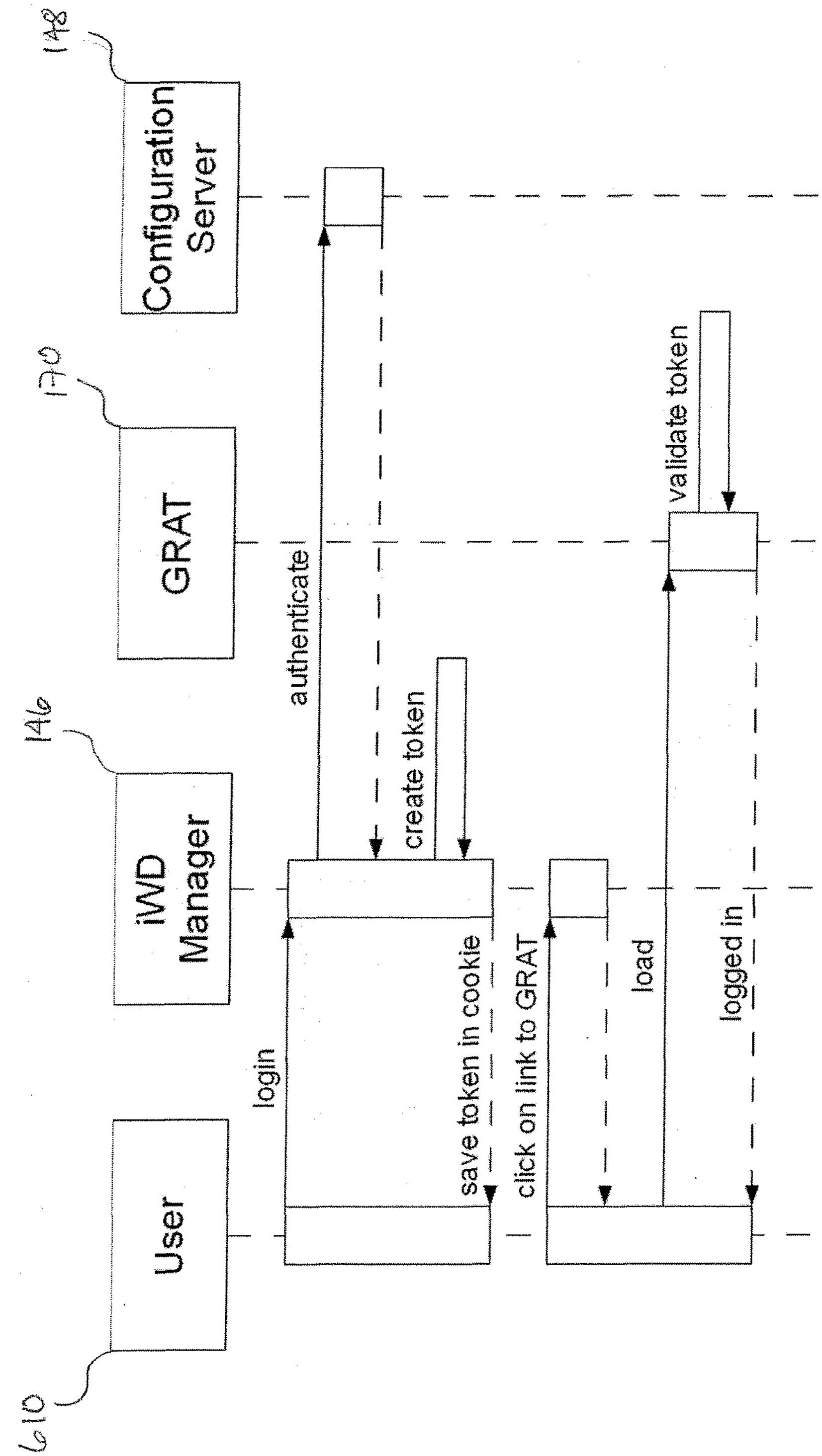
FIG. 17 is a diagram illustrating a first use of single sign-on (SSO) by a user according to an embodiment of the present invention.

FIG. 17 is a diagram illustrating a first use of SSO by a user according to an embodiment of the present invention. The diagram is an SSO sequence diagram desired by iWD in a second iteration of the SSO implementation. A user 610 attempts to log in to the iWD manager/server 146, which authenticates the user 610 against data stored in the configuration database 148. When the iWD manager/server 146 receives a positive response from the configuration database 148, it creates a token that is based on user-specific data and stores the token in a database. Next, the iWD manager/server 146 responds to the user 610 with a logged-in communication and stores a user name and the token in a cookie on the user's computer. The user 610 may then click on the Rules Authoring icon 509 in the iWD manager/server user interface depicted in FIG. 9B to link to the rules authoring tool. The user 610 is then redirected to the rules authoring tool user interface. The rules authoring tool looks for a cookie with the user name and token, and then validates the token. If validation is successful the user 610 is not prompted to log in. In each subsequent use of SSO by the user 610, there is no need to create a new token. Instead, a lookup is performed to search for the token in the database.

Figure 9C:
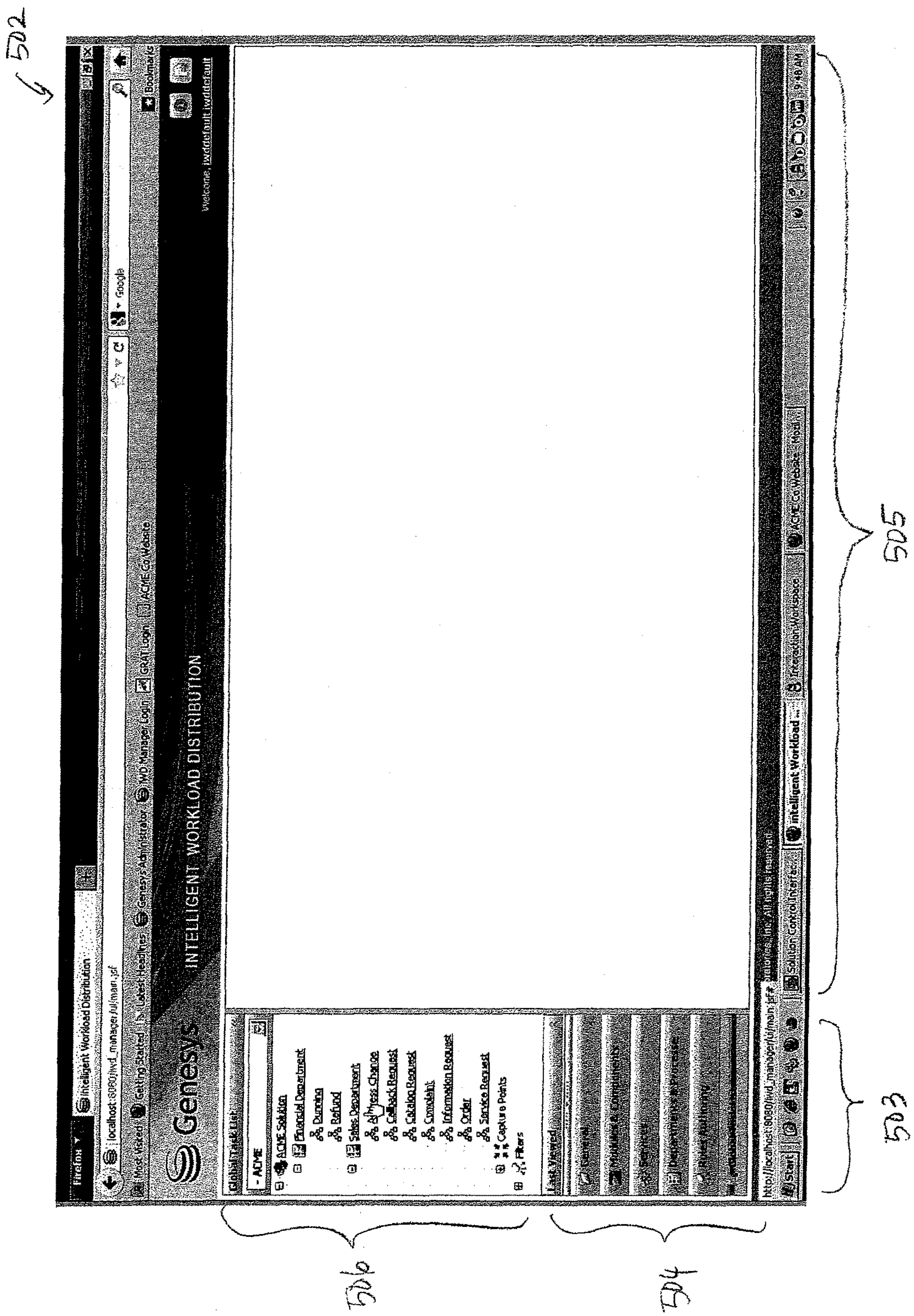

In FIG. 9C, the "Global Task List" option is selected in the control panel 504. The navigation panel 506 reflects the hierarchy of menus corresponding to the GTL. The menus are organized by department and request type. For example, the Financial Department has a list of categories organized by request type, including Dunning and Refund. The Sales Department has a list of categories organized by request type, including Address Change, Callback Request, Catalog Request, Complaint, Information Request, Order, and Service Request.

Figure 9D:
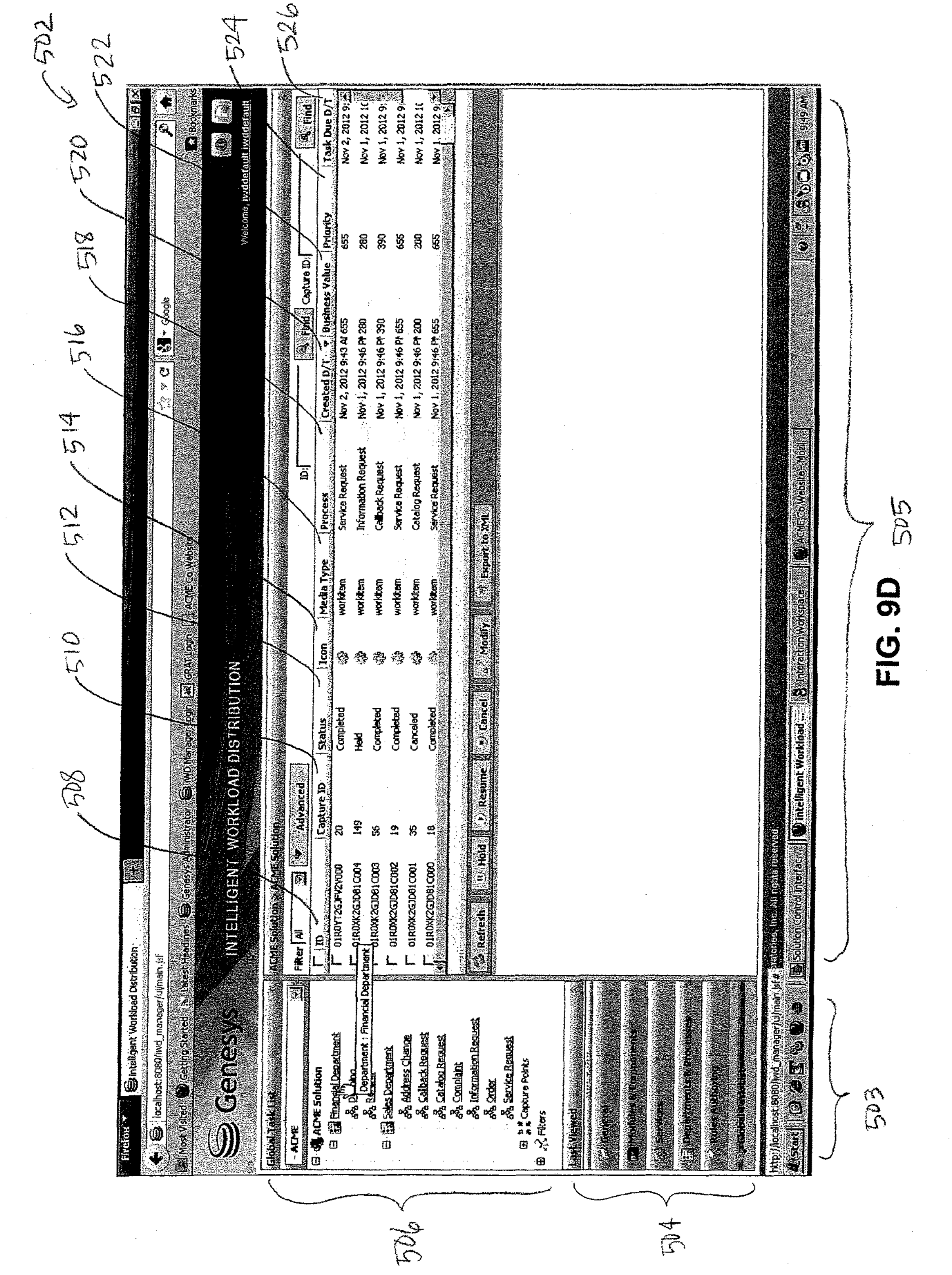

In FIG. 9D, the Sales Department has been selected. A list of all work items for the Sales Department is displayed in the upper section of the right window pane 505. Other detailed information about the work items is displayed in columns 508 to 526, including the work item ID in column 508; Capture ID in column 510; Status in column 512; Icon in column 514; Media Type in column 516; Process in column 518; Created Date and Time (D/T) in column 520; Business Value in column 522; Priority in column 524; and Task Due D/T in column 526.

According to an embodiment, the work item ID in column 508 is the ID generated by the interaction server 40, and the Capture ID may be set by the enterprise or imported from an enterprise work source such as the CRM System 172, BPM System 174, Workflow System 176, Document Management System 178 or Fax Server 180 shown in FIG. 2. The Status in column 512 is the status of the work item. For example, a work item may be designated as "Completed," "Held," "Queued," or "Canceled." The work item shown in FIG. 9E has a status of "Completed" and is therefore in the iWD Completed queue as shown in the Attributes section. A "Queued" status indicates that the work item is in a backlog queue and is waiting to be assigned. The Icon in column 514 is a visual indicator of what the work item represents. For example, a fax icon may be used for an incoming fax. The Media Type in column 516 displays graphically or otherwise, a media type to which the interaction relates (e.g. email, social messaging, chat, etc.). The process listed in column 518 is the business process to which the work item relates. According to an embodiment, the enterprise defines the organizational hierarchy of its business processes. The Created D/T in column 520 indicates the date the work item was created by the interaction server. According to an embodiment, the Business Value in column 522 and the Priority in column 524 are numeric values assigned to the work items by the business users of the enterprise. The Task Due D/T in column 526 may be a date set by a business user or a date set by the task originating system (TOS), i.e., the work source where the task originated.

Figure 9E:
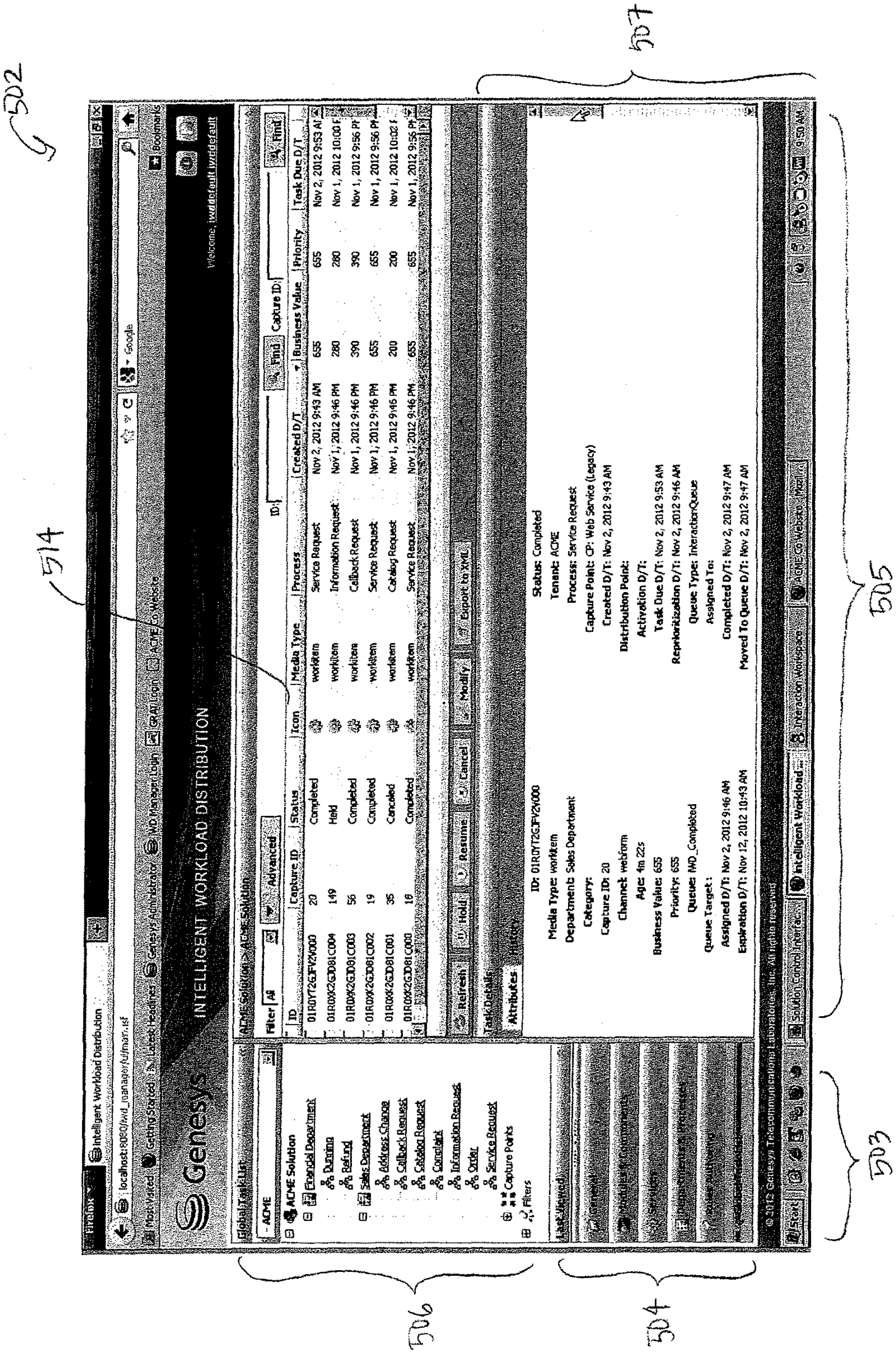
Figure 9F:
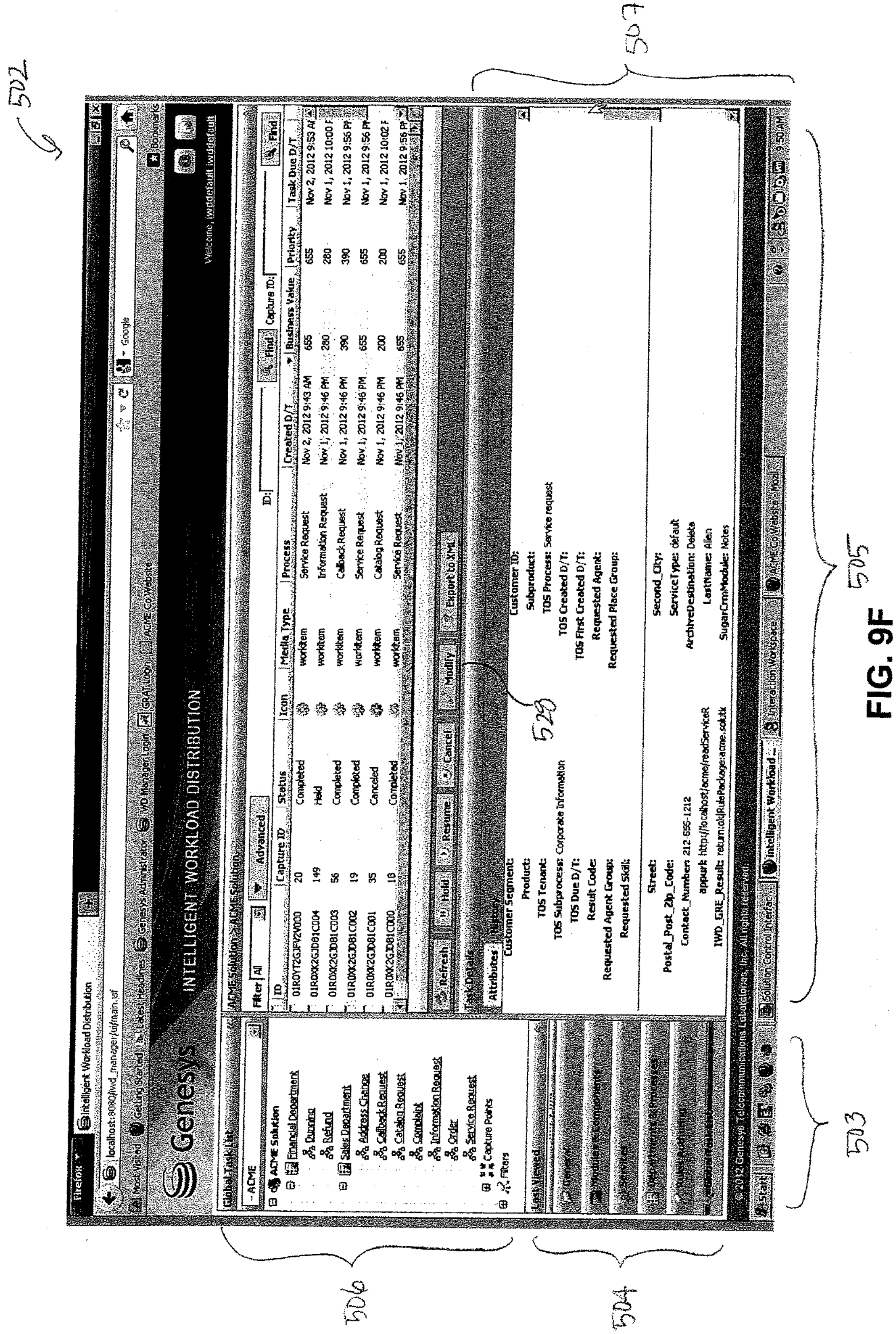

When a particular task is selected, as shown in FIGS. 9E and 9F, detailed information about the task is displayed in the Attributes tab of the Task Details Section 507 located in the lower section of the right window pane 505. For example, the Attributes section may show information from third party systems such as the TOS. The Attributes fields may also be customized to include the end user's input data, for example the end user's contact number as shown in FIG. 9F. Accordingly, the information provided in the Attributes section gives context to the business user reviewing the task.

According to another aspect, a business user (e.g., a manager) can add or modify Attributes fields in order prioritize work items based on the enterprise's specific business requirements. A user reviewing a work item and having the appropriate permissions may modify the Attributes information by selecting the "Modify" icon 528 above the Task Details Section 507 shown in FIG. 9F. For example, an enterprise user could create an Attributes field called "Customer Segment" to input information indicating that a particular customer is in the Gold Customer Segment. The business user could then configure a business rule that when a customer is in the Gold Customer Segment, the customer must receive a response within 10 minutes.

Figure 9G:
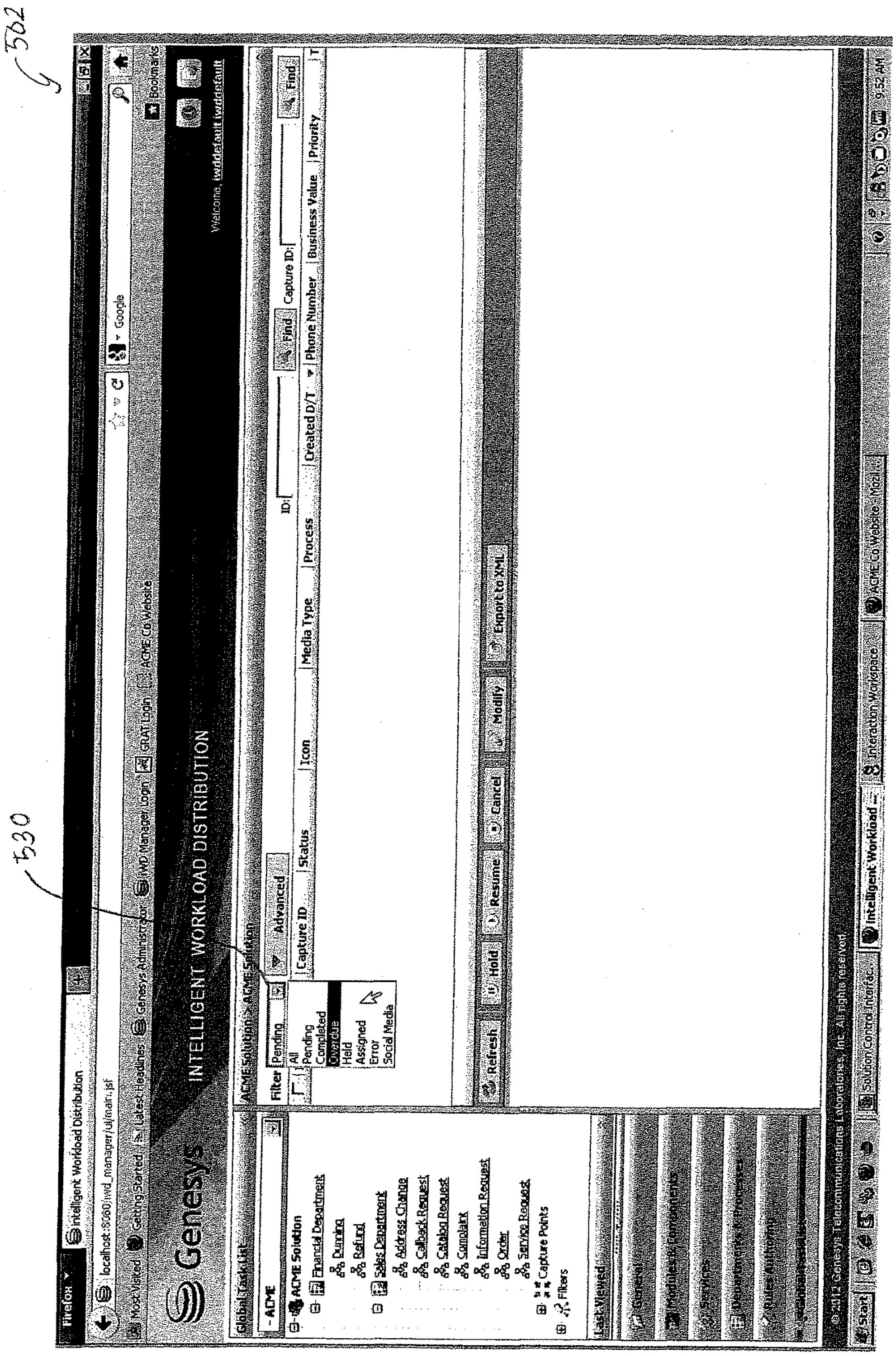
Figure 9H:
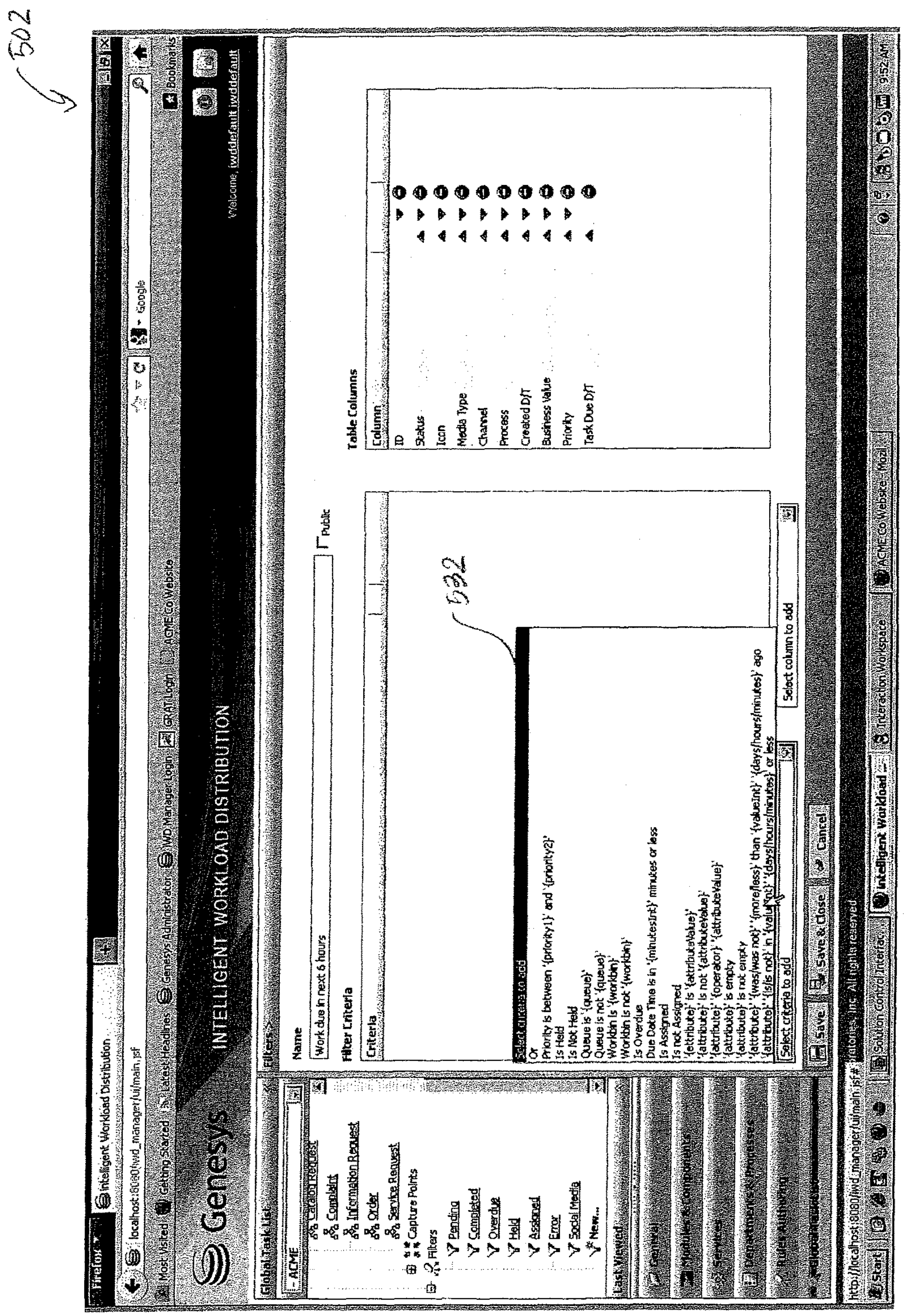
Figure 9I:
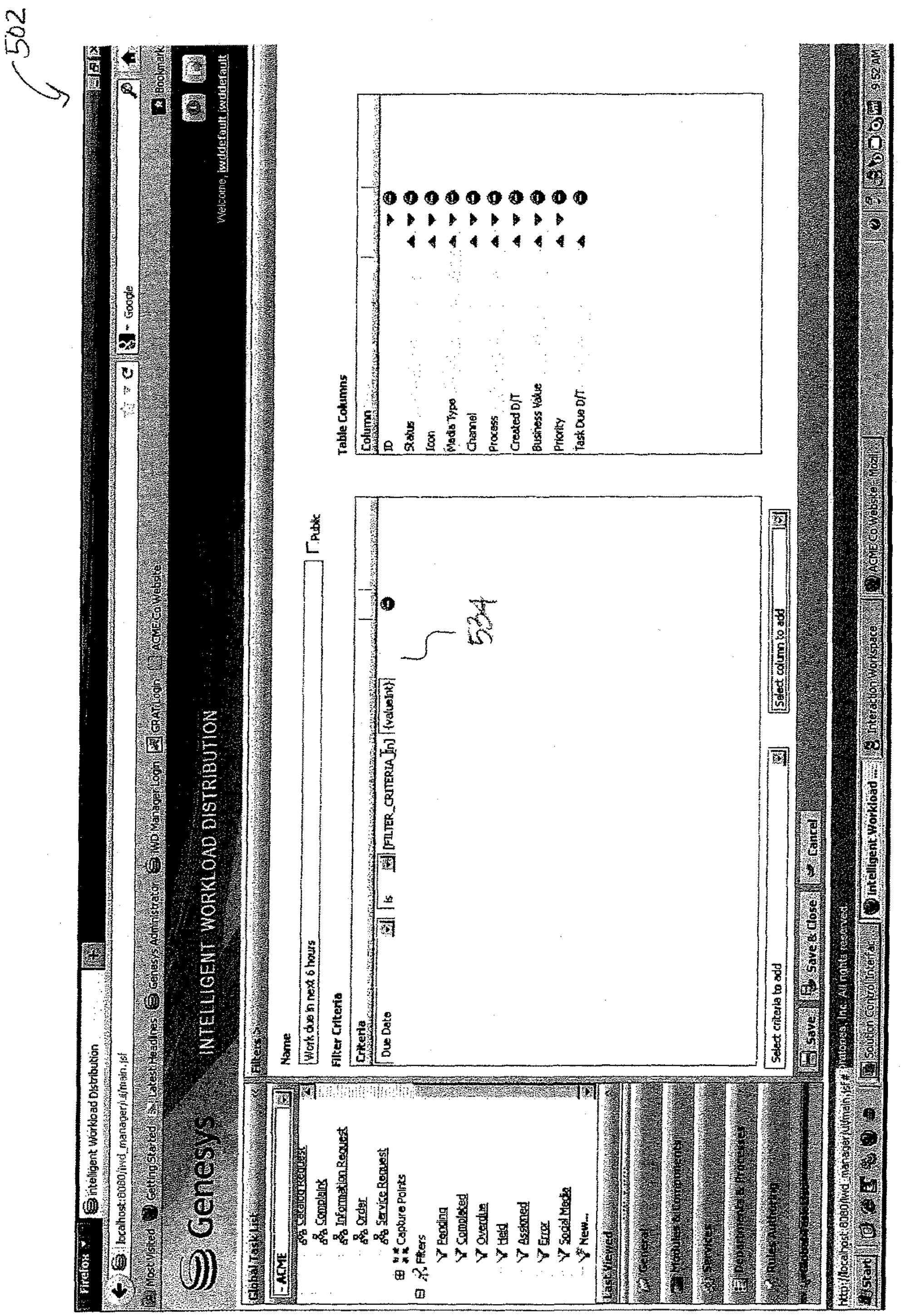

In an exemplary embodiment, a business user can apply a filter to the list of work items appearing in the right window pane 505. In FIG. 9G, the drop-down list of filters 530 permits the user display only Pending, Completed, Overdue, Held, or Assigned work items, work items that are placed into an Error queue or status based on some predefined business logic, or work items captured form Social Media work sources. However, embodiments of the present invention are not limited thereto, and an enterprise user may create new filters or modify existing filters using the Filters in the navigation panel 506. For example, FIGS. 9H-9I depict the creation of a new filter named "Work due in next 6 hours." The enterprise user selects from a drop-down list of filter criteria 532 to add to the filter. In FIG. 91, the criteria "Due Date" has been selected and the business user assigns parameters defining the filter. The use of drop-down lists and specified input variables reduces the risk of user input error and increases the chances that the filter will be implemented successfully. For example, as shown in FIG. 9I, the user may only enter an integer into the field 534. Once the filter parameters have been specified, the enterprise use may save the filter by clicking on the "Save" or "Save & Close" icon. Accordingly, a business user can use the dynamic, constantly shifting GTL view to assess workload distribution and productivity on an inter-day basis.

Figure 10:
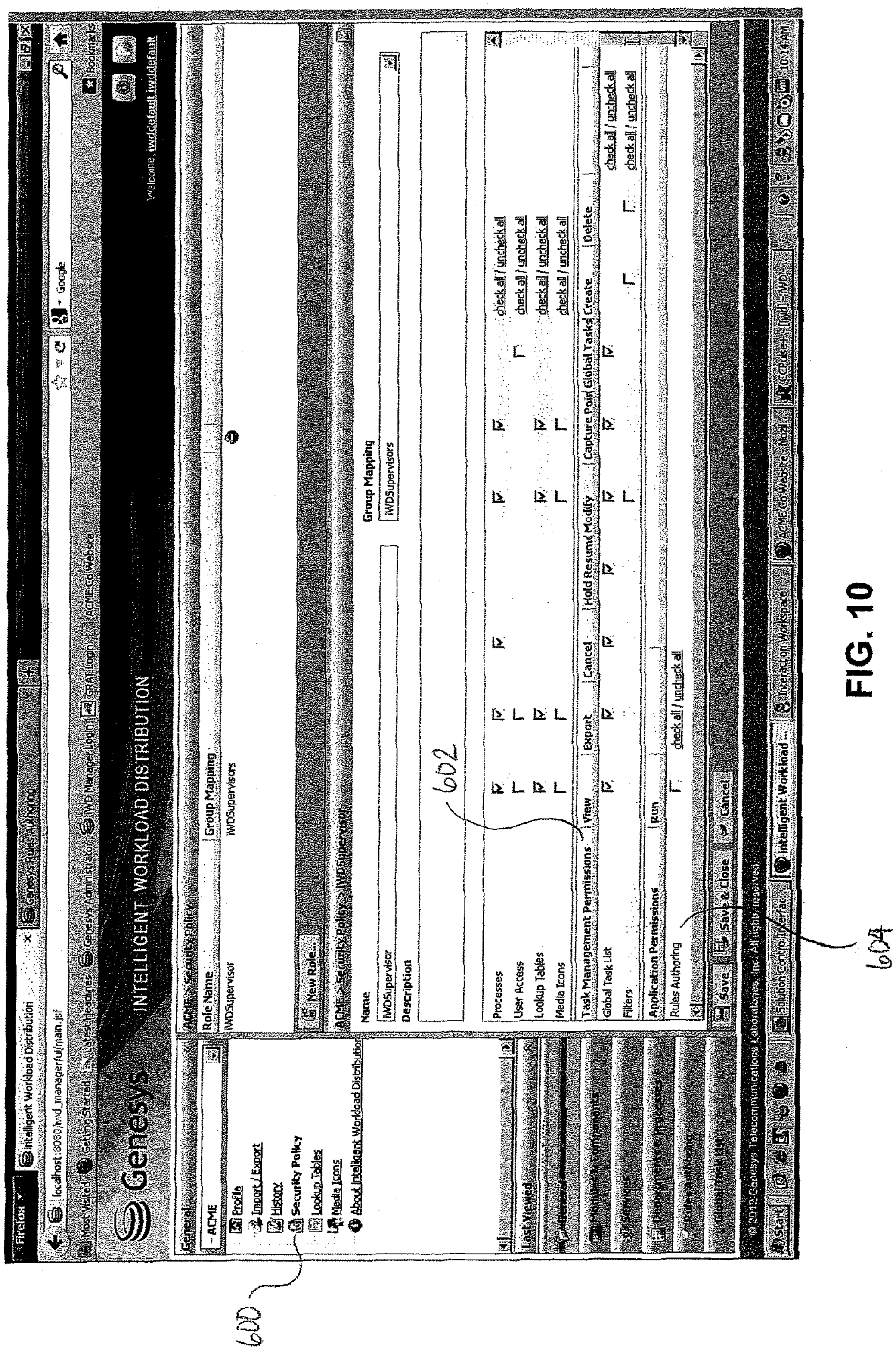
FIG. 10 is a screen shot of a security policy tool that allows customization of employees' permissions according to an embodiment of the present invention.

According to some embodiments of the present invention, an enterprise can set its security policy so that not all enterprise employees will have equal permission to author rules. For example, as shown in FIG. 10, a security policy tool 600 allows customization of certain employees' permissions. In FIG. 10, a business user having the role of "iWDSupervisor" may have full access to the GTL as shown in the Task Management Permissions Section 602 where the boxes are all checked, but may not have the ability to access the Rules Authoring Tool as shown in the Application Permissions Section 604, where the box is unchecked.

According to yet another aspect of the present invention, the detailed task information in the Attributes section may be provided to the rules system 44 to drive the prioritization and re-prioritization of work items. FIGS. 11A-11D depict a flowchart of the various states that tasks may assume during their life cycles according to an embodiment.

Figure 11A:
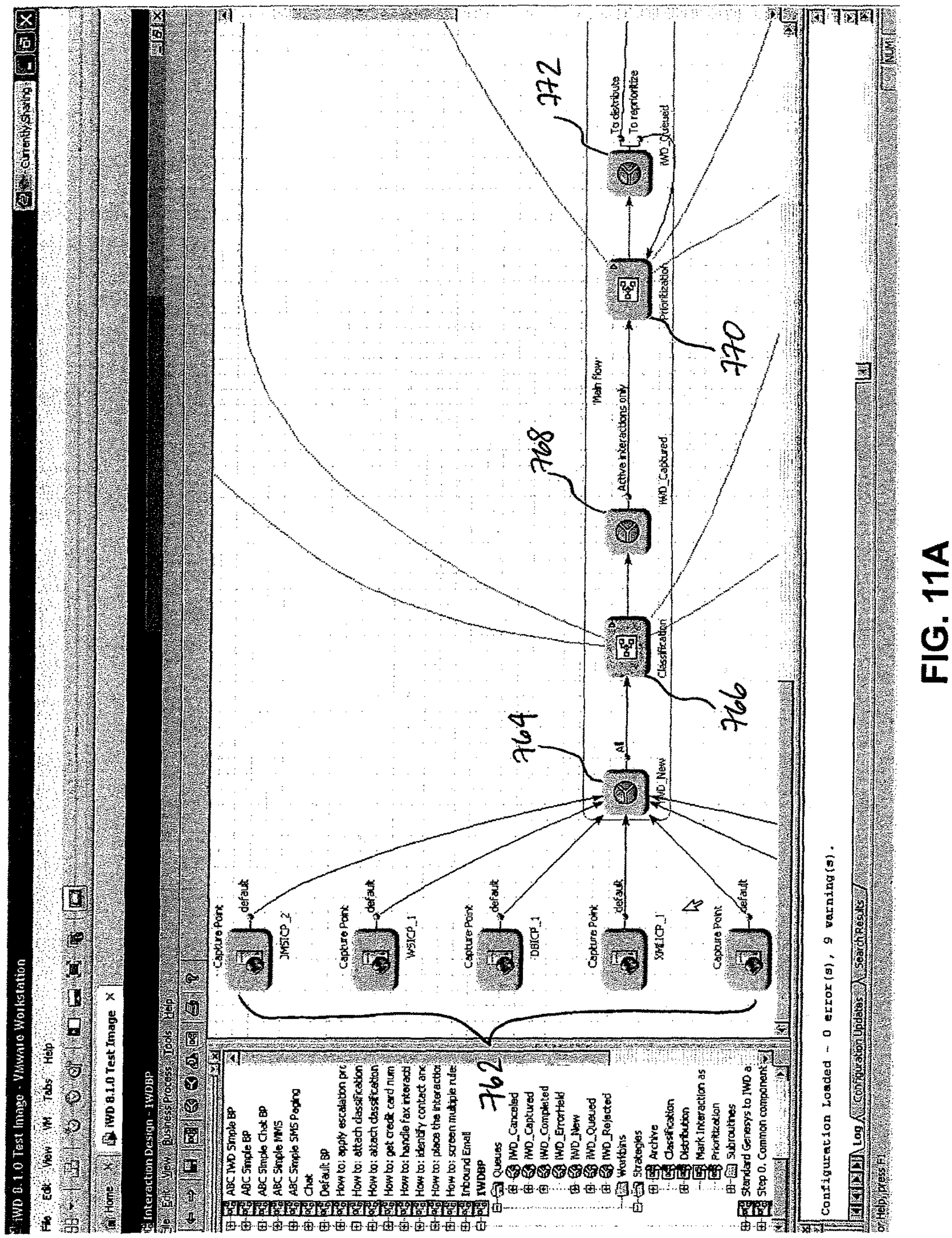
FIGS. 11A-11D depict a flowchart of the various states that tasks may assume during their life cycles, according to an embodiment of the present invention.
Figure 11B:
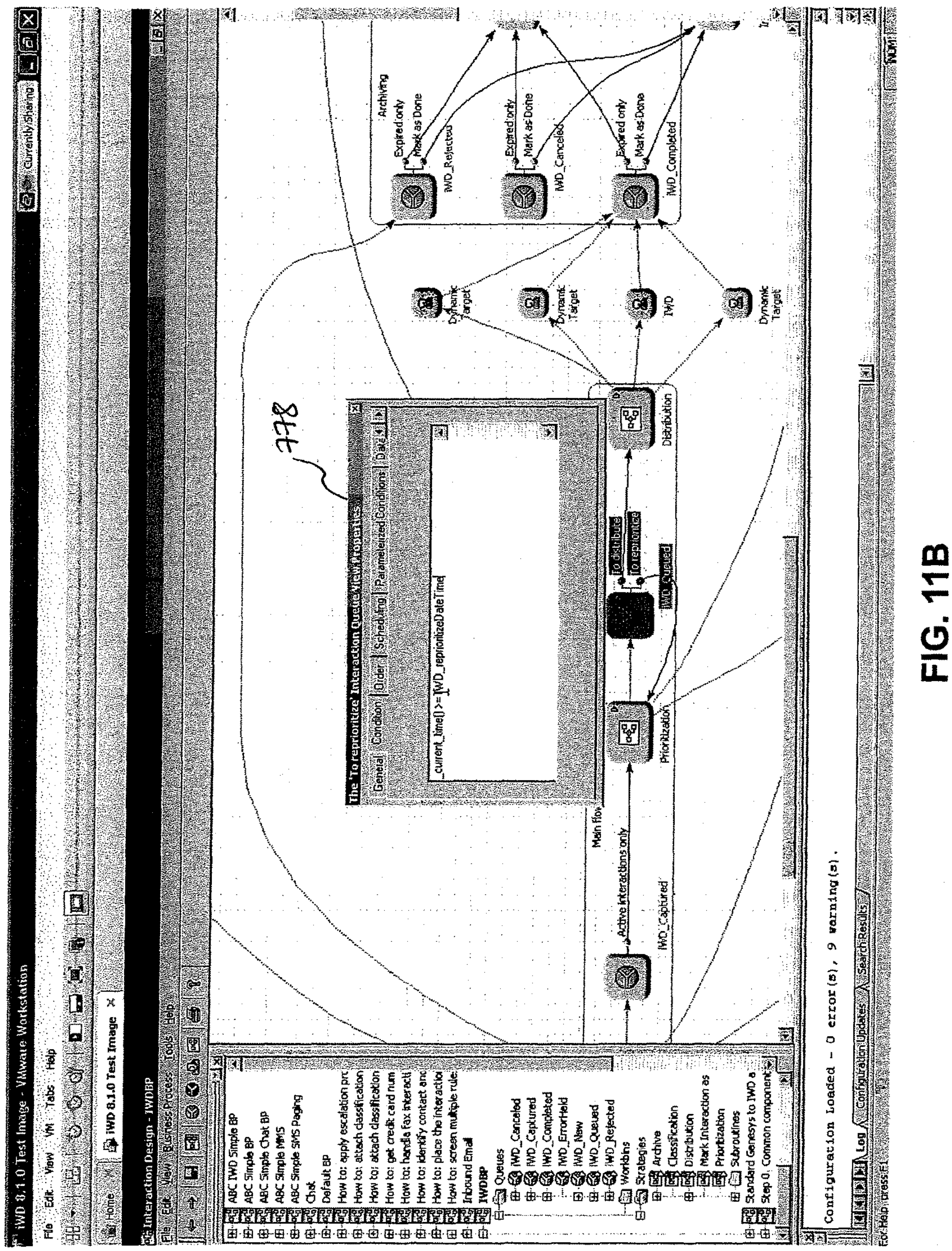

First, as shown in state 762 of FIG. 11A, interactions are captured at capture points, which may include multiple work sources. In state 764, the interactions are designated as new tasks. The tasks then move to the Classification state 766, during which the rules system 44 is invoked to classify the tasks according to business process, department, priority, or any other criteria specified by the rules system 44. The tasks are then designated as Captured in state 768, and move on the Prioritization state 770 where the rules system 44 may again be invoked to apply additional business rules to the task. After Prioritization in state 770, the tasks are placed in a Queued state 772. There may be millions of interactions in the Queued state 772 waiting to be distributed or reprioritized.

If the tasks are not distributed, they are re-submitted back to the rules engine 164 for re-prioritization. Re-prioritization involves the application of user-defined conditions to the tasks in the iWD_Queued state. The timing of the re-prioritization may be determined by the business user. In the example illustrated in FIG. 11B, the business user has set a specific re-prioritization date and time. The interaction server checks to see whether the re-prioritization date and time has passed, by applying the statement shown in window 778 to the tasks. When the variable_current_time( ) is equivalent to the iWD_reprioritizeDateTime, the task will be sent back to the Prioritization state 770 for re-prioritization. However, embodiments of the present invention are not limited thereto, and other conditions could be used to determine when to reprioritize a task. For instance, the business user could set a condition that only tasks due within the next two weeks are to be re-prioritized. Such conditions prevent the rules engine 146 from becoming overly burdened or bogged down by the high volume of tasks in the iWD_Queued state.

Figure 11C:
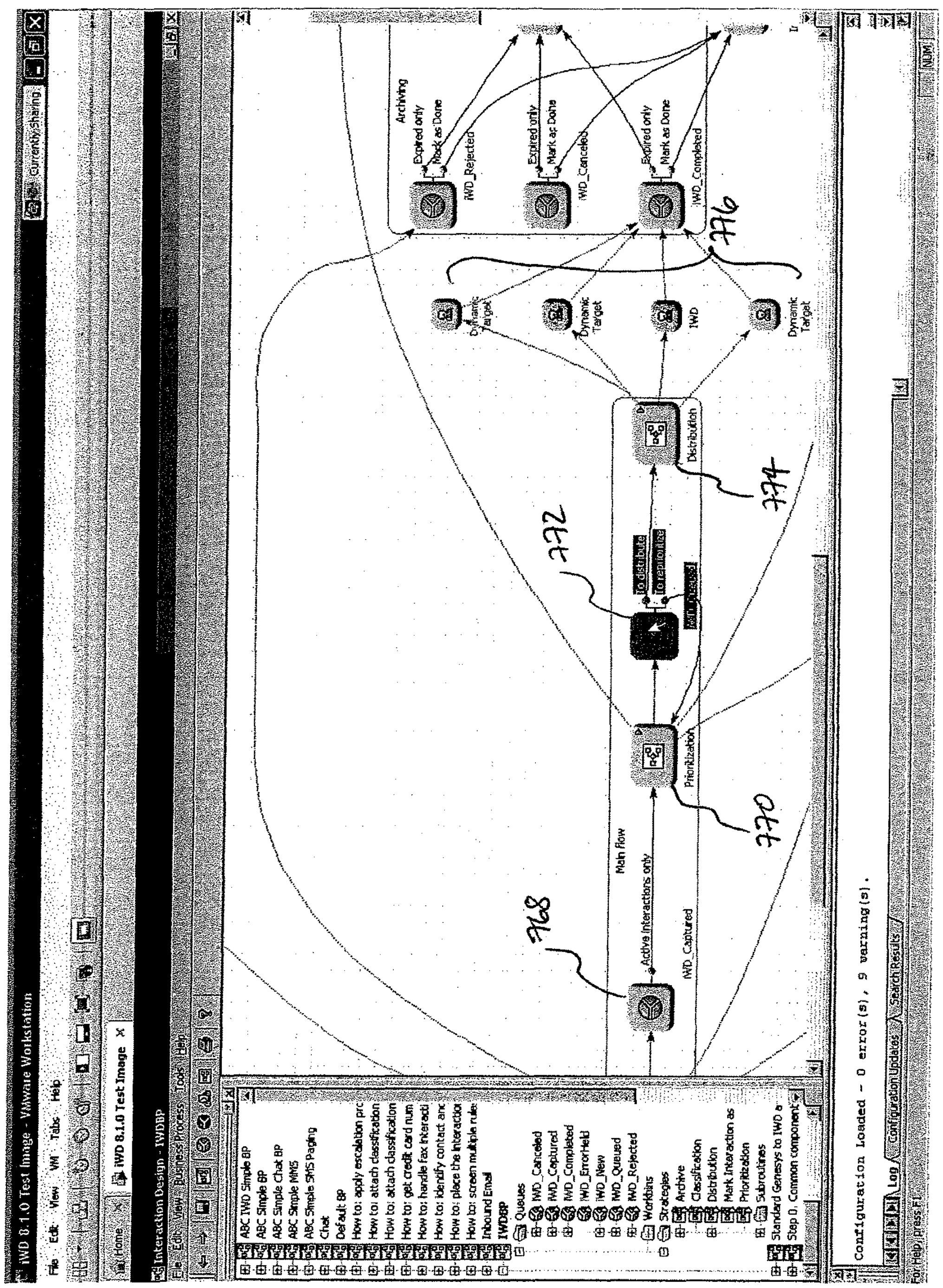
Figure 11D:
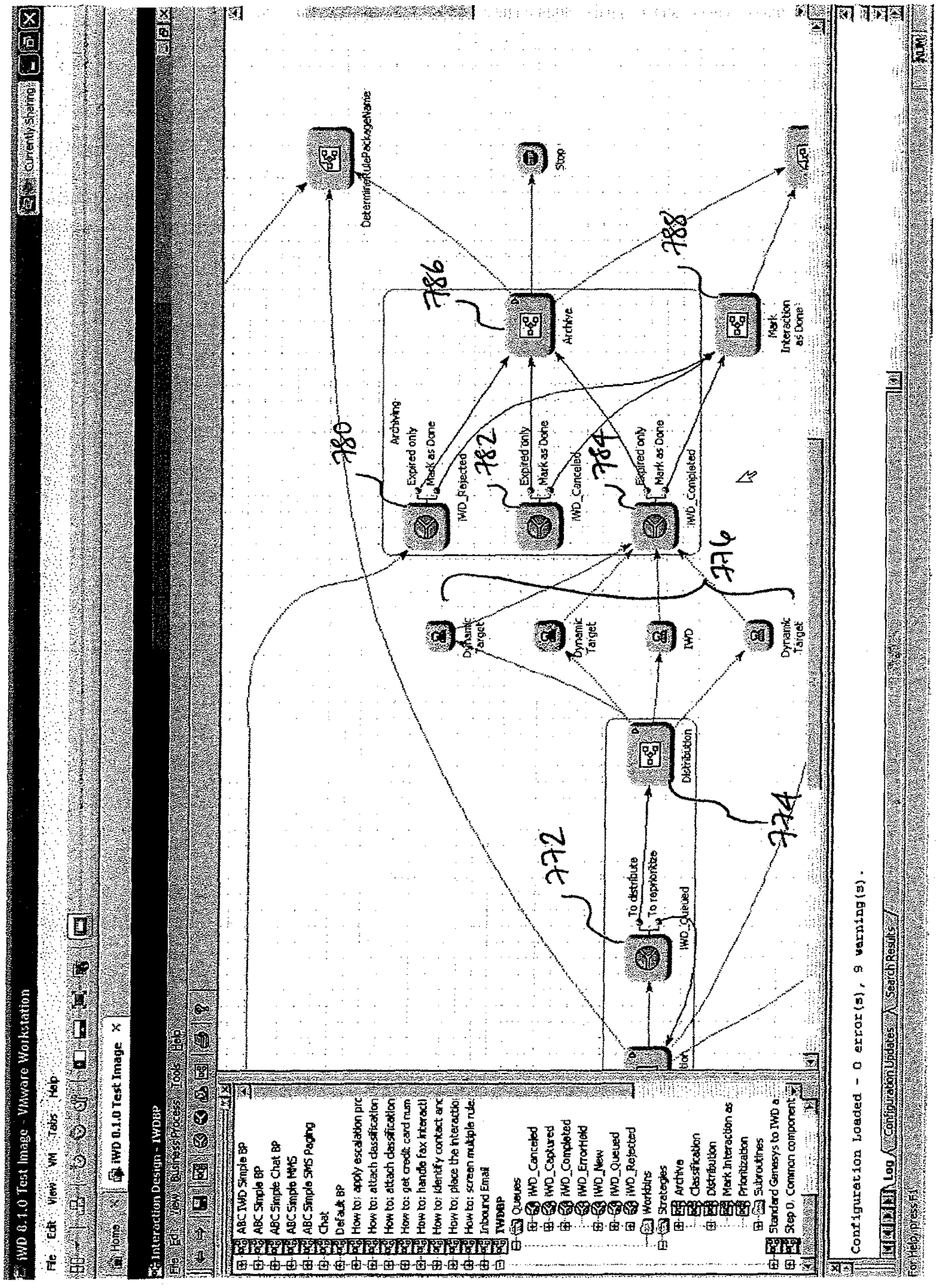

If the tasks are ready to be distributed, as shown in FIG. 11C, the tasks are moved to a Distribution state 774 to be sent to various Dynamic Targets in state 776. According to exemplary embodiments, tasks are processed for long-term task archiving. For example, as shown in FIG. 11D, when a task meets certain archiving criteria (for example, the task is in one of three queues—iWD_Rejected 780, iWD_Canceled 782, or iWD_Completed 784—and the task's expiration date is in the past), it is possible based on business rules from the rules system 44 to store the task in Archive 786. Once the task is archived, a user may configure, through business rules from the rules system 44, a task archiving period after which archived tasks and their associated events are automatically purged. If a task is in one of the three queues (iWD_Rejected 780, iWD_Canceled 782, or iWD_Completed 784) and the expiration date has not passed, the task is marked as Done in state 788. Tasks that are not in one of the three queues (iWD_Rejected 780, iWD_Canceled 782, or iWD_Completed 784), i.e., non-"archive" tasks, are treated as "current" tasks. In one embodiment, the GTL includes two predefined filters, one for viewing "current" interactions and a second for viewing "archive" interactions.

In one embodiment, a performance guide table of data may be provided to enterprises containing parameters for the duration of time data can be kept archived, given the number of tasks and events currently being stored. Enterprises can set up a rule to purge their archived data based on the performance guide table of data.

According to embodiments of the present invention, when an enterprise receives an interaction, not only should the interaction be routed to the appropriate department for handling, but there may also be additional business requirements (e.g., temporary requirements) for handling the interaction. For example, the enterprise may want to present certain advertising offers to a particular end user based on that end user's income level. The enterprise may also want to route certain interactions to a special 24-hour service department depending on the customer's segment (e.g., a gold, silver, or bronze segment customer). Such business requirements are specific to the particular enterprise. According to an embodiment, the interaction server calls on the rules system 44 to help meet these additional business requirements. The rules system may assign rules that can be applied at various levels of a business hierarchy in the iWD system, for example at the solutions, departments, processes, and capture points levels.

Rules System

Figure 12:
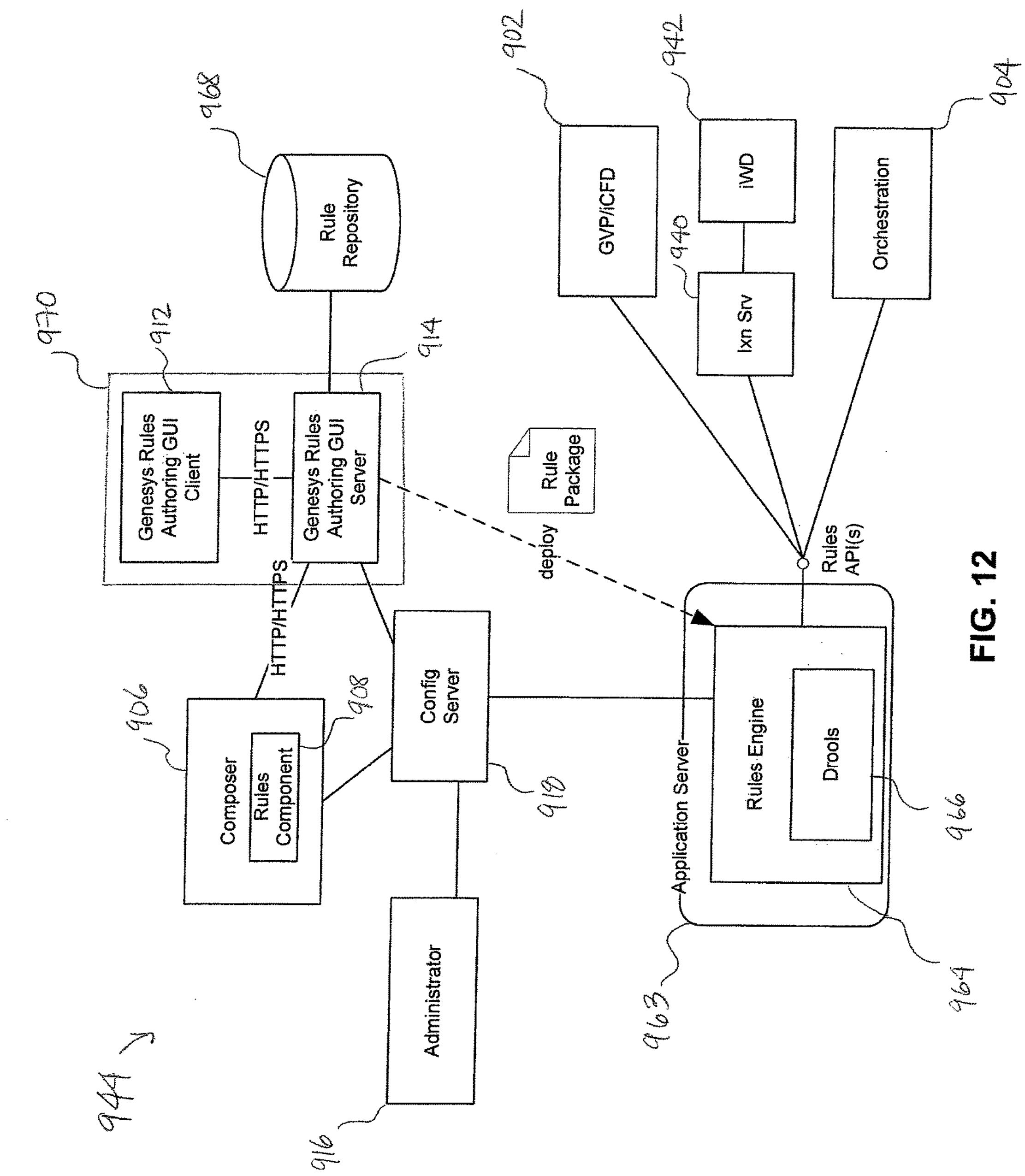
FIG. 12 is a schematic block diagram showing high level architecture of a rules system (referred to as GRS) and client applications of the rules system, according to an embodiment of the present invention.

FIG. 12 is a schematic block diagram showing high level architecture of a rules system and client applications of the rules system, according to an embodiment of the present invention. Rules system 944 may be similar to rules system 44 of FIGS. 1 and 2. Various client applications, such as an automated voice response system 902, iWD system 942, interaction server 940, orchestration/routing server 904, may call on the rules system 944 for applying any rules that may be applicable for a current interaction. In one embodiment, the iWD system 942 has a business context management service that acts as a layer between the interaction server 940 and/or orchestration/routing server 904, and the rules engine 964. When an interaction comes in, the business context management service adds iWD-specific data and passes the requested to the rules engine 964. The rules engine 964 responds to the business context management service with the processed interaction and the business context management service sends the processed interaction back to the interaction server 940 and/or orchestration/routing server 904. The interaction server 940, orchestration/routing server 904, and rules system 944 may be similar to the interaction server 40, routing server 20, and rules system 44 of FIGS. 1 and 2.

Figure 13:
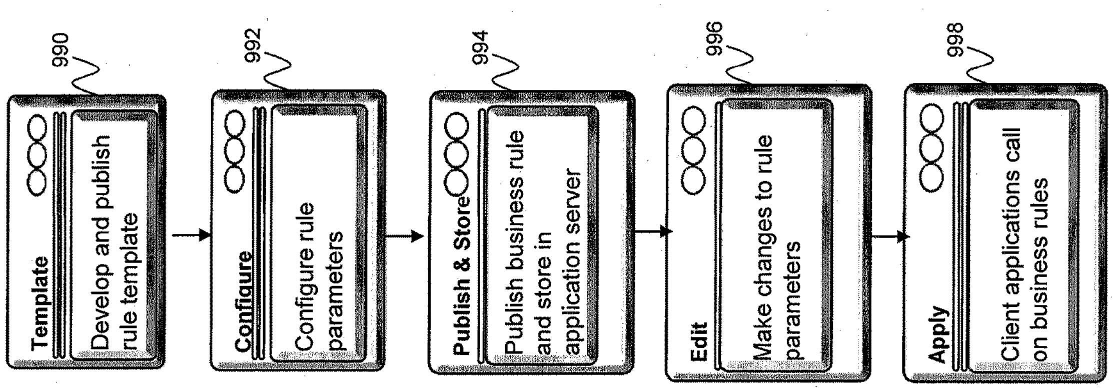
FIG. 13 is a flow chart of a process of creating a business template and a business rule according to an embodiment of the present invention.

FIG. 13 is a flow chart of a process of creating a business template and a business rule according to an embodiment of the present invention. The process may be described in terms of a software routine executed by one or more processors based on computer program instructions stored in memory. A person of skill in the art should recognize, however, that the process may be executed via hardware, firmware, or a combination of software, firmware, and/or hardware. Furthermore, the sequence of steps of the process is not fixed, but may be altered into any desired sequence as recognized by a person of skill in the art.

According to an embodiment, in step 990 a technical user develops a template for a business rule using a composer tool 906. According to one embodiment, the composer tool incorporates a rules development tool 908 which a technical user may use to develop templates and publish the templates to a rule repository 968 (FIG. 12). The rules development tool 908 and the rule repository 968 may be similar to the rules development tool 166 and rule repository 168 of FIG. 2.

In step 992 a business user configures parameters of a business rule using a rules authoring tool 970 which may be similar to the rules authoring tool 170 of FIG. 2. According to one embodiment, the rules authoring tool includes a rules authoring client 912 and a rules authoring server 914. In an exemplary embodiment of the present invention, the business user configures the rule parameters according to the enterprise's specific business requirements. As shown in FIG. 12, the rules authoring tool 970 may be a Web-based interface. After configuring the rule parameters (e.g., setting all conditions and actions in the rule template), the business user may publish or deploy the rule (or a rule package) to the rules engine 964 in an application server 963. In this manner, business users may develop rules and routing logic based on their enterprise's business requirements. If an enterprise's business requirements change, the business user changes the logic of rules by modifying, for example, the rule parameters via the rules authoring tool, and publishes the changes to the rules repository 968. Rule parameters may therefore be more easily changed.

After the rule has been published, in step 996 the business user may make changes to the business rule using the rules authoring tool 970. These changes may be made over time. Moreover, additional logic changes can either be published immediately or at a set time, depending on the business user's preference.

In step 998, the business rules stored in the application server 964 are applied when the various client applications (e.g., GVP/ICFD 902, iWD system 942, interaction server 940, orchestration/routing server 904, or any other application written by the customer) call on the rules system 944. For example, multiple rule packages for different aspects of the enterprise's business may reside on the application server 963, servicing requests by different client applications. As used herein, the term "rule package" refers to an executable item deployed to the application server 964, which includes one or more rules, a fact model, and any functions or other items necessary for the package to be a standalone item executable by the rules engine 964. The rules are deployed to the client applications via an application programming interface (API), which in some implementations may utilize Representational State Transfer (REST) or an external service protocol (ESP). The Administrator 916 is an application that is used by system administrators to configure the necessary properties and connections of the various system components such as the rules engine 964, composer tool 906, rules authoring tool 970, and the like.

FIGS. 14A-14F are screen shots illustrating the process of developing a template for a business rule according to an embodiment of the present invention. In one embodiment, each template has several sections for a technical user to program, including actions, conditions, enumerations (enums), fact models, functions, and parameters. A condition may be a "when" expression, for example, "when {due time} is in {x}{time period}." The {due time}, {x}, and {time period} are parameters to be determined by a business user. An action may be a "then" expression, for example, "then assign {priority}." The {priority} is a parameter to be determined by a business user. As such, parameters may be used in both conditions and actions. A function may also be used in conditions and actions to obtain a value. Functions may be written, for example, in Java or Groovy by a technical user.

According to an aspect of the present invention, templates are named collections of parameters, functions, conditions, and actions. Templates provide a natural language interface for creating rules, which allows non-technical business users to more easily understand and create rules. A business user can access templates to select which conditions and actions will be used to create a rule, and the rule may then be used in specific business scenarios.

Figure 14A:
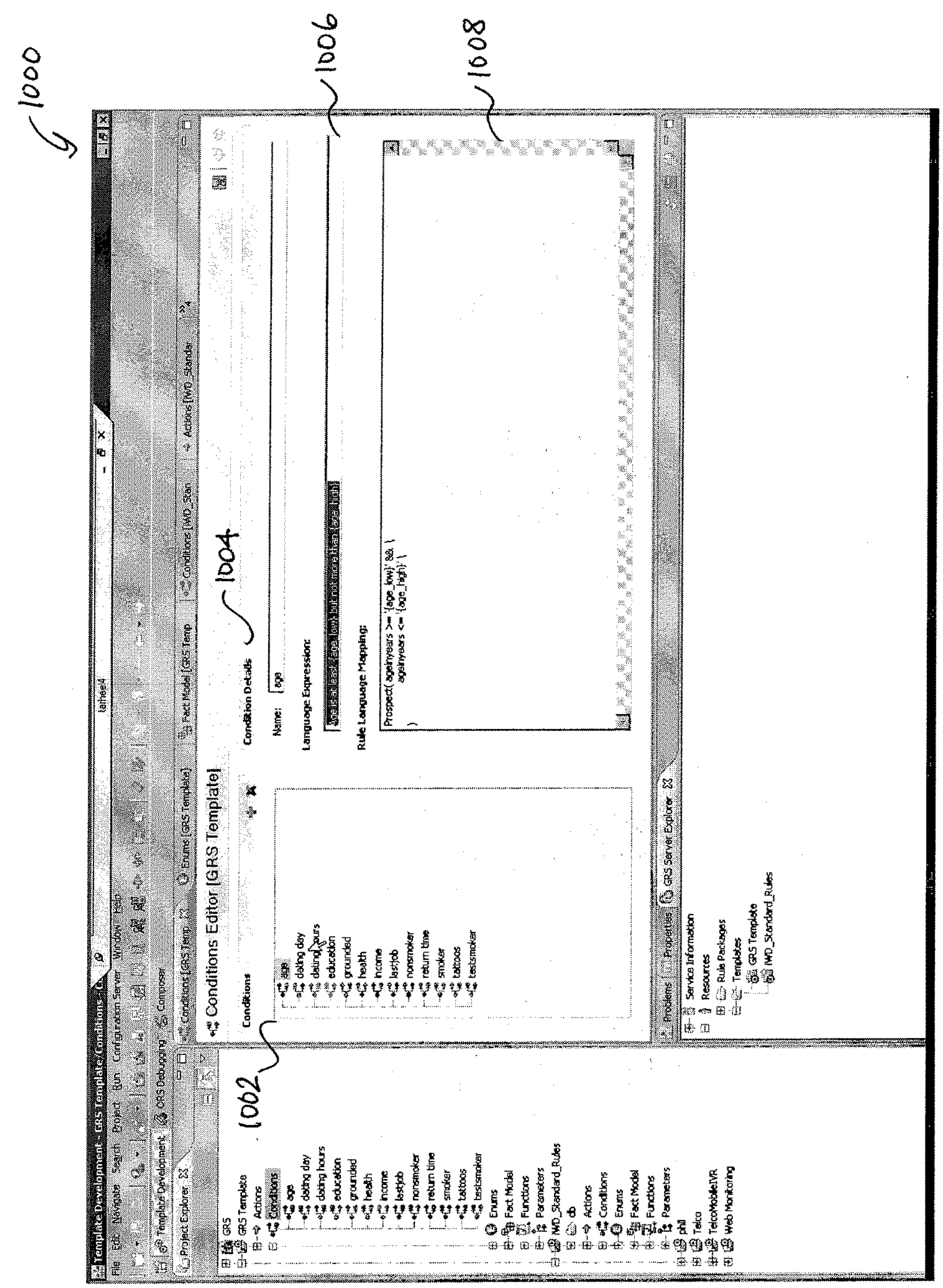
FIGS. 14A-14F are screen shots illustrating the process of developing a template for a business rule according to an embodiment of the present invention.

FIG. 14A depicts the Conditions Editor 1000 of a rules template according to an embodiment. The rule template is titled "Date My Daughter" and is described here for simplicity purposes for describing a template that is generated to allow someone to date one's daughter. Of course, templates for a contact center may allow the generating of rules relating to up-sale, cross-sale, task prioritization, and the like, applicable to the business of the enterprise being supported by the contact center. As shown, a technical user may create a number of Conditions 1002 to be evaluated by the rules engine 964. As shown in the Conditions Details Section 1004, for each condition, the technical user specifies a Language Expression 1006 to be presented to a business user. The Language Expression 1004 identifies parameters (indicated by brackets) to be inputted by the business user, and places limitations on the type of parameter. For example, the parameter type may be an integer or range of integers, a numeric value, a string, a date, a time, or an enumeration selected from a drop-down list of items. Accordingly, the business user will be unable to input an incorrect parameter type, which reduces the incidence of errors when business users are configuring rules. The parameters may also be sourced from the Configuration (Config) Server 918, including, for example, a business attribute, an agent group, an agent list, or a skill group. Parameters may be re-used in different conditions and actions. As part of the template development, the technical user also specifies Rule Language Mapping 1008, which maps the inputted parameters to the variables of an invoked function or Drools 966, an open source business rules management system.

Figure 14B:
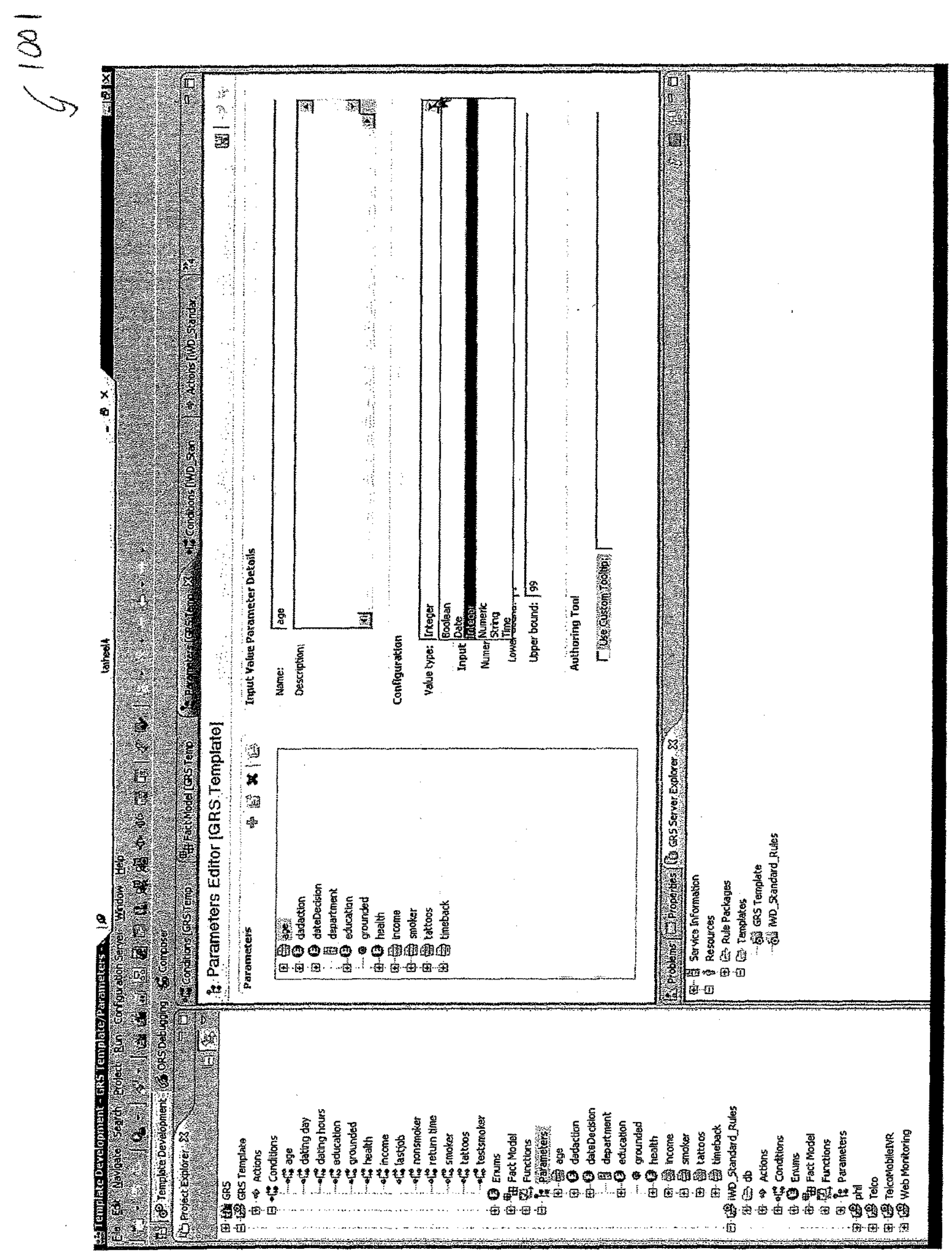
Figure 14C:
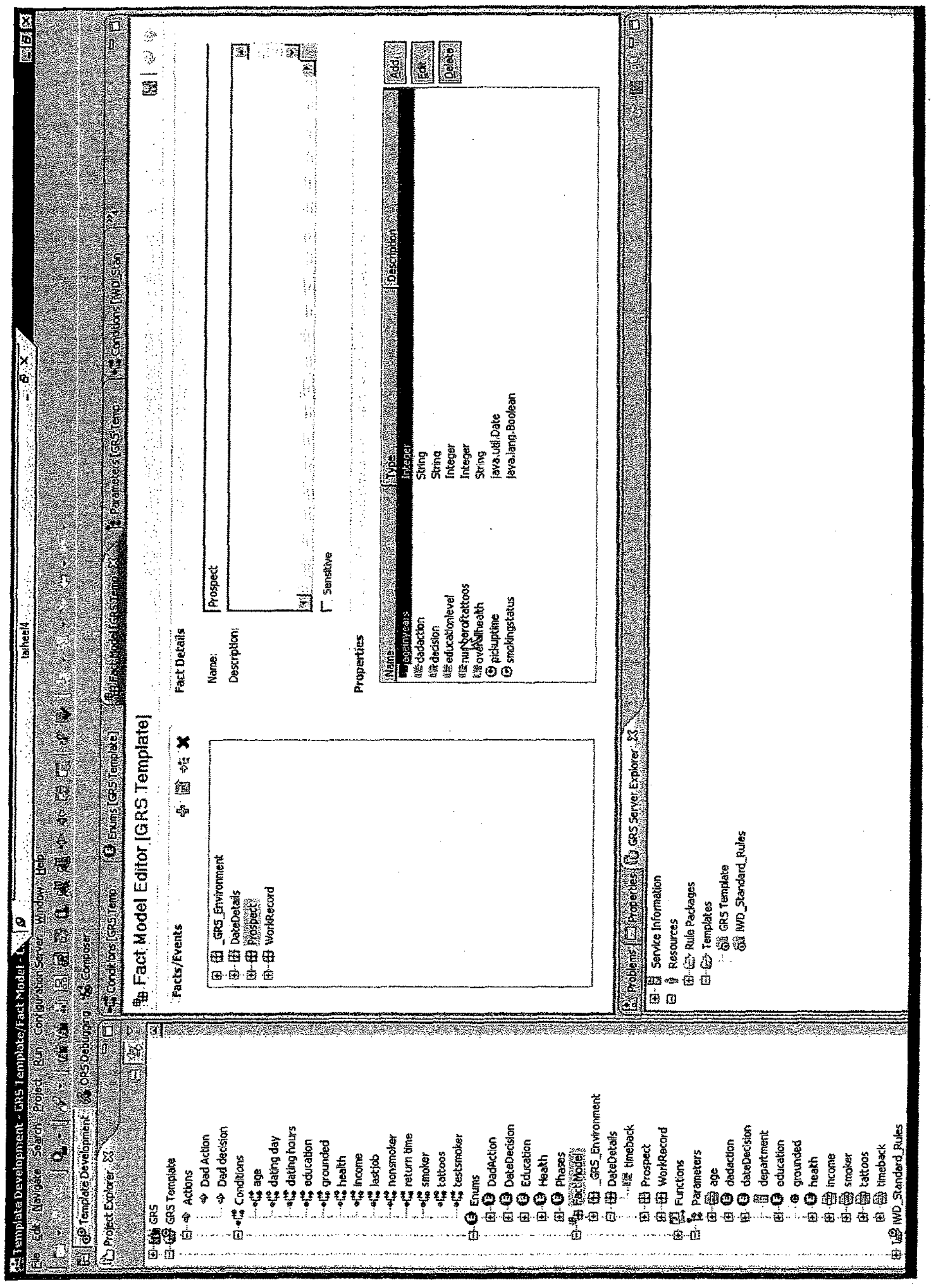

In FIG. 14A, the age condition of the "Date My Daughter" template is expressed in Language Expression 1006 as "Age is at least {age_low} but not more than {age_high}." In the Parameters Editor 1001 of FIG. 14B, the technical user specifies Integer as the Value Type for the parameter. Accordingly, the business user must input only Integer values for the {age_low} and {age_high} parameters. A lower bound and an upper bound for the Integer may also be specified.

As shown in the Rule Language Mapping Section 1008 of FIG. 14A, the Prospect function (also referred to as fact) is invoked to map the {age_low} and {age_high} parameters to the appropriate variables of the function. The Fact Model Editor 1003 of FIG. 14C retrieves data about the interactions database 156 (FIG. 2) through the interaction server, and packages the data into facts (shown in FIG. 14C under Properties), which it sends to the rules engine 964 for comparison with the inputted parameters. The Fact Model Editor 1003 may package the data in XML or JavaScript Object Notation (JSON) string format, for example. Accordingly, a business user may modify business rules using the rules authoring tool 970 without changing the orchestration/routing server 904.

Figure 14D:
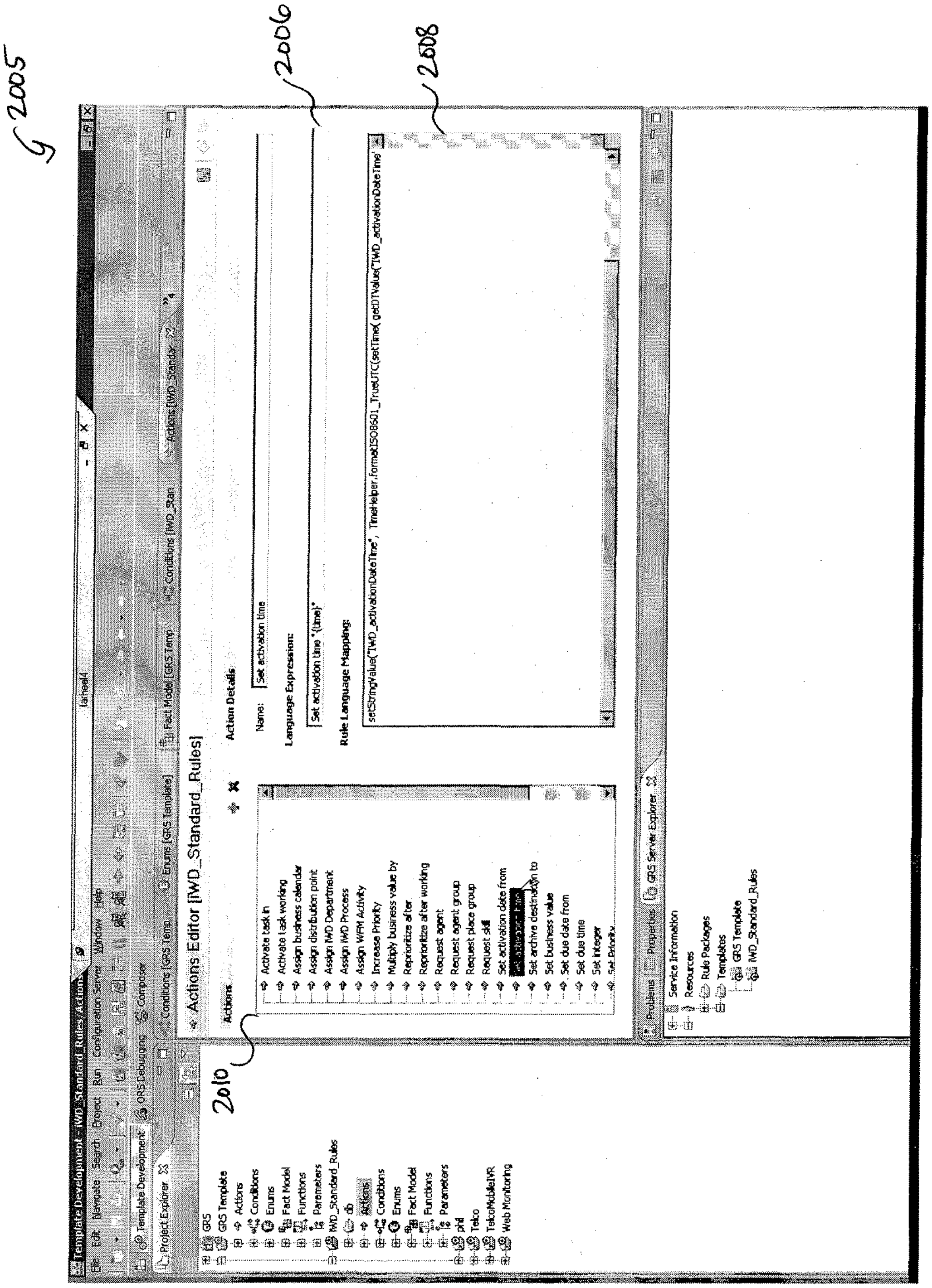

The business rule template may also have an Actions Editor for specifying actions to take in connection with certain interactions. FIG. 14D shows an Actions Editor 2005 according to an embodiment. As shown, a technical user may create a number of Actions 2010 to be applied by the rules engine 964. The Set activation time Action is expressed in the Language Expression 2006 as "Set activation time '{time}.'" As shown in the Rule Language Mapping Section 2008, the setStringValue function is invoked to map the {time} parameter to the appropriate variable of the invoked function.

Figure 14E:
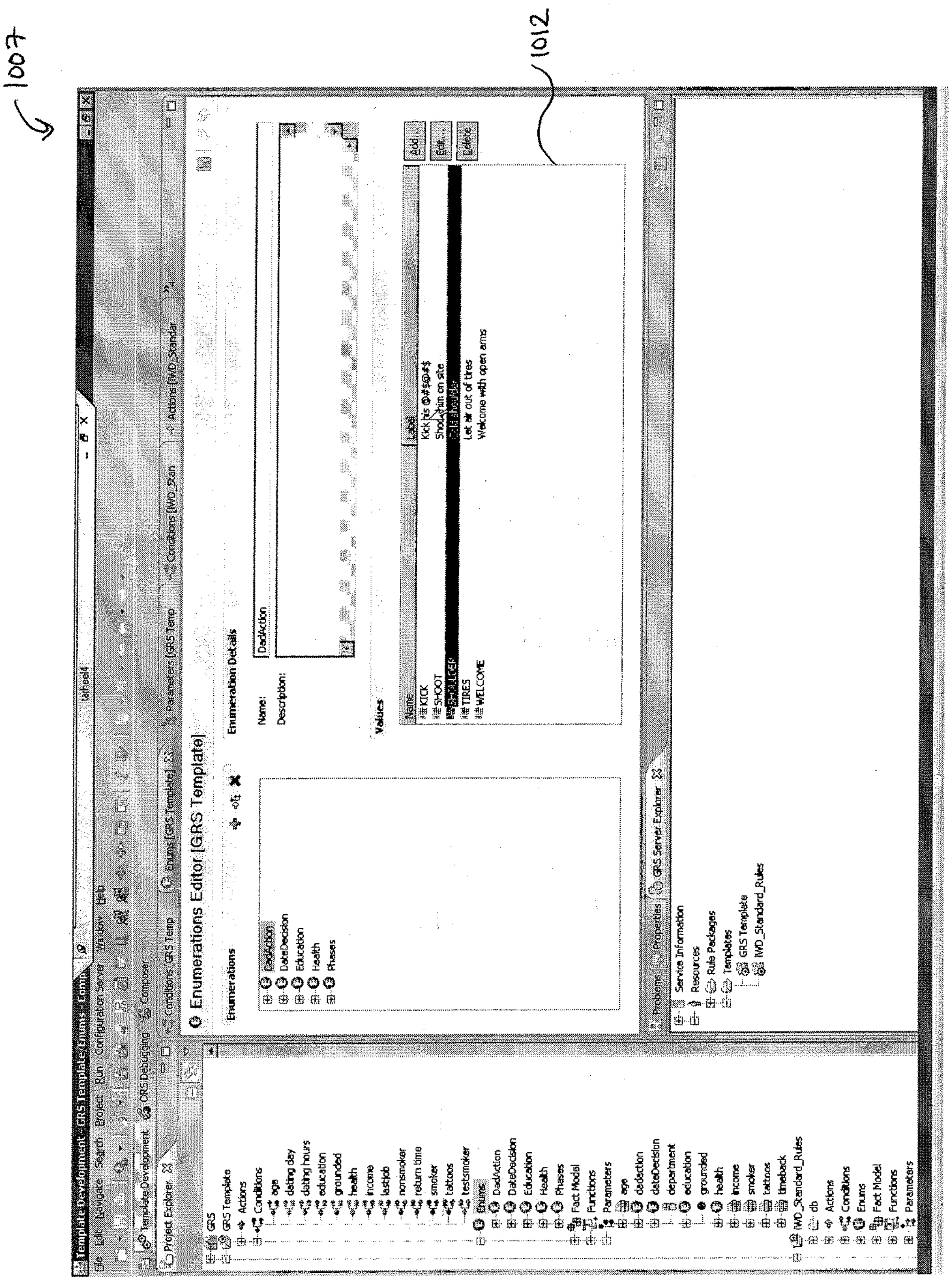

FIG. 14E depicts an Enumerations Editor 1007 of a rules template according to an embodiment. As shown, various actions may be expressed as enumerations. The enumerations may be static values presented in a pre-defined list. For example, the action named DadAction may be associated with any of the enumerated actions listed in the Values Section 1012.

Figure 14F:
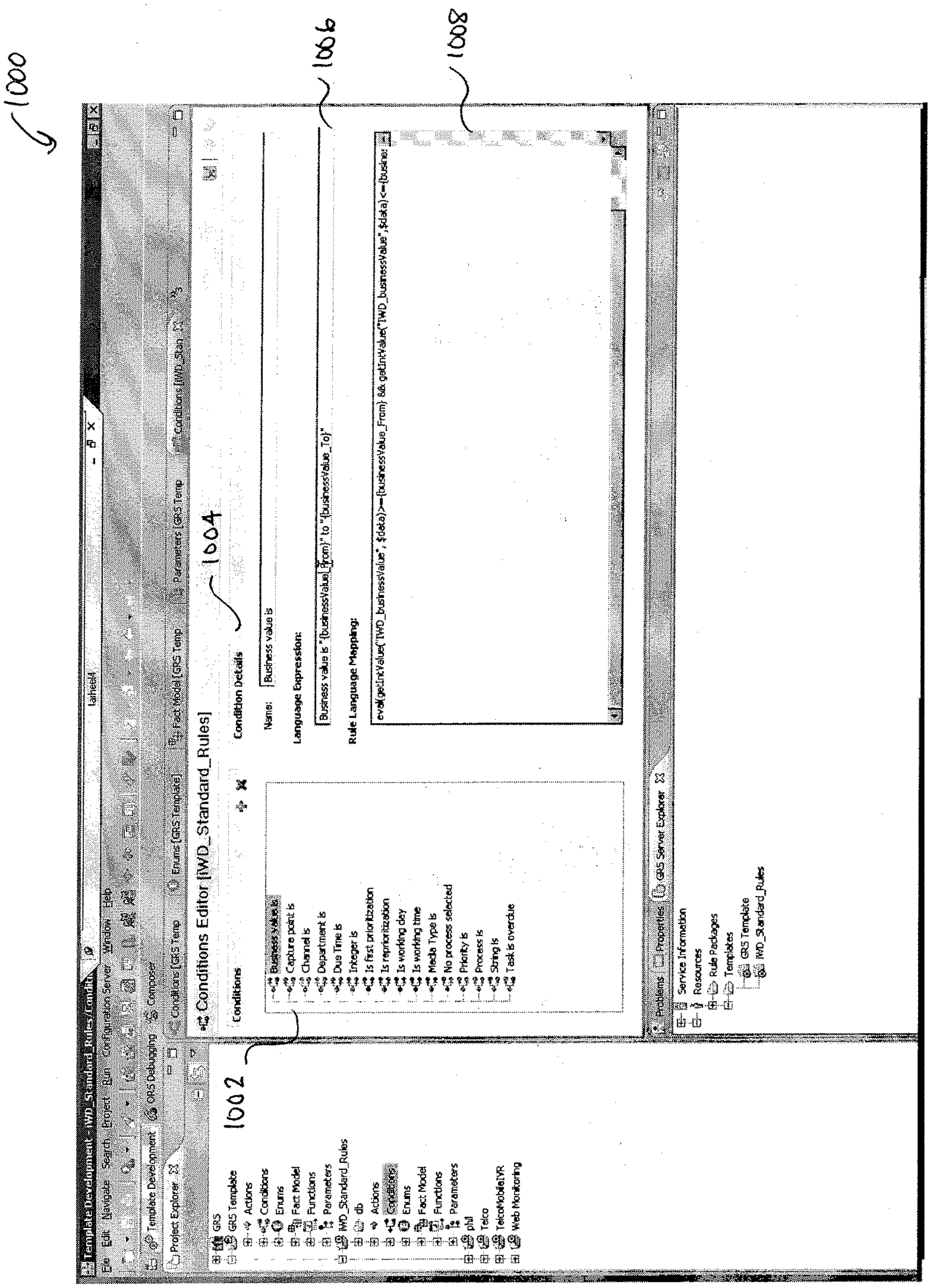

In FIG. 14F, the Business value condition of the iWD template is expressed in Language Expression 1006 as "Business value is '{businessValue_From}' to '{businessValue_To}.' Accordingly, the business user specifies an integer value for '{businessValue_From}' and '{businessValue_To}'. As shown in the Rule Language Mapping Section 1008, the eval function is invoked, and the '{businessValue_From}' and '{businessValue_To} parameters are mapped to the appropriate variables and compared with the value "IWD_businessValue" to determine a result.

In another embodiment, the parameters may be operational parameters having threshold values that change throughout the day (e.g., end user wait time). For example, enumerations composed of dynamic values may be obtained from an external source such as a configuration server list object. In such embodiments, the value of the operational parameter could be re-checked at each time runtime.

According to an exemplary embodiment, the variables "ageinyears" and "IWD_businessValue" in the FIGS. 14A and 14F are passed to the rules engine 964 from the various client applications. For example, the orchestration/routing server 904 may retrieve information (e.g., "ageinyears" and "IWD_businessValue") from the Stat Server 22 in FIG. 2 and pass the data to the rules engine 964. As such, the rules engine 964 does not itself need to retrieve the data from the client applications. Therefore, performance may be enhanced because the rules engine 964 is not bogged down with additional processes.

According to an embodiment, after the technical user has completed the template in Composer 906, the technical user publishes the template via an HTTP interface to a Web application server, which stores the template. The template is then available for use with multiple rule packages.

FIGS. 15A-15D are screen shots illustrating the process of configuring, testing and deploying a business rule according to an embodiment of the present invention. In an exemplary embodiment, business rules are based on the business hierarchy of the enterprise, which is organized into different departments and business processes within those departments. The business rules may be global rules applicable to the entire business, or they may apply to specific areas or levels of the hierarchy.

Figure 15A:
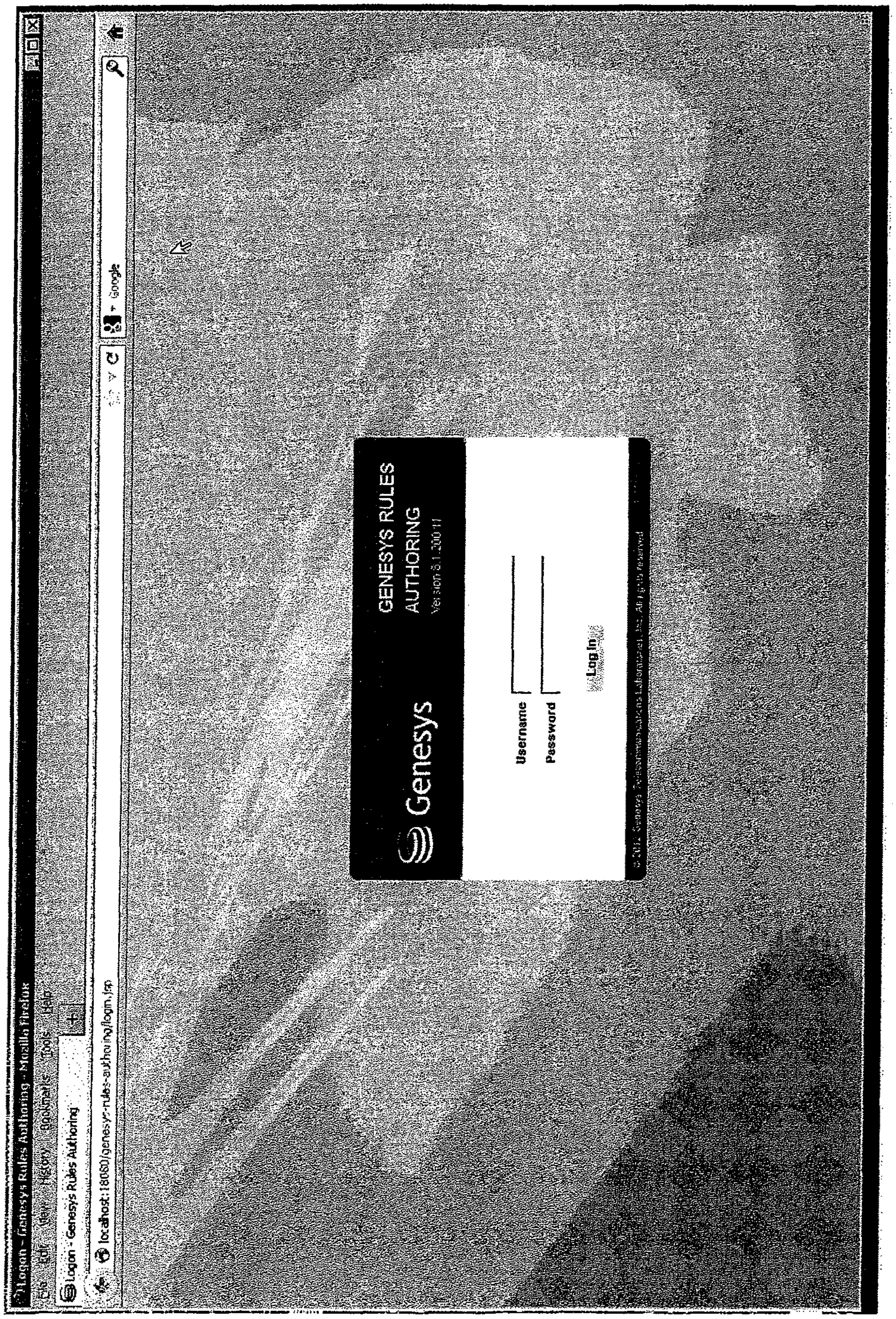
FIGS. 15A-15R are screen shots illustrating the process of configuring, testing and deploying a business rule according to an embodiment of the present invention.
Figure 15B:
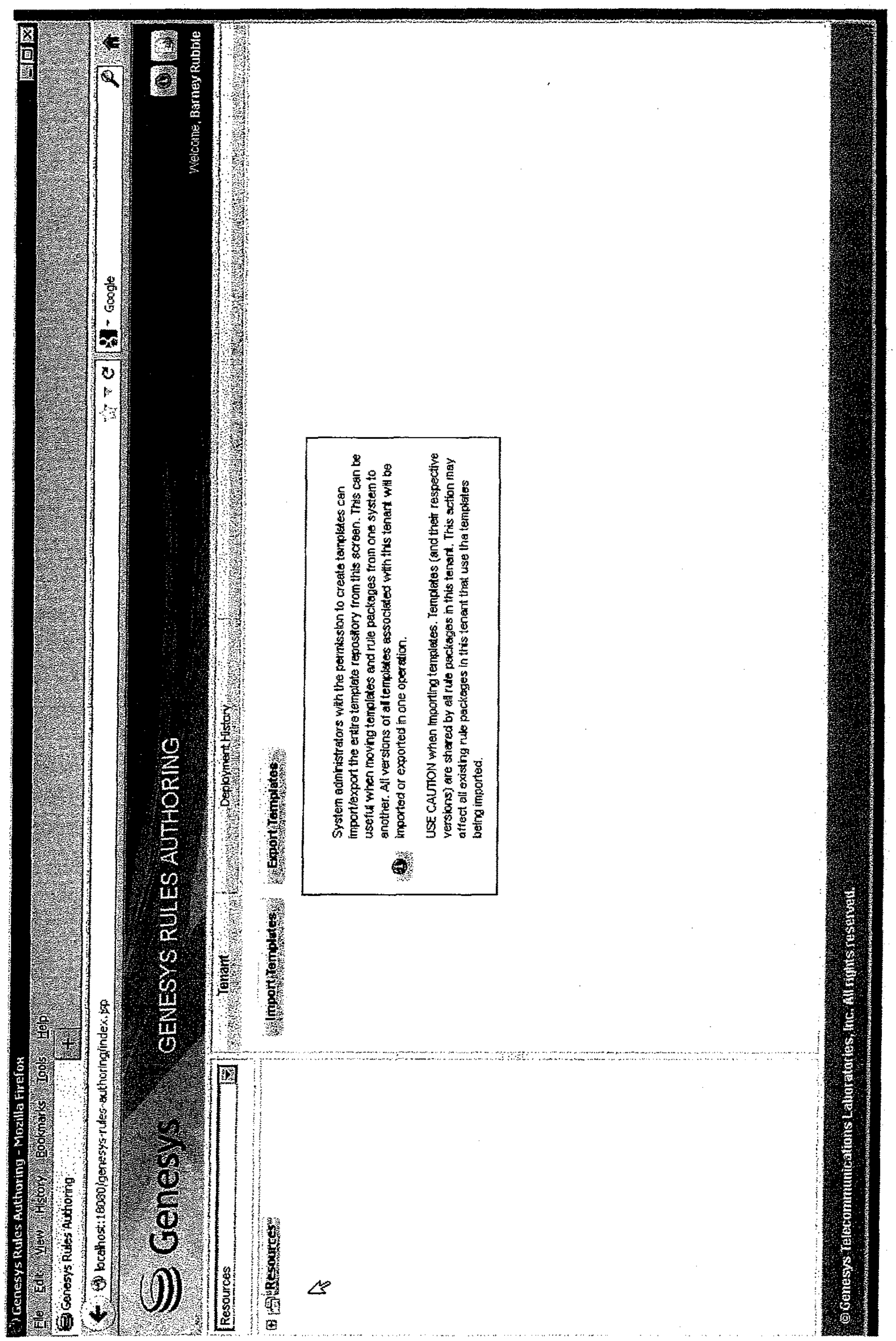

A business user may first log in to the rules authoring tool 970 using the login screen of FIG. 15A. Alternatively, a business user may access the rules authoring tool 970 through the control panel 504 in the iWD manager/server 146 by clicking the "Rules Authoring" icon as shown in FIG. 9B. The business user may be anywhere in the hierarchy of the enterprise, and multiple business users may be working on the same or different rule packages at a time. As shown in FIG. 15B, system administrators with permission to create templates can import or export the entire template repository using the screen shown in FIG. 15B. The administrator might use this feature when moving templates and rule packages from one system to another, for example.

Figure 15C:
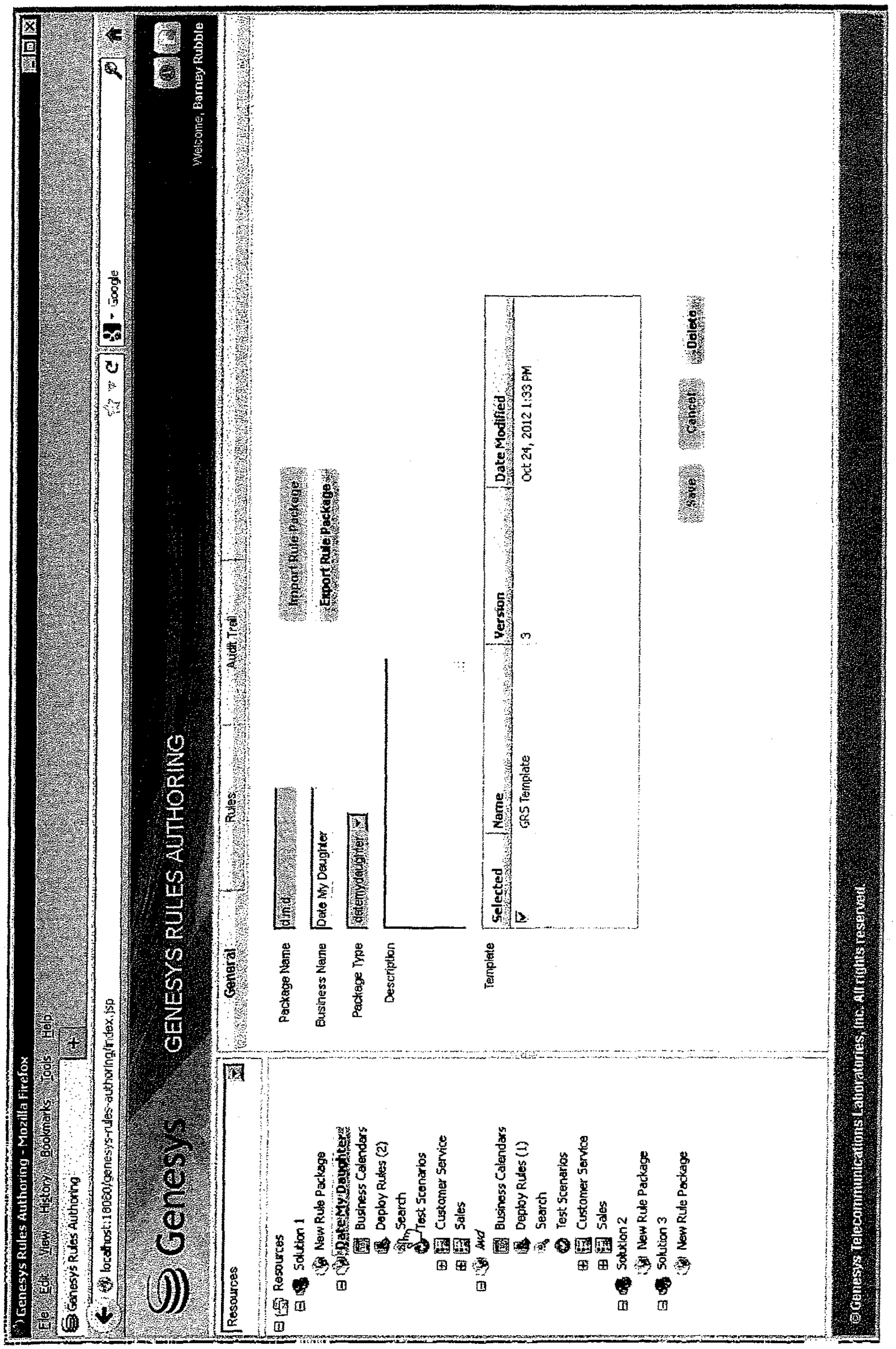
Figure 15D:
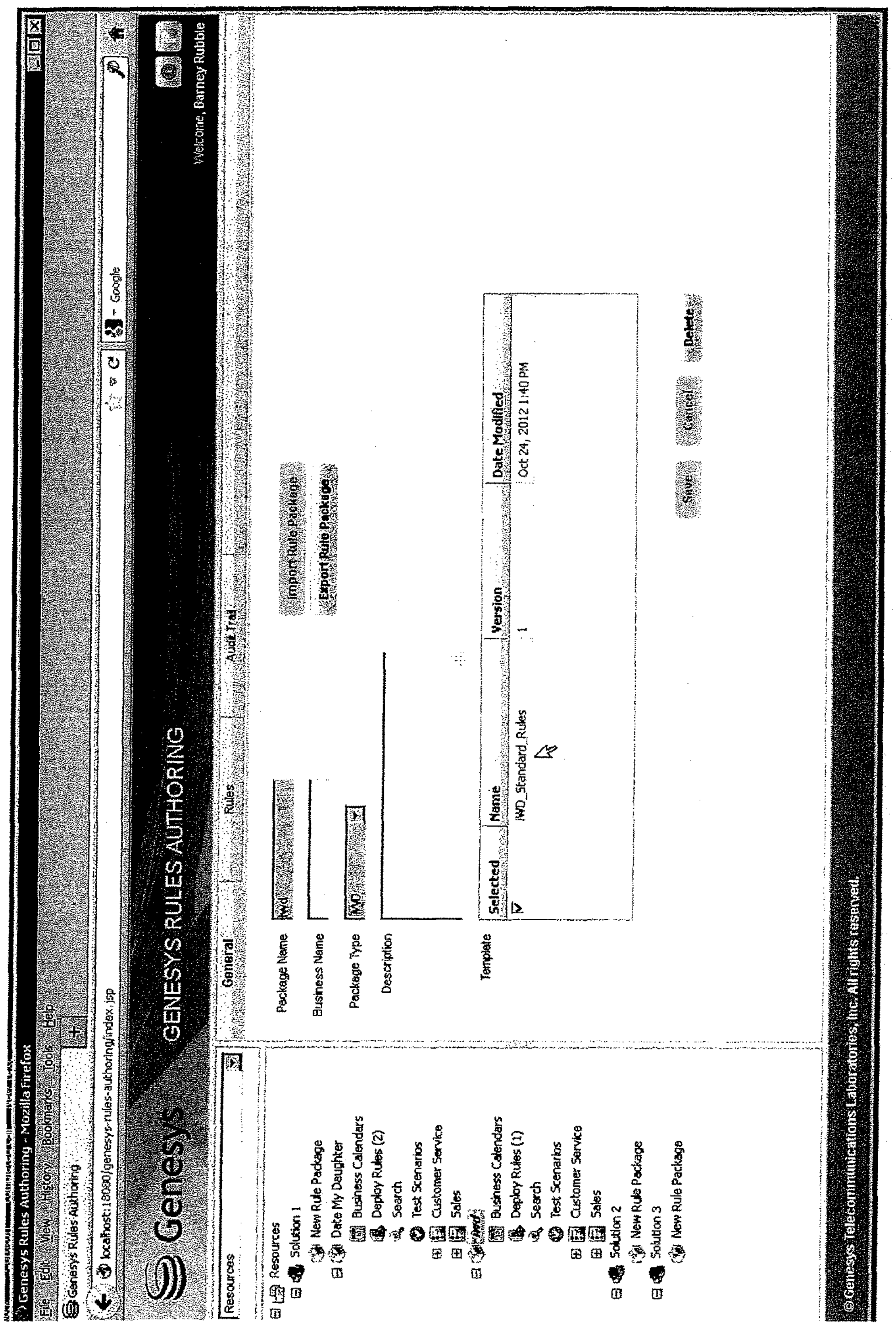

Each enterprise may access its company's Solutions, each of which includes one or more rule packages based on the enterprise's business hierarchy. For example, an enterprise might have one large rule package for the entire business, or several small rule packages for different aspects of the business. When a rule package is executed at runtime, the client application (e.g., a routing application invoked by the orchestration/routing server 904) passes data to the rules engine 964 and one or more rules may fire depending on the data that is passed. FIGS. 15C and 15D show information about two existing rule packages, Date My Daughter and iwd, along with the version number of each rule package.

Figure 15E:
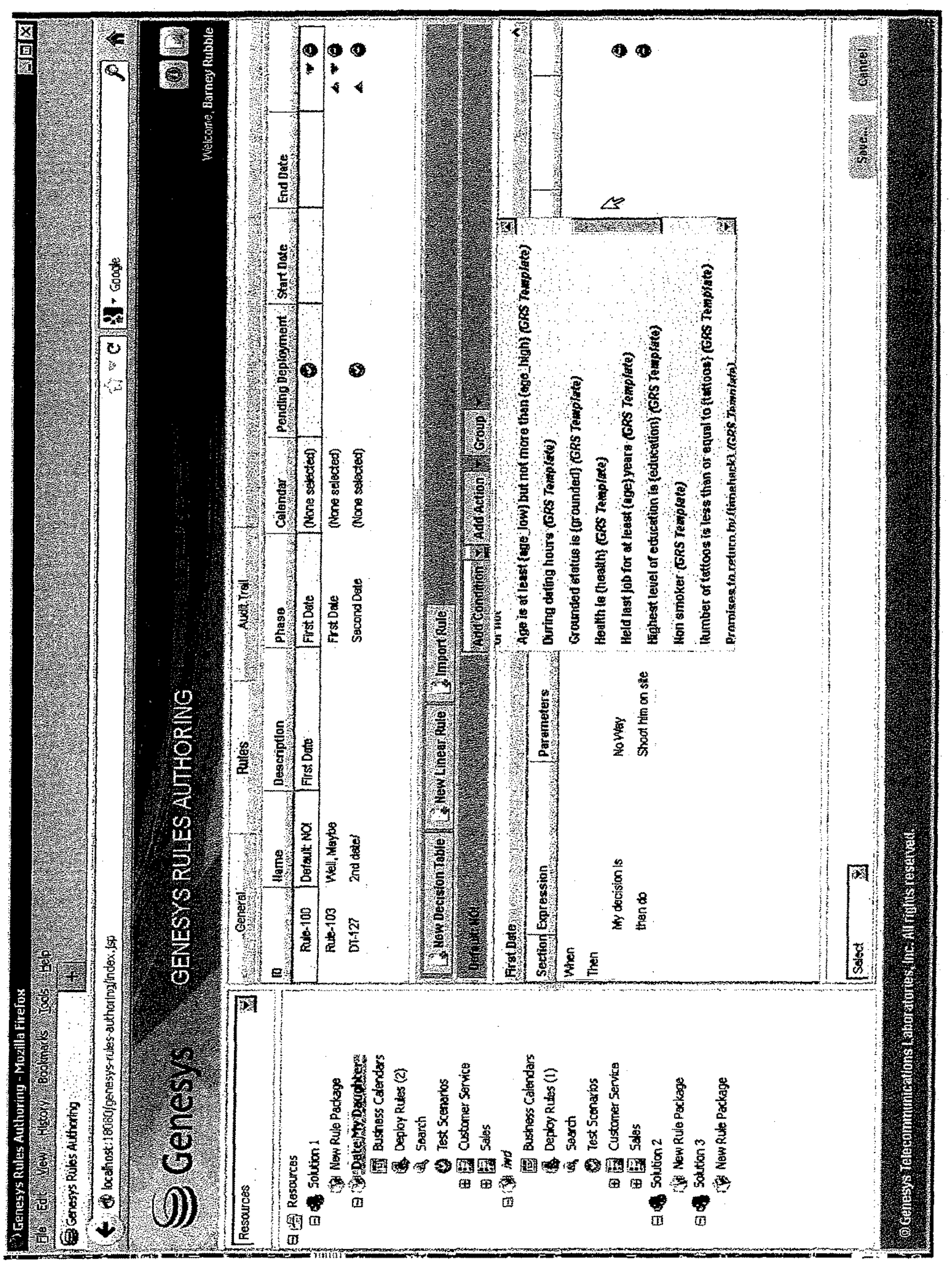
Figure 15F:
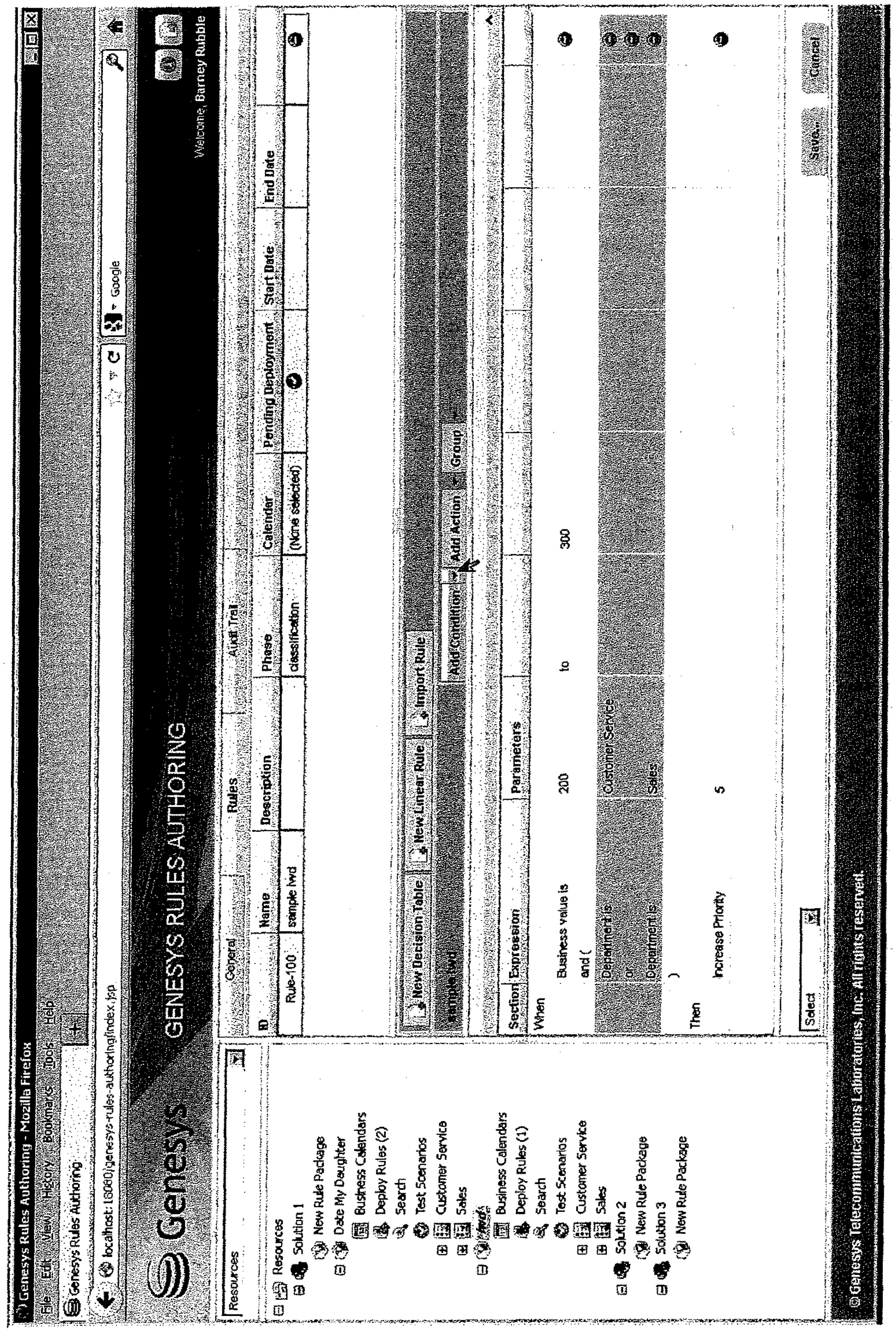
Figure 15G:
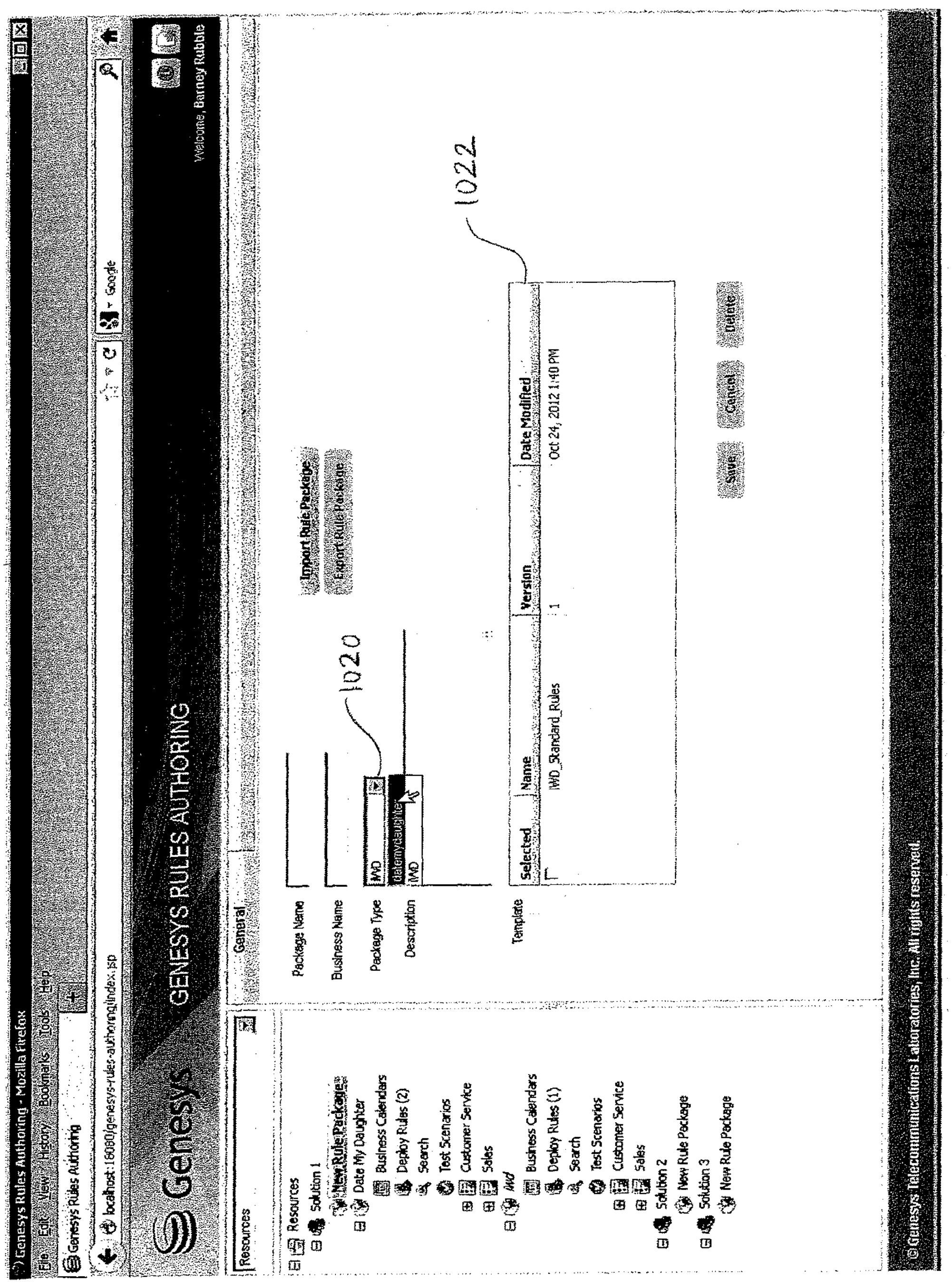

The display of the rules in the Date My Daughter rule package of FIG. 15E is different from the display of the rules in the iwd rule package of FIG. 15F, because the rule templates upon which rule package is based are different. To create a new rule package, a Package Type from the drop-down menu 1020 is selected as shown in FIG. 15G. The available templates are displayed in the Template Section 1022. According to an exemplary embodiment, each rule package within a Solution has the same hierarchy. That is, at the general level, there may be one or more rules, which will execute first. Additional rules can be created for different departments and processes. When the business user runs the rule package, she can specify which department or process she is running it for. As such, not all rules are necessarily eligible to run at same time. Rather, the execution of the rules is based on which area of business the user is currently querying about. In other words, the user may specify the processing department when invoking the rule package. In addition, different users may have access to different rules, and can work on different rules at the same time. For example, a business user may work on Customer Service Department rules at the same time that another business user is working on Sales Department rules, without affecting one another.

Figure 15H:
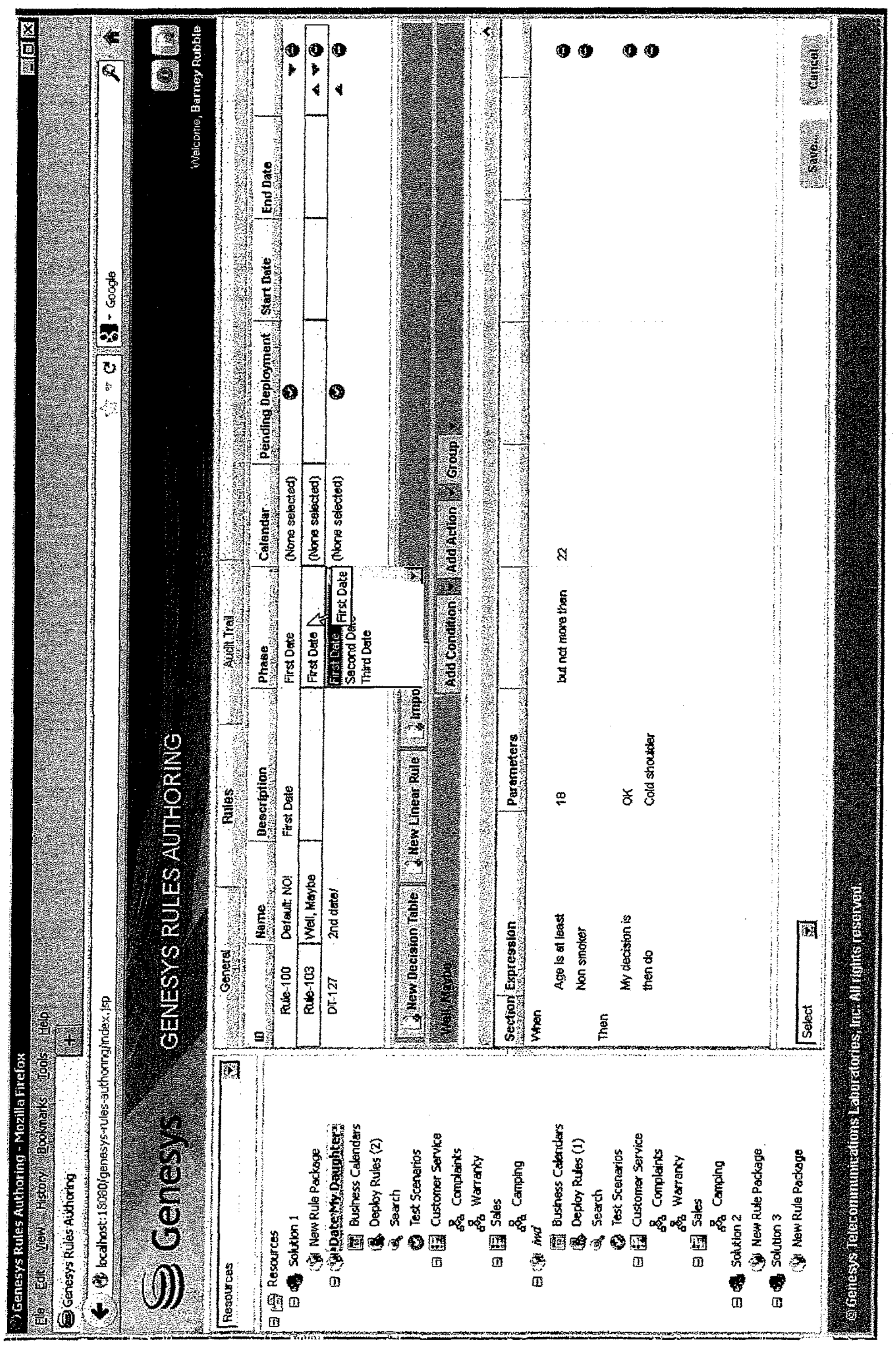
Figure 15I:
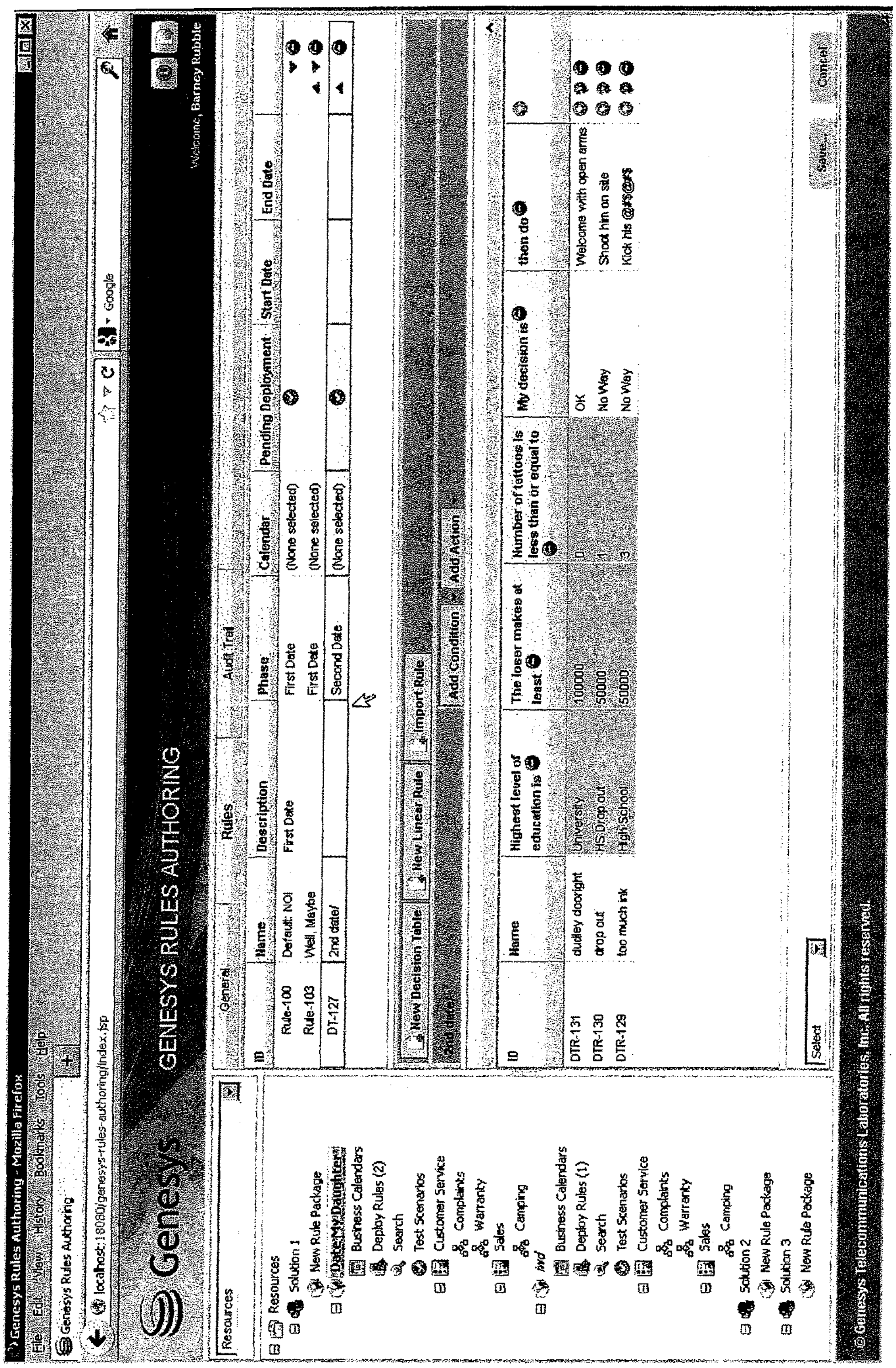

In one embodiment, a rule package may include two types of rules: linear and decision table. A linear rule specifies that when a certain condition is true, execute a designated action. Within a rule package there may also be phase-specific rules, which are tied to different phases of a business operation. An example of a phase-specific rule is shown in FIG. 15H, which states that when age is at least 18 but not more than 22, and the candidate is a Non smoker, then the decision is OK and the action of cold shoulder should be executed. Further, the application of the rules depends on three phases—first date, second date, and third date. Accordingly, the rules can be filtered according to phase. Rules that are tied to the first date phase are shown in FIG. 15H, while a different set of rules that are tied to the second date phase are shown in FIG. 15I.

Figure 15J:
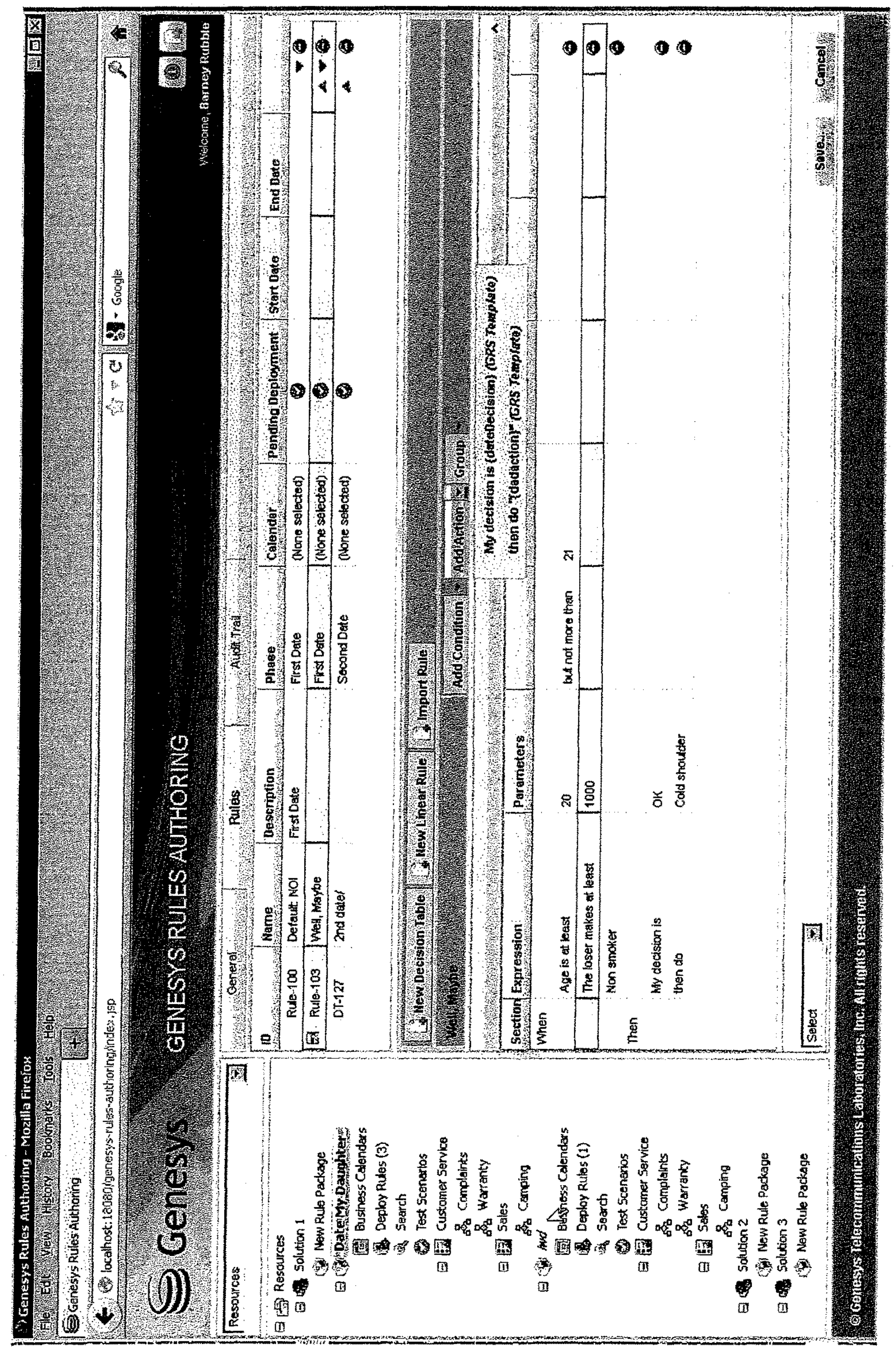
Figure 15K:
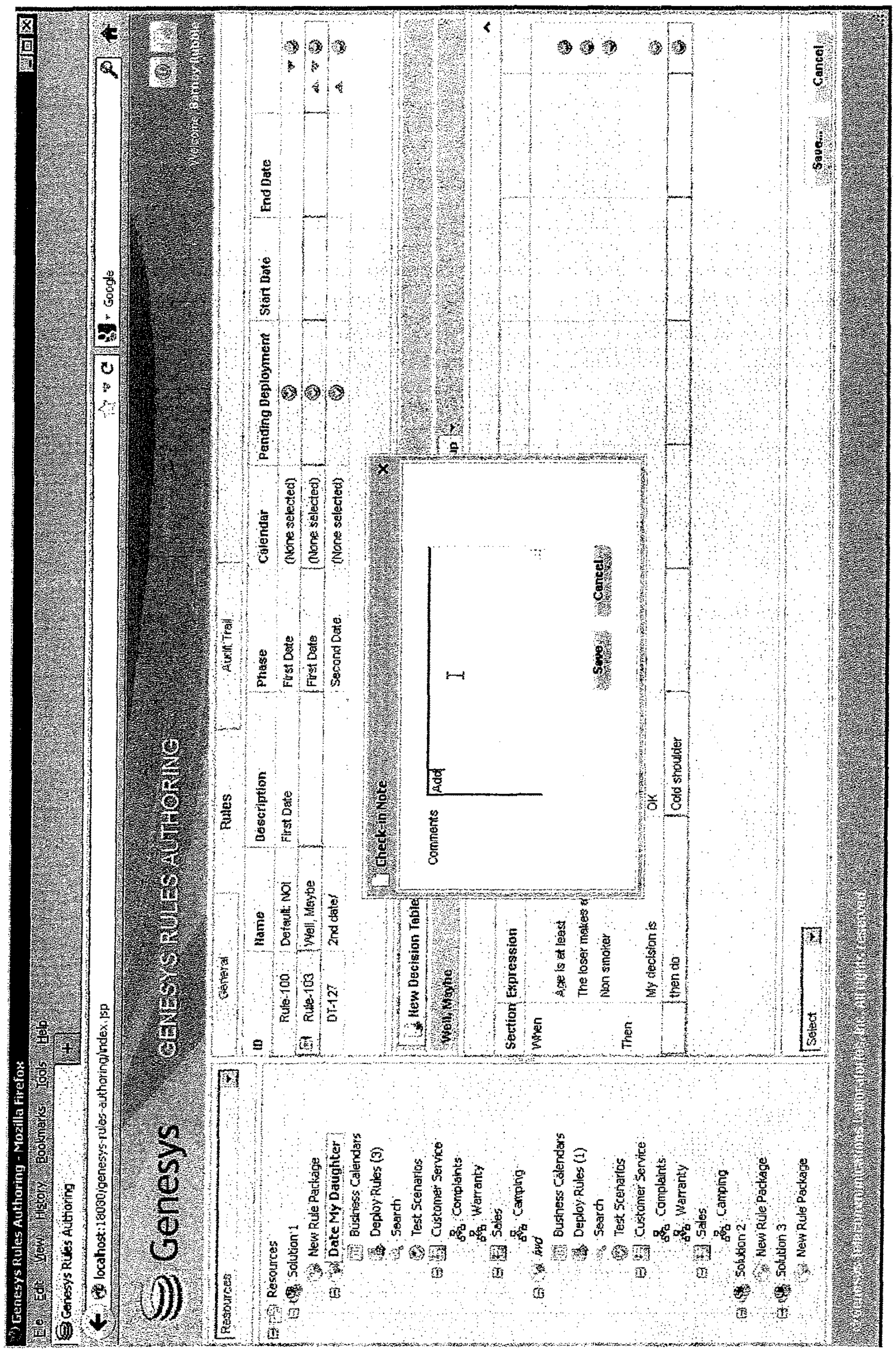
Figure 15L:
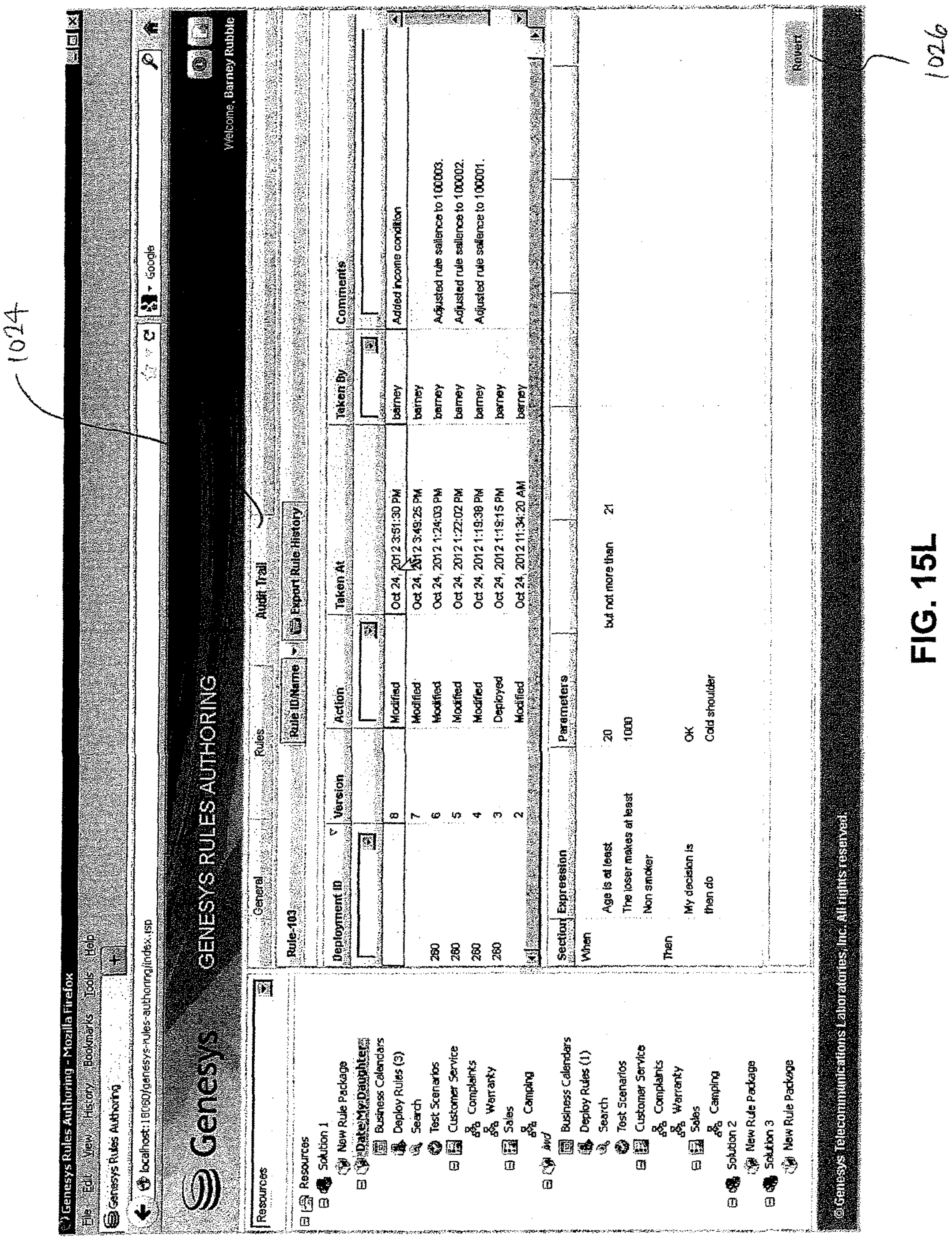

A business user may modify the business rules and add further conditions or actions to the business rules as shown in FIG. 15J. In FIG. 15J, the condition of "The loser makes at least 1000" has been added, and there are two actions in the template that may be optionally added as well. When saving the revised rule, a note may be added as shown in FIG. 15K, indicating what changes were made (e.g., what conditions were revised or added). The rule will then be deployed during the next runtime. In addition, in FIG. 15L, an Audit Trail 1024 has a version control mechanism for managing the business rules. In one embodiment, the Audit Trail 1024 provides information the Deployment ID and Version of each rule, what type of Action was taken with respect to that rule and by whom, as well as any comments made by that person. There is also a Revert option 1026 to return to the previous version of a rule.

A decision table may be used when there are many permutations of data and it may be cumbersome to individually create a rule for each permutation. The decision table contains several columns in which data may be filled out and the decision table may be exported as a spreadsheet so that it can be edited in an external application (e.g., Microsoft Excel) and re-imported into the rules authoring tool 970.

Figure 15M:
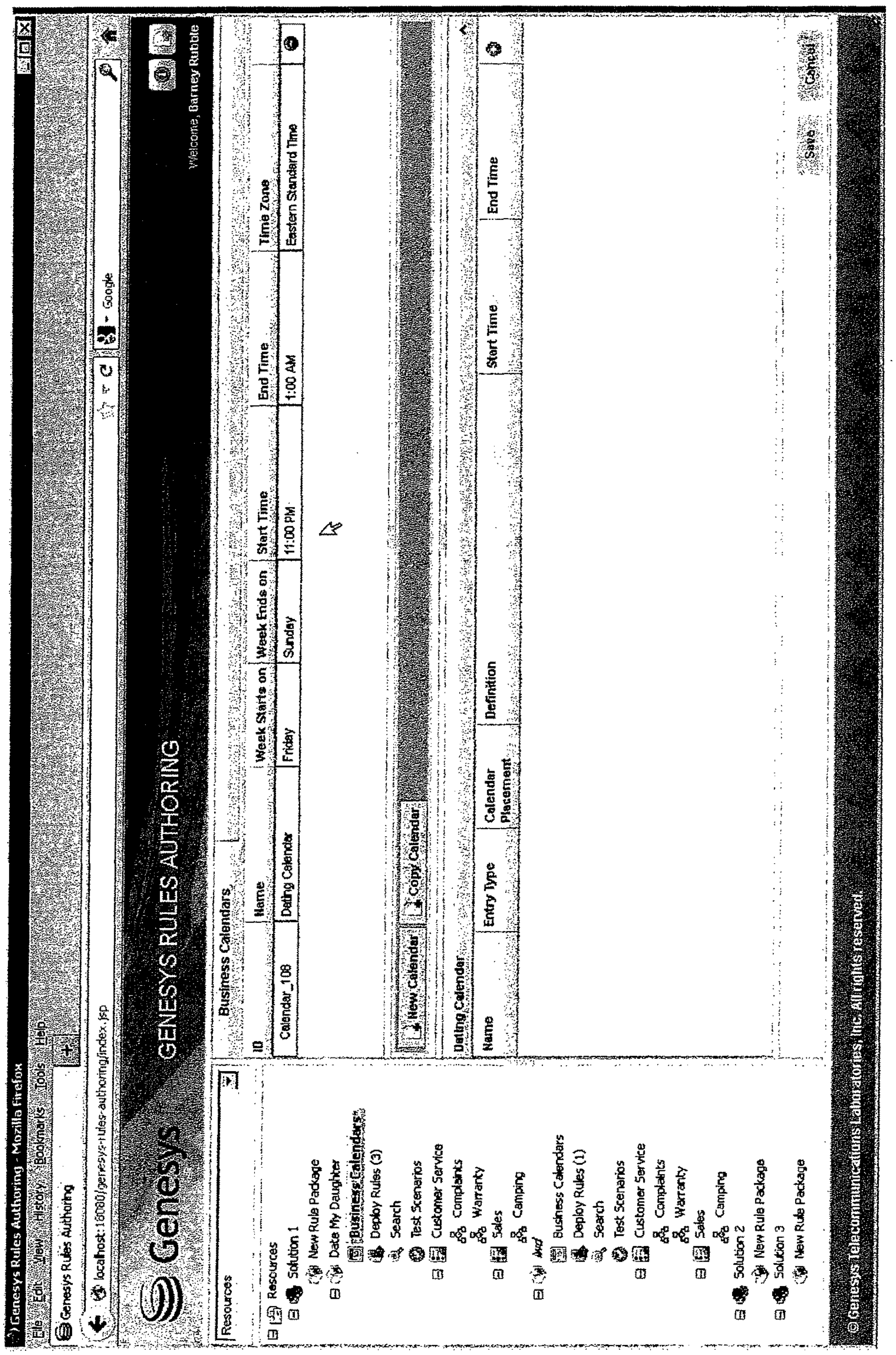

Further, according to some embodiments, one or more calendars may be implemented in the rules authoring tool 970 as shown in FIG. 15M. The calendar may be used to specify work days, holidays, and abnormal schedule days. Such a feature could be used to evaluate time-based conditions for business rules. For example, a business rule may specify that an end user (customer) who calls after hours on a workday will be transferred to an outsourced department. Therefore, a work day calendar is needed to define a workday schedule and determine if the condition of "after hours" is true or false.

Figure 15N:
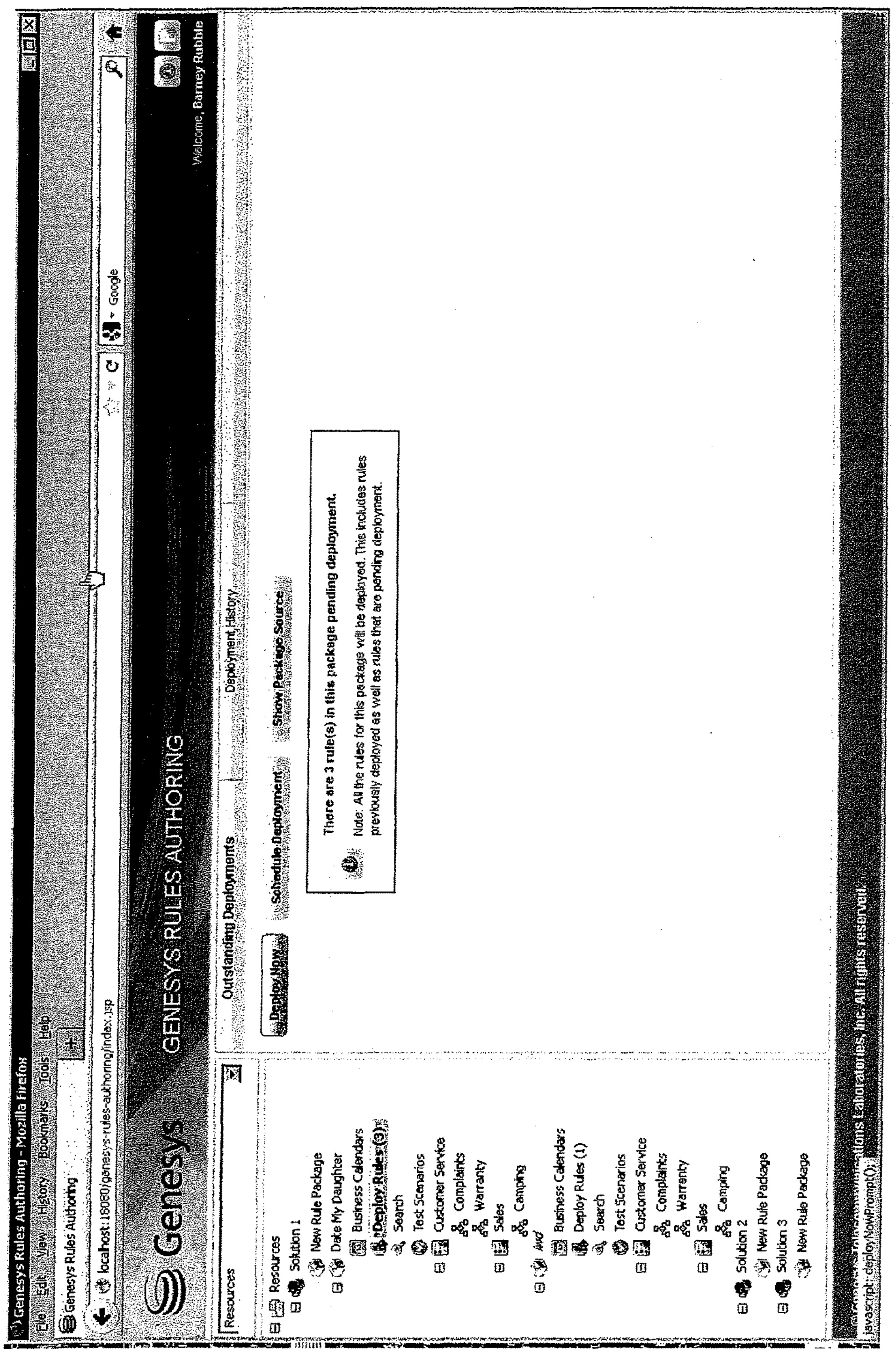
Figure 15O:
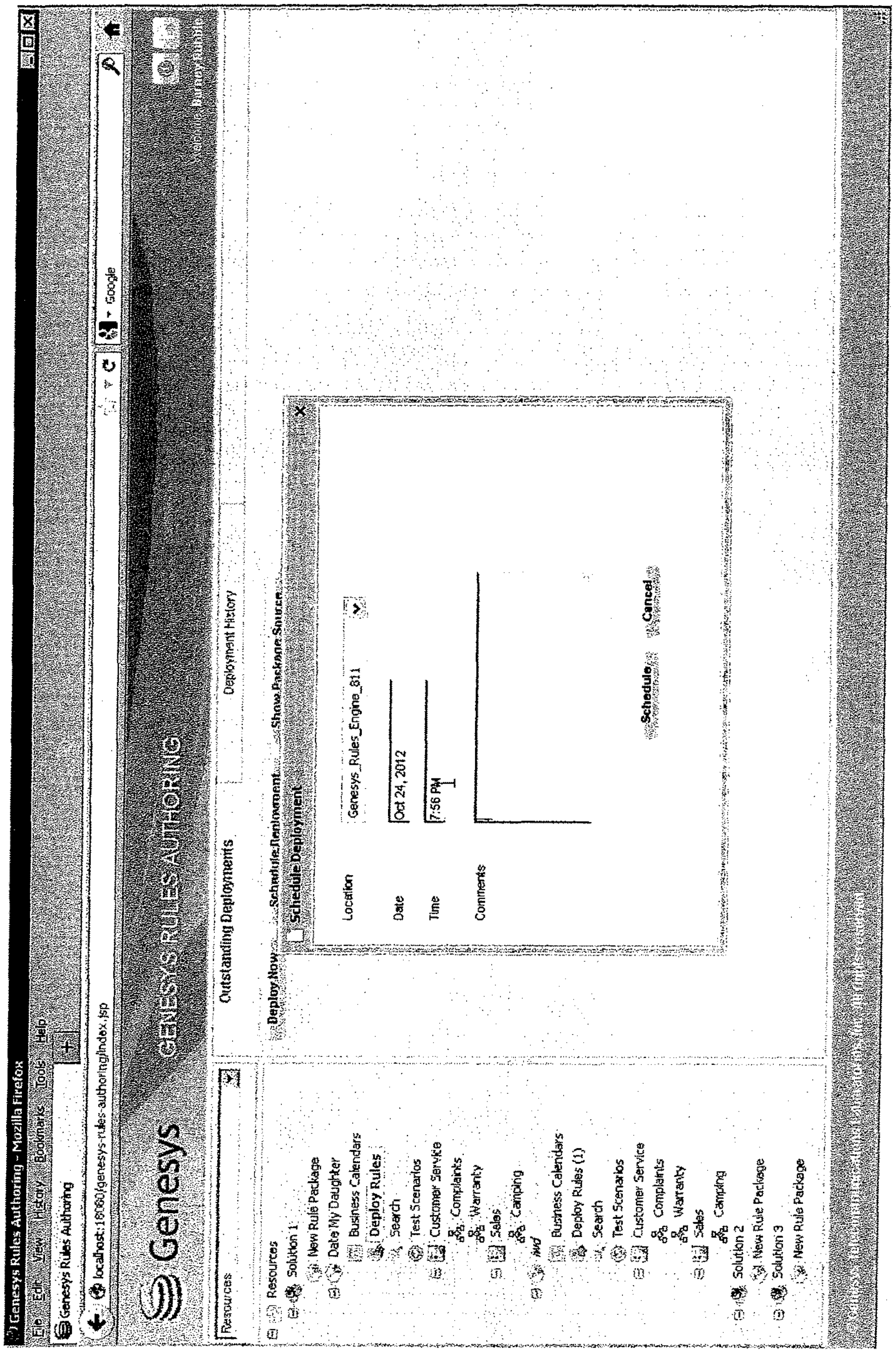
Figure 15P:
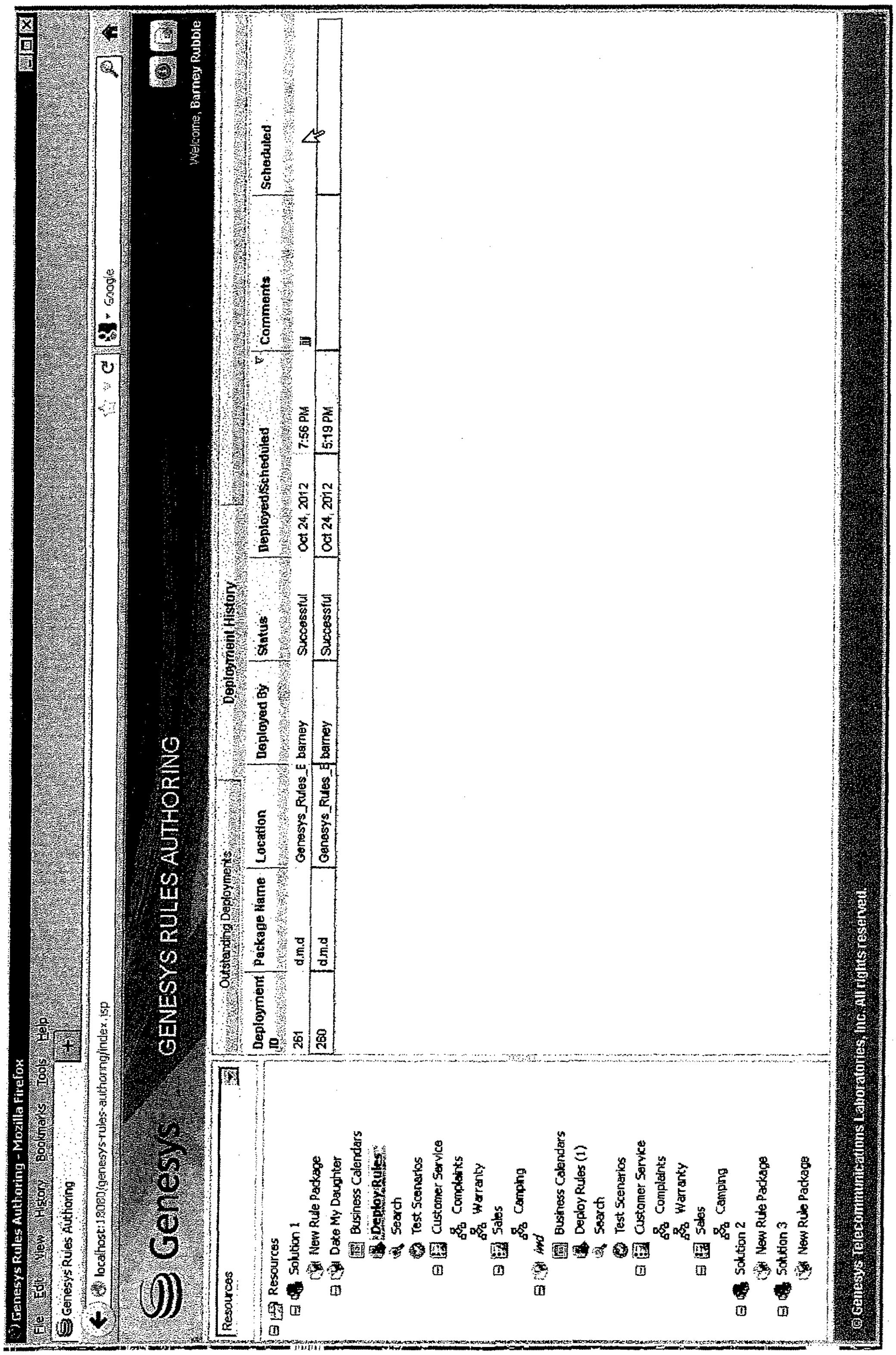

After the business user has finished configuring a business rule, the rule is saved (also referred to as published) in the rules repository 968. To deploy a rule to the application server 963, a business user may click on the Deploy Rules link as shown in FIG. 15N to push the rule to the application server 963. The next time the rules engine 964 is called, the new or updated version of the rule will be applied. In some embodiments, there may be more than on rules engine 964 in a network, or there may be a cluster of rules engines 964 behind a load balancer, and the rule may be deployed to the cluster. According to exemplary embodiments, the business user may add comments as shown in FIG. 15O before deploying the business rules, and may schedule the deployment for a later time as shown in FIG. 15O. A business user may also view their deployment history as shown in FIG. 15P.

According to other aspects of embodiments of the present invention, new or modified business rules may be tested by a business user before deployment. According to an embodiment, rule testing allows a business user to create, describe and view summary and detail results for each test scenario. The business user may create test scenarios, each of which includes the ability to add business context and phase data for submission with the values to be tested. For example, the business user may manage given values (values to test for the condition represented in the business rule at issue) and expectation values (values for the expected results represented in the business rule at issue), and view summary and detail results for each set of values submitted for testing and prior to deployment.

According to an embodiment, for each rule package, the rules authoring tool 970 allows a business user to define one or more test scenarios. The test scenarios may be stored in the rules repository 968 along with the rule package. In some embodiments, a business user may build a suite of test scenarios that can be executed to ensure that the rule package is behaving as specified, and that changes to the rule package do not regress the desired behavior.

Test scenarios may be used, for example, where a rule package includes hundreds of rules at different levels, or nodes, of the enterprise's business hierarchy. Regression tests may be run to verify that adding or modifying a condition of a rule does not cause another rule to malfunction. Through regression testing, the rule package's new behavior in view of the changes is checked against the rule package's old behavior before the changes were made. In an exemplary embodiment, a test scenario simulates a client application calling the rules engine and passing data to the rules engine, and the rules engine returning a result. When creating a rule, a business user can input given values (also referred to as test data) into the test scenario to check whether the result is as expected. Then, after modifying the rule, the business user can run the same test scenario again to confirm that the expected result is still returned.

The business user may also specify the phase and business hierarchy for a test scenario, and can specify the time and date for time-sensitive rules. For example, the business user may want to simulate a business rule that only takes effect for a specific start and end date (e.g., a credit card offer only effective during a specific time period in the future). The business user can test the rule by simulating the future date and time.

Figure 15Q:
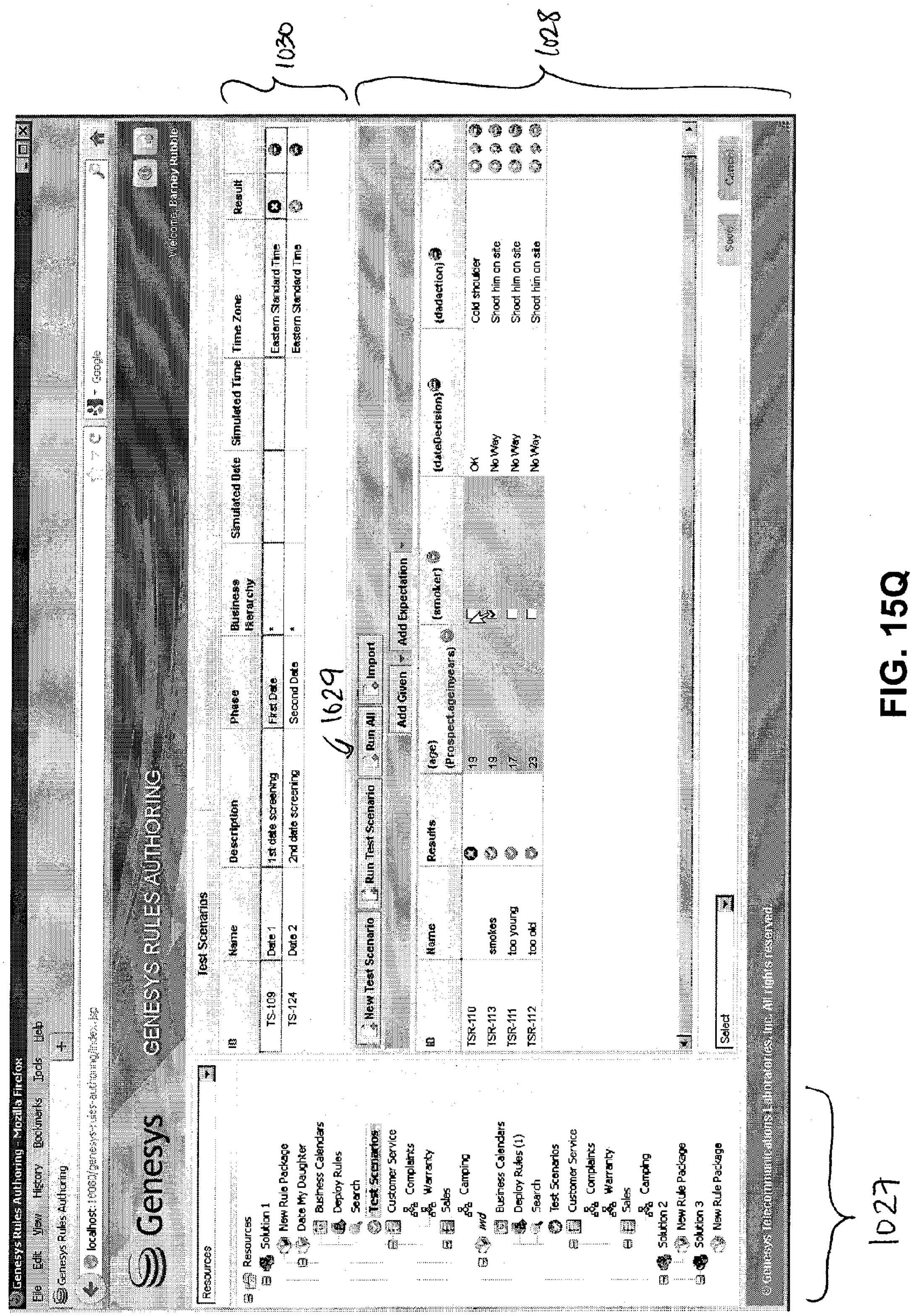

FIG. 15Q is an example of a test scenario according to an embodiment. As shown in the left window pane 1027, test scenarios may be managed via a node labeled "Test Scenarios" on the navigation tree. According to an embodiment, when a user clicks on the Test Scenarios node, they will see a list of test scenarios in the upper right window pane 1030, and when they click on a listed Test Scenario, they will see details about the Test Scenario in the lower right window pane 1028.

In the test scenario summary screen shown in FIG. 15Q, a business user may create a new test case to run a single test scenario (or all scenarios). In this regard, the toolbar 1029 may contain icons for New Test Scenario, Run Test Scenario, and Run All. By modifying a test scenario, a user may be able to change several properties, including the name (a descriptive name for the test scenario); description; phase (the phase that the user wants the test scenario to execute on); and business hierarchy (the user may select from a drop-down list of levels in the business hierarchy at which to run the test, e.g., run a the "general/package level" or run under a specific department or process); simulated date (e.g., a rule with a start and end date or business calendar); simulated time (e.g., a rule with a business calendar); and time zone. The user may also have the option of deleting the test scenario.

In FIG. 15Q, the {age} and {smoker} columns in the lower window pane 1028 show given values provided by a business user to the test scenario. According to an embodiment, the given values represent data passed into the rule package. For each set of given values, the user may add one or more expected results, which represent the results from the rule execution. The {dateDecision} and {dadaction} columns show the results the user expects the business rule package to return, based on the set of given values. The Results column shows the result of the last execution of the current test scenario, which may be either successful (indicated by the check mark) or unsuccessful (indicated by an X icon).

Both the given and expected data (collectively referred to as test data) may be in the form of template parameters, as shown. In one embodiment, the same editor as would be used in the rule will be used in the test scenario. For example, if the value is defined as an integer, string, float, or an enumerated list from an Enum, config server, database, etc., the drop down values will be provided as done in the rule editor.

According to an embodiment, when a user runs a test scenario, each row of test data may be passed in separately as an individual test. When the test is executed, the rules authoring tool 970 maps the parameter values to the underlying fact model. The mapping may be done with the assistance of the technical user, who has an understanding of the relationship between parameters and the fact model. Accordingly, in exemplary embodiments the GRDT 908 allows a technical user to map a parameter back to the underlying fact model. For example, the {age} parameter may be related to the "ageInYears" variable of the Prospect fact model. If a business user has set {age} to 25, then when executing the test, the rules authoring tool 970 allocates a Prospect fact and sets the "ageInYears" variable to 25.

In one embodiment, when a test scenario is run, the results are shown in both the summary and detail views. In FIG. 15Q, the test scenario has failed as indicated by the X icon because the business user added a new parameter, but did not pass any test data for that parameter. According to exemplary embodiments, the user can click on the icon in the Results column to bring up a detailed view of the test run. This may assist technical users, for example, with debugging issues when rules are not behaving as expected.

According to another embodiment, rule test scenarios may be enabled for import and export to a spreadsheet. For example, in some embodiments, an entire rule package may be imported or exported along with the associated test scenarios and test data. In some embodiments, a user may also import or export an individual test scenario. For example, exporting an individual test scenario into an XLS format may enable a user to edit rows of test data inside of a spreadsheet, or produce test suite data from another source (e.g., writing a tool to extract real customer data from an external database and build an XLS document).

According to an aspect of the present invention, an enterprise may utilize rule testing to build a simulation system for a contact center for assessing impact of a rule change to the contact center. The impact that is assessed may relate to contact center efficiency (e.g. agents' occupancy, fit between agents' schedules and traffic, abandonment rate, etc.), business impact, and the like. In an embodiment, the contact center is able to capture details of past interaction traffic (e.g., yesterday's inbound calls) using detailed reports or application logs, for example. Detailed employee schedules for the same time period, which may include information such as assigned activities and activated skills, are also available and may be updated to reflect actual adherence. Individual employee profiles may also be derived, which show data such as handling time characteristics (including average time, variance, and the like).

In this regard, the contact center stores in one or more of the mass storage devices 30 data on past interactions (e.g. associated customer segment, service type requested by the interaction, time in which the interactions occurred, average handle time, average time the customer was on hold, etc.), data on employees who handled the interactions (e.g. skill set, schedule information, handling time), routing strategies and business rules that were applied in response to the interactions (e.g. rules relating to up-sell or cross-sale offers), and other data useful for running a simulation.

According to an embodiment, this information may be used to set up a simulation system, in which automatic call traffic is generated in accordance with the prior recorded traffic. In this regard, a contact center administrator may invoke a simulation application from his/her device 38*c*, and provide via the device one or more simulation parameters for generating the simulation system. For example, the administrator may select the time period of past traffic to simulate, the time distribution for the simulation, service types, and customer segments. According to one embodiment, the administrator may have even more detailed control on the simulation, and may model, for example, customer patience, agent success rate for cross/up-sell offers, and the like. According to one embodiment, the administrator may also select a single rule, rule set, or rule package for which the simulation is run. The selected rule(s) are rules that were not available during the past interactions, and for which simulation is desired in order to assess impact of deploying the rule to the rules engine.

The simulation system may then be invoked in response to a user command. The command may be, for example, a command to assess the selected rule package based on the simulation parameters. In response to the command, the log of past interactions are retrieved from the one or more storage devices and traffic is generated based on the log of past interactions. The simulation system may invoke agent simulating applications (e.g. software) for responding to the simulated interactions (e.g., answering calls). The agent simulators may be configured to replicate individual agent characteristics, and may be activated according to the captured schedule data. The system may employ the same contact center routing logic, IVR scripts, and the like, as employed during the previous day's operations. Further refinements may be possible, such as modeling individual customer patience (e.g., how long a customer is waiting in queue), and individual employees' success rate for business opportunities such as cross-selling deals across departments or brands, or up-selling deals to certain customers.

Once the simulation system is built, according to exemplary embodiments the enterprise can perform test runs with different rule sets, and compare results. Contact center performance and efficiency may be assessed according to criteria such as employees' occupancy, correlation between task scheduling and traffic flow, abandonment rate, and business outcomes (e.g., volume of cross-/up-sell deals). Based on the simulation and assessment, the particular rule package for which the simulation was conducted may be deployed or not.

According to another aspect, other relevant attributes may be tested by a simulation system for a contact center. For example, a user may be able to activate and deactivate certain employee skills that are utilized in interaction routing. As such, adjustment of skills assignments can lead to improvements in efficiency. For example, employees generally have multiple skills at varying proficiency levels. If an employee is assigned a task for his secondary skill, processing may take longer, and the employee is then unavailable to process tasks that fit his primary skill. On the other hand, cross-skill activation may be desirable because it allows a contact center to process temporary spikes in traffic for a particular skill without the need to hire additional staff Skill assignments may also be changed administratively by modifying mapping rules of incoming interaction types onto employee skills.

According to still another aspect of the present invention, a simulation environment may be used to create a catalogue of contact center weaknesses, together with corresponding solutions or treatments. Rules testing according to embodiments of the present invention enhances a contact center's ability to build such simulation systems and environments, because it reduces the need to change routing strategies, which may be difficult and require software expertise. Instead, business users may deal with more easily configurable rules to assess contact center efficiency and performance.

Figure 15R:
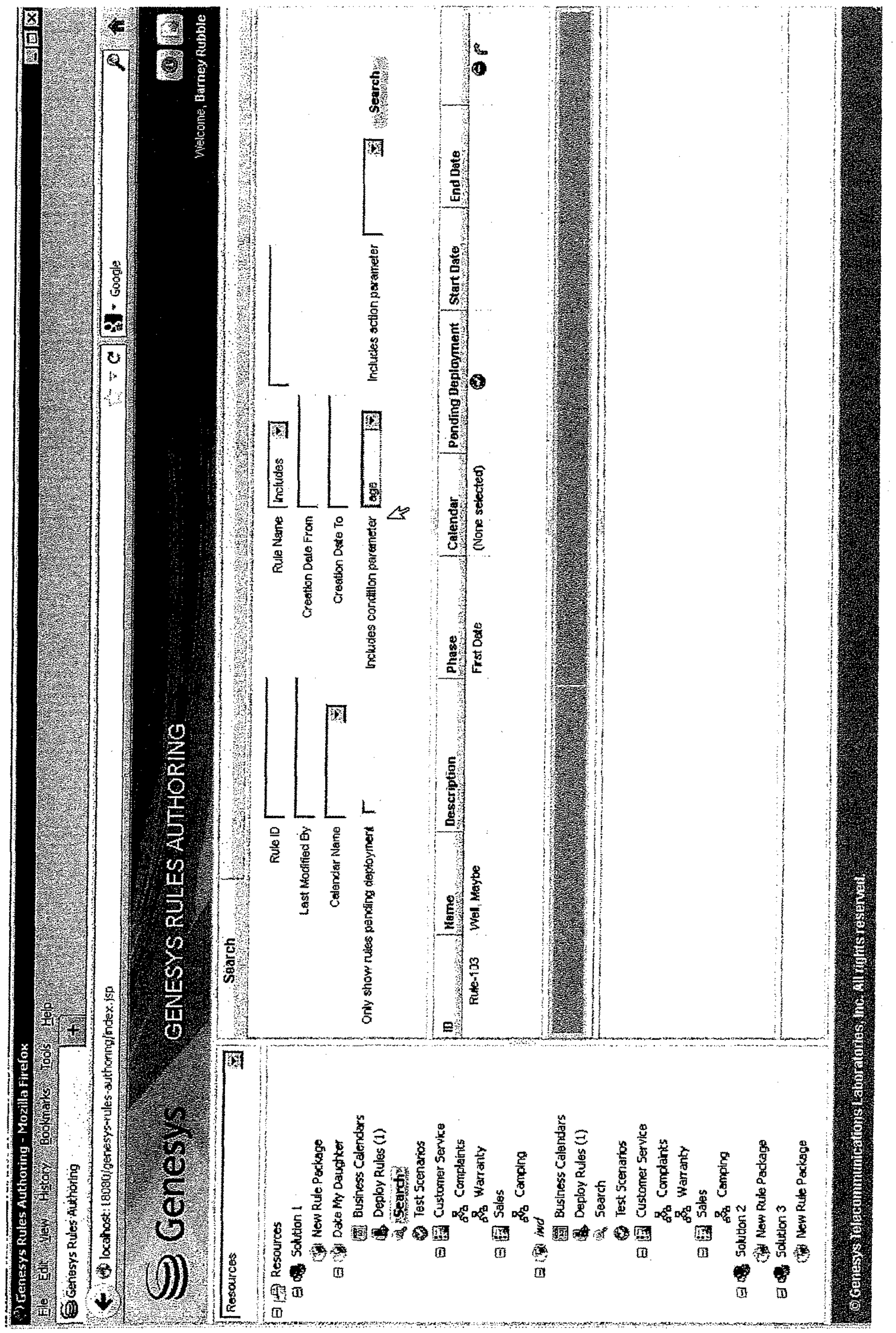

FIG. 15R is a screen shot of a search window according to an embodiment of the present invention. A business user may search for business rules using one or more criteria. Such a search would be useful, for example, if a business user determined through testing that a certain parameter (e.g., the age parameter) was incorrectly configured. The user could then search for all business rules including the age parameter, as shown in FIG. 15R, and thereby identify all business rules which may return an error message.

Figure 16A:
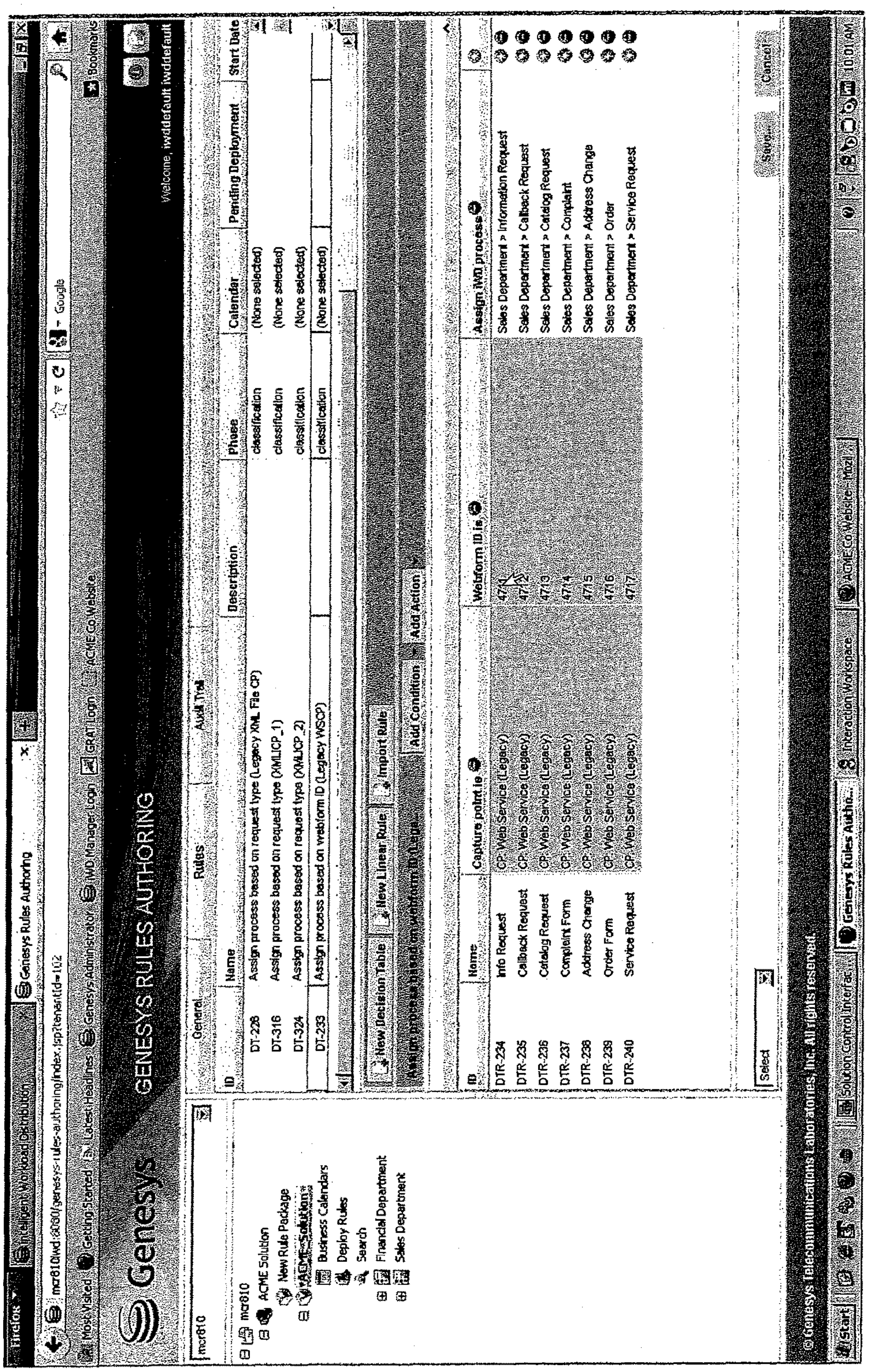
FIGS. 16A-16I are screen shots illustrating the use of GRS to prioritize, re-prioritize, and assign tasks based on skills according to an embodiment of the present invention.
Figure 16B:
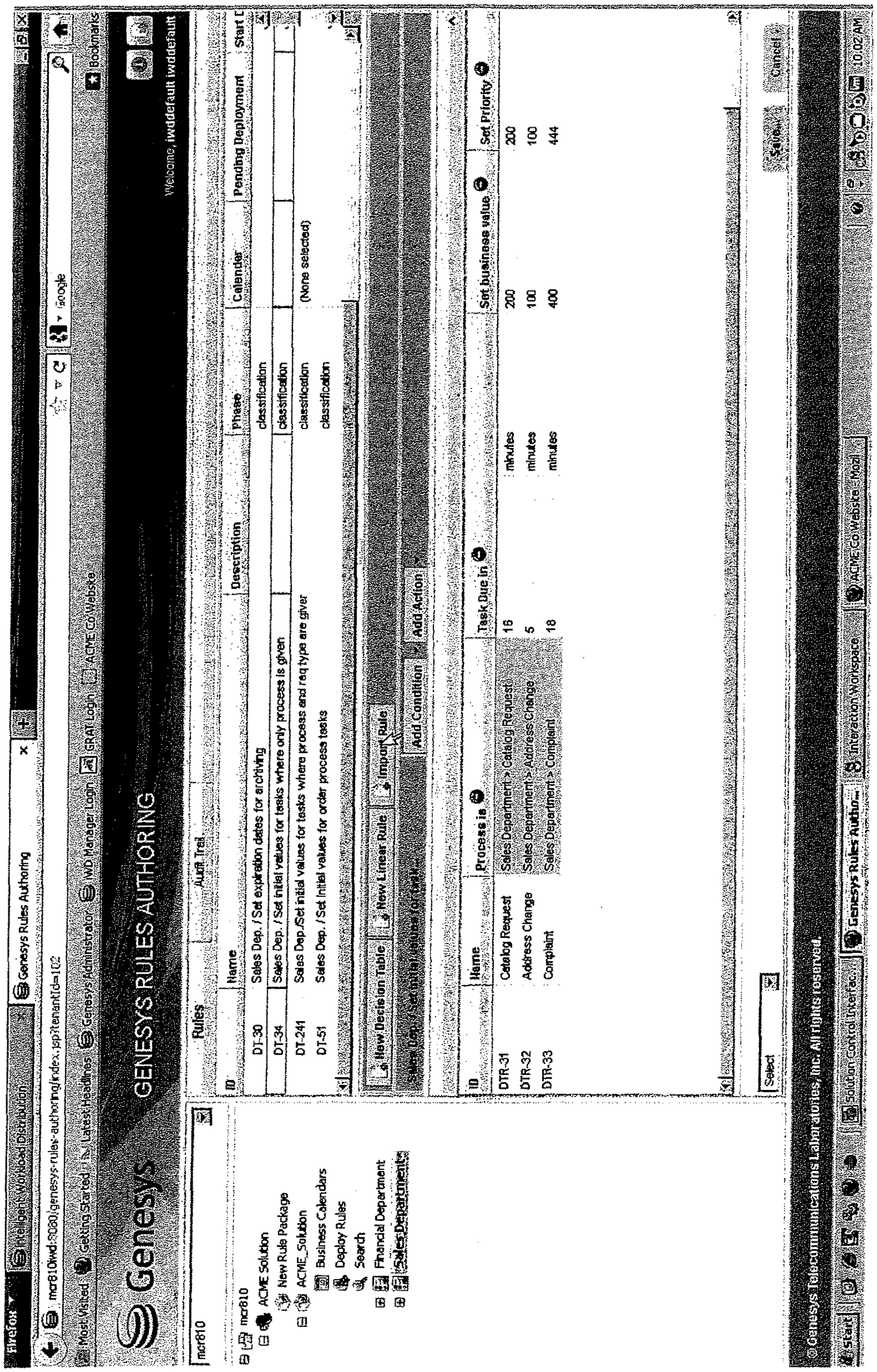
Figure 16C:
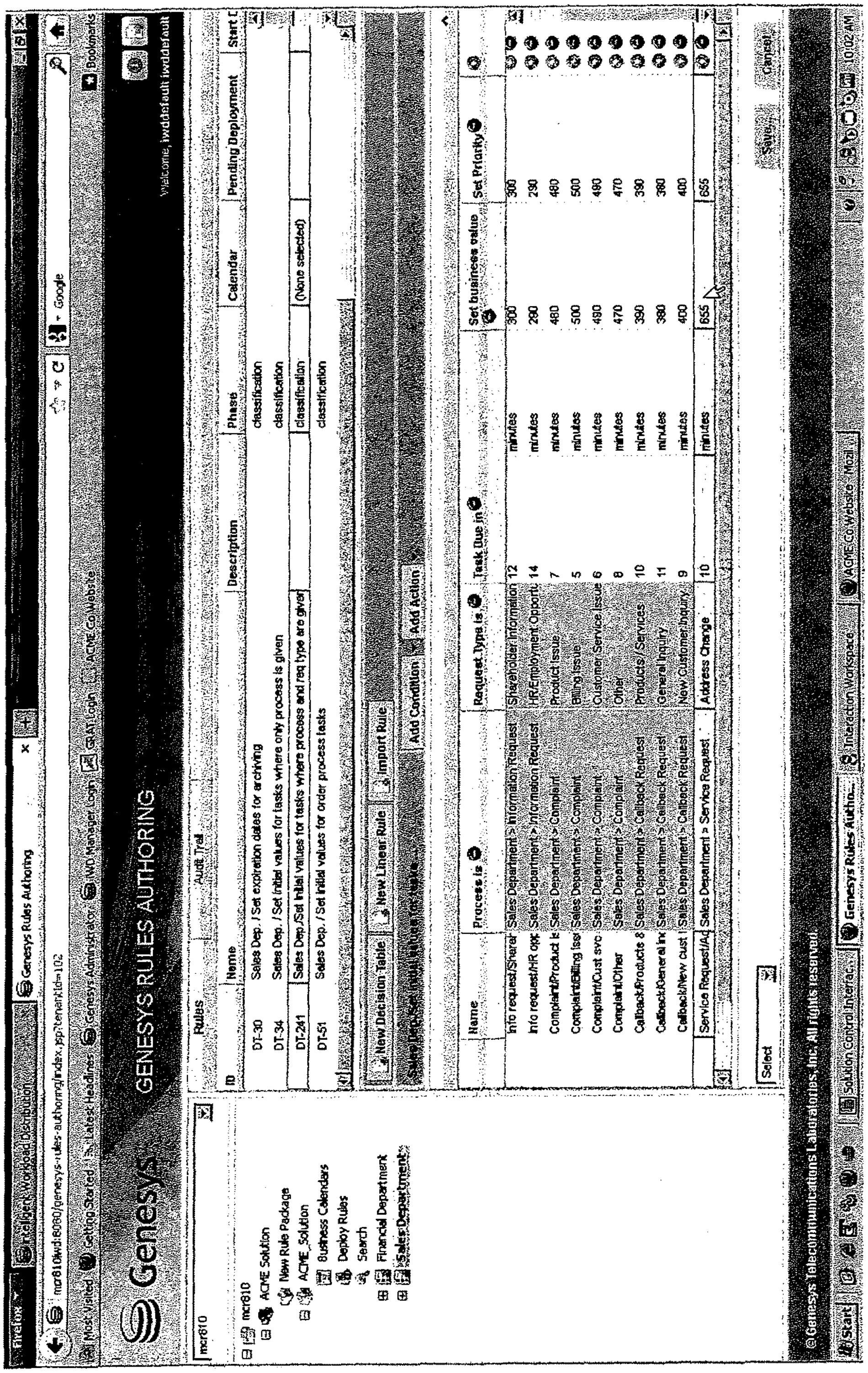

According to another aspect of the present invention, data captured from work sources can be used in rules system to prioritize, re-prioritize, and assign tasks based on skills. FIGS. 16A-16I are screen shots illustrating the use of GRS to prioritize, re-prioritize, and assign tasks based on skills according to an embodiment of the present invention. FIG. 16A is an illustration of a business rule that has been created for intelligent workflow distribution. According to an embodiment, each Web form on the enterprise's website has a Web form ID. For example, the Web form shown in FIG. 7C has a Web form ID of 4717, which is the Web form ID associated with service requests. In FIG. 16A, based on the Web form ID of 4714, the rules system determines that the type of request is a Service Request, which is a process within the Sales Department, and assigns the task to the Sales Department. When the Sales Department link is selected, as shown in FIG. 16B, another set of rules is displayed. Here, for tasks where only the business process is given, the business user can set a due date and business and priority values for the task. In FIG. 16C, where both the business process and the request type are given, the business user can set a due date and business and priority values for the task.

Figure 16D:
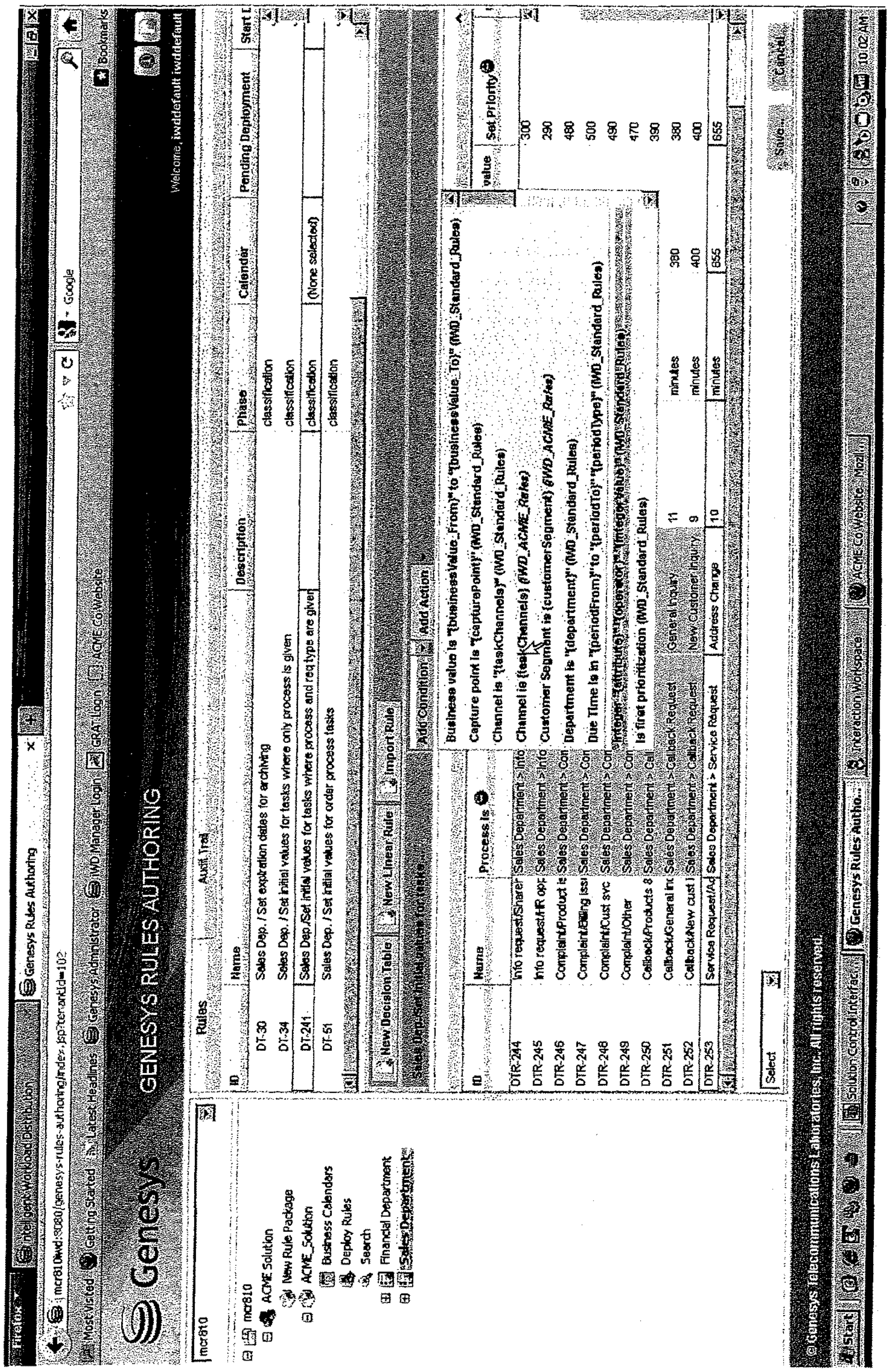
Figure 16E:
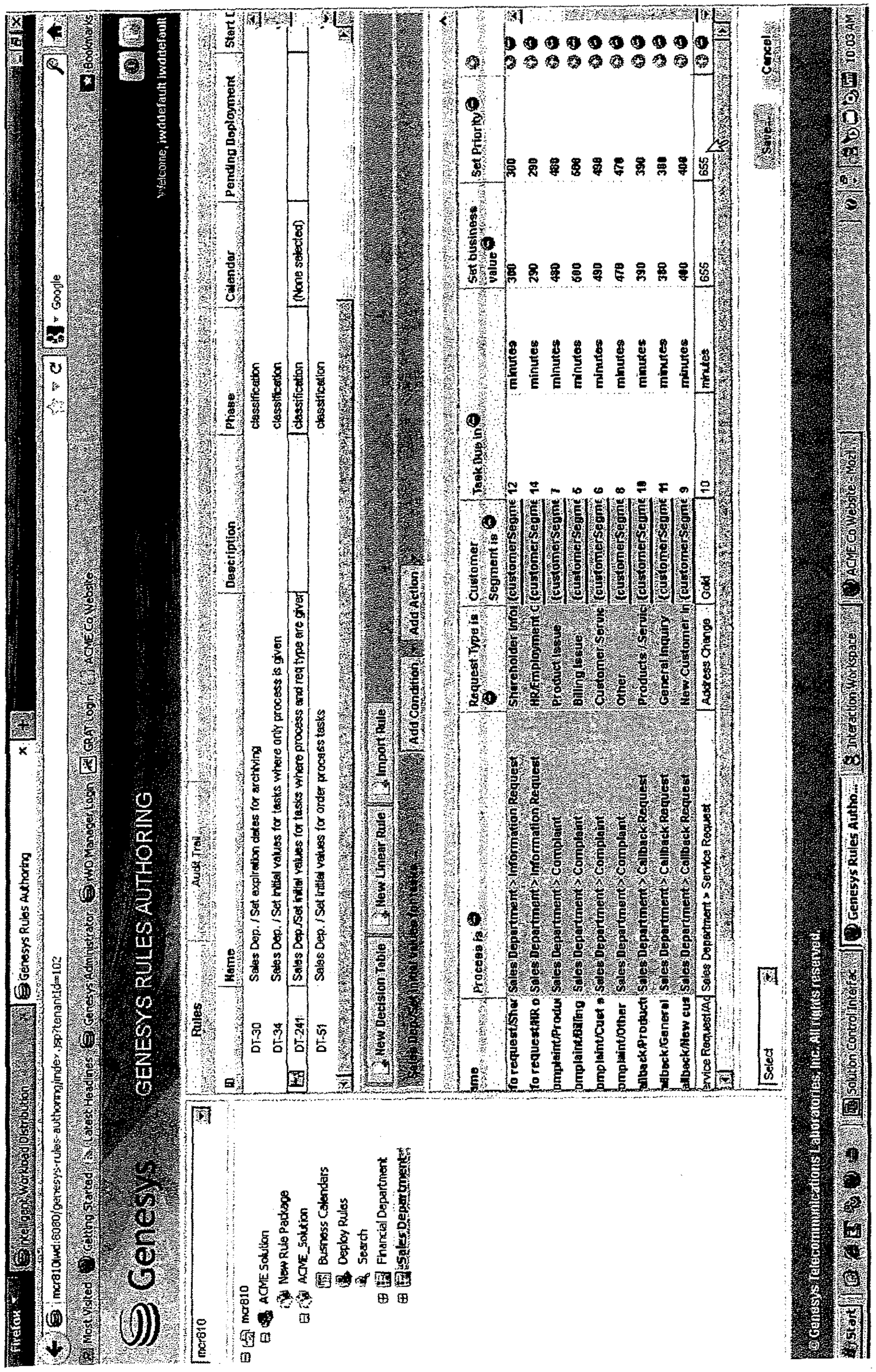
Figure 16F:
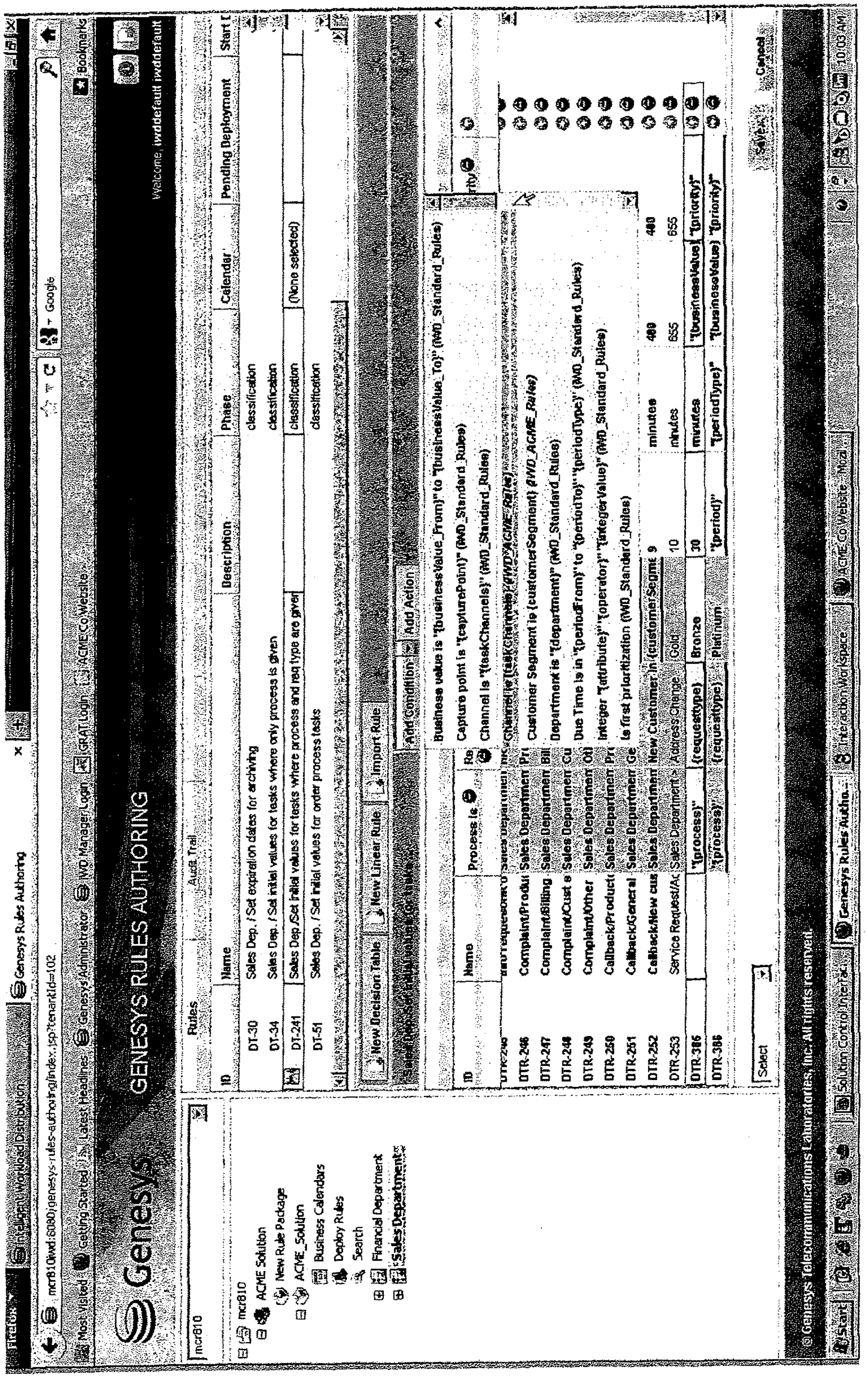
Figure 16G:
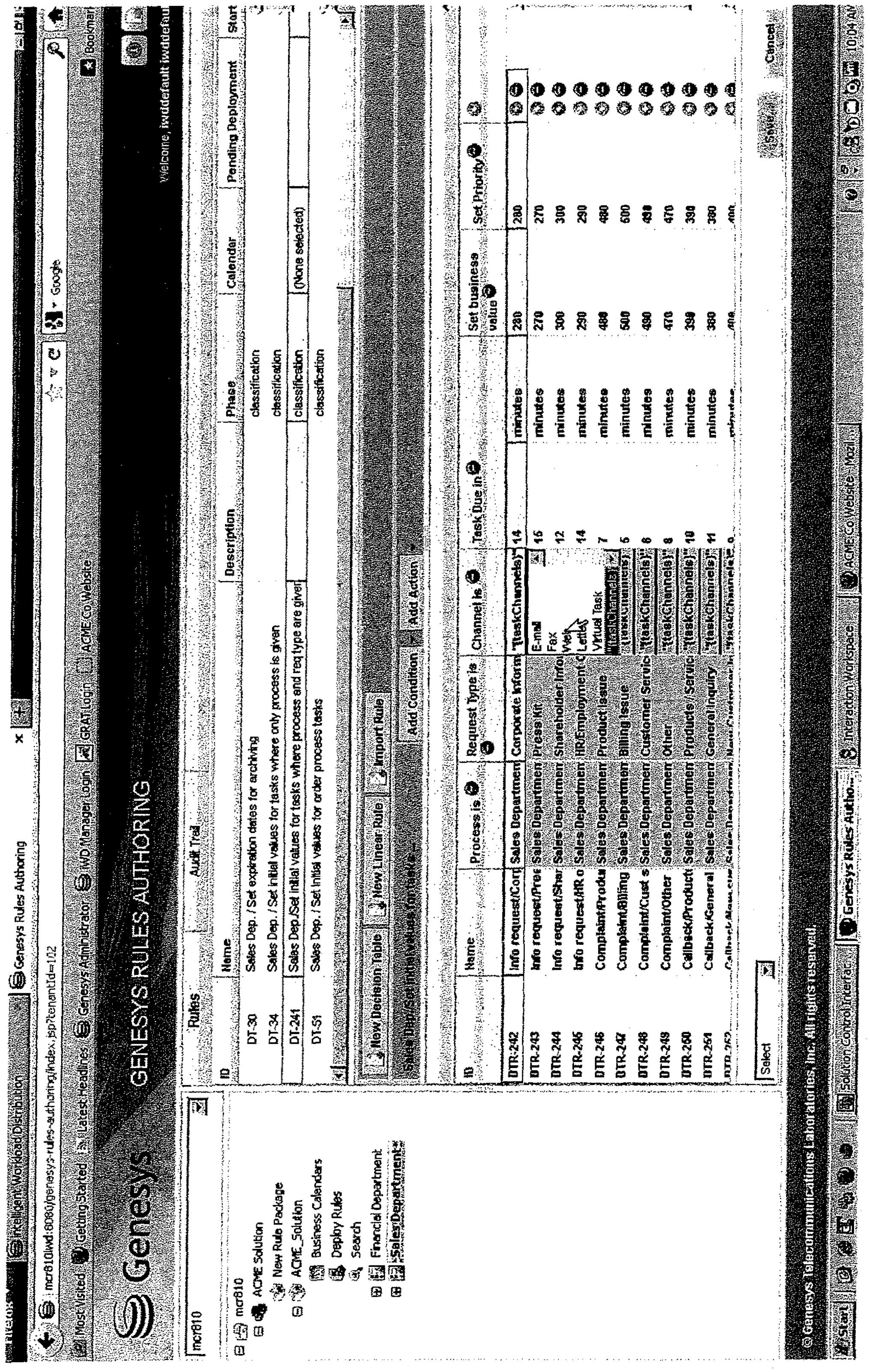
Figure 16H:
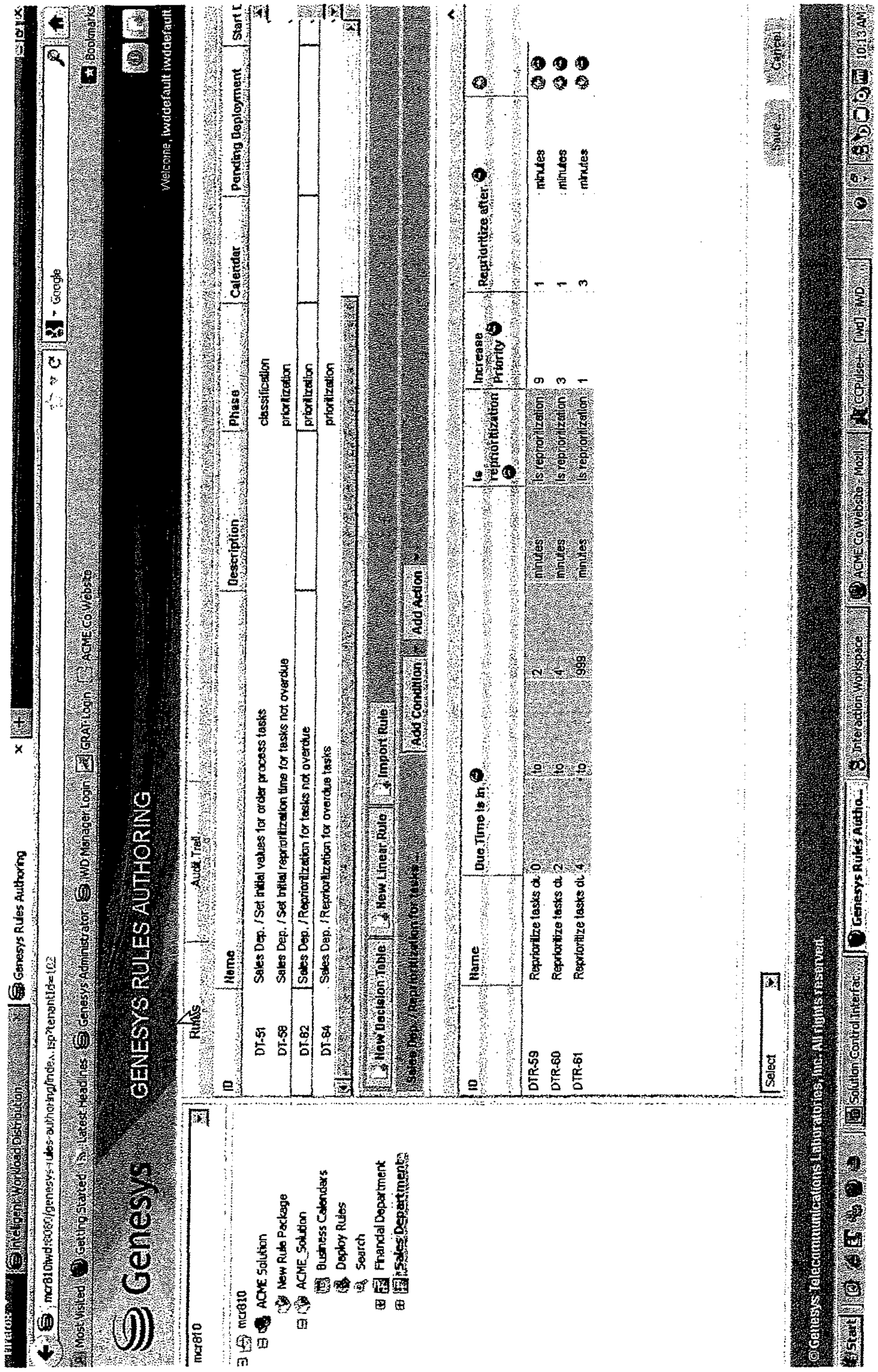

According to an aspect of the present invention, a business user can configure more rules with enhanced specificity by adding conditions to the rules. As shown in FIG. 16D, a business user may select from a drop down menu of additional conditions to add to a given rule. For example, in FIG. 16E, a business user has added the "Customer Segment" condition, such that when the business process is a Service Request in the Sales Department, the Request Type is Address Change, and the Customer Segment is Gold, the task due date is set to 10 minutes and the business and priorities values are each set to 655. Another possible condition is shown in FIG. 16F, which shows the condition of Channel being added to the rule. The Channel condition is displayed to the business user as a drop down menu of options, as shown in FIG. 16G. Accordingly, a business user may assign different due dates, business values, and priority values to tasks depending on which channel the interaction came through. For instance, a task received through e-mail may be assigned a higher priority than a task received through a letter, to encourage the use of e-mails over letters.

According to another aspect, tasks may be re-prioritized using rules system. For example, in FIG. 16H, rules for re-prioritization of tasks not overdue are shown. According to one rule, for a task due between 4 and 99 minutes, the priority is increased by 1, every 3 minutes. Therefore, the task is re-prioritized every 3 minutes. As the due date draws closer, the task may be re-prioritized more frequently.

Figure 16I:
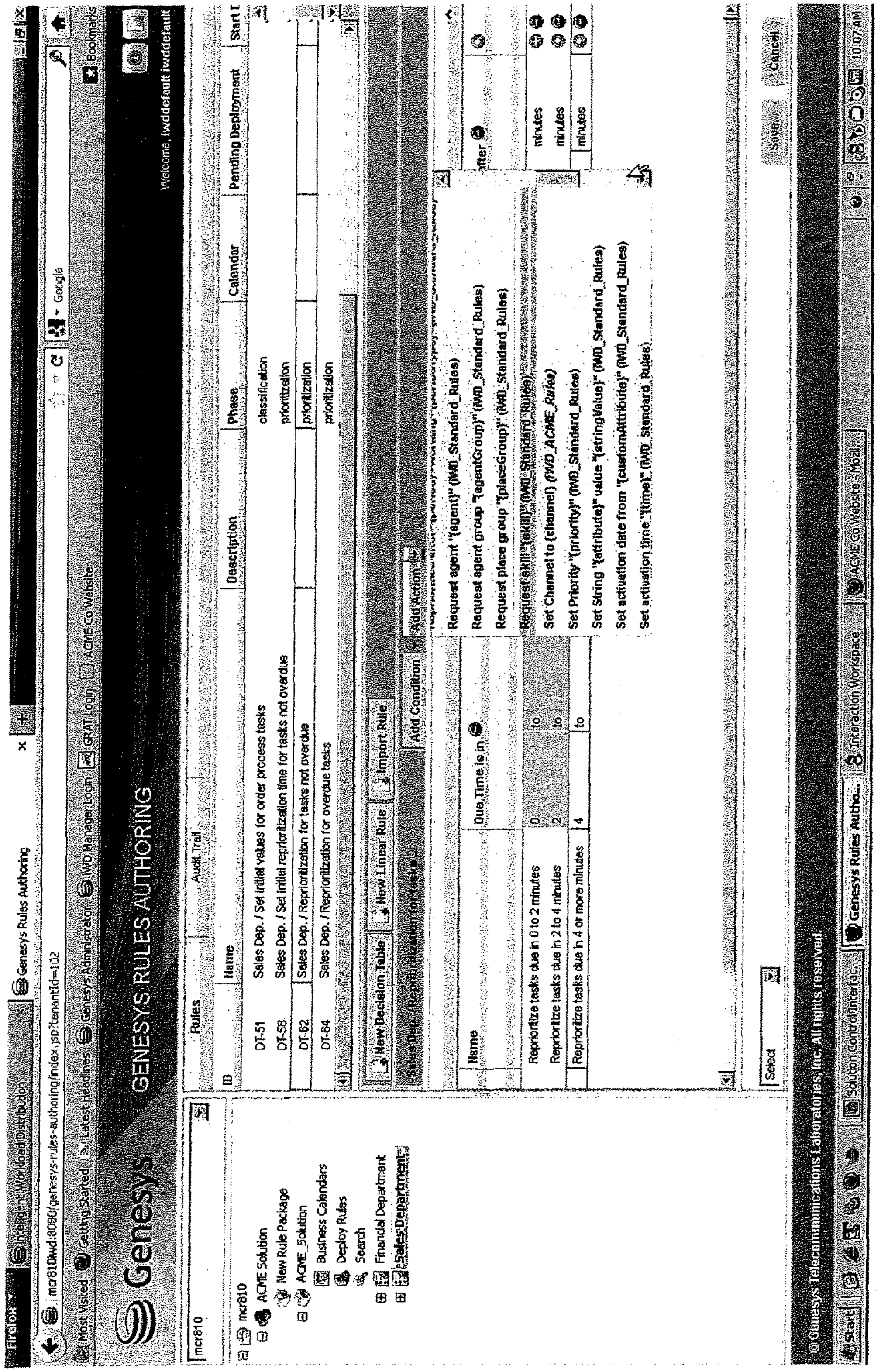

In addition, actions may be added to business rules. As shown in FIG. 16I, a business user clicks the Add Action icon and selects an action from a drop-down list. In this example, the business user specifies that the business rule determine what target skills are required to complete a task, and will request an employee with the particular skill needed (e.g., certain language spoken or certain product knowledge).

Therefore, as illustrated in FIGS. 16A-16I, the parameters and conditions of business rules may utilize data from external sources to prioritize and re-prioritize tasks and to determine what skills are needed. According to other embodiments, a business user may prioritize tasks according to the complexity of the process to complete them. For example, a task that requires three steps to complete may be assigned a higher priority than a task that requires only one step to complete.

As this invention has been described herein by way of exemplary embodiments, many modifications and variations will be apparent to those skilled in the art. Accordingly, it is to be understood that the invention described herein may be embodied other than as specifically described herein.

For example, while systems and method for distributing deferred media (such as emails, letters, faxes, social media, or internally generated tasks) were described herein, aspects of embodiments of the present invention may be extended to real-time media (such as voice calls or chat sessions).

What is claimed is:

1. A method for workload distribution for a contact center, the method comprising:

receiving, by an interaction server, a plurality of work items from a plurality of sources;

storing, by the interaction server, the plurality of work items in a first data structure maintained by the interaction server;

identifying, by the interaction server, a work item from the plurality of work items for distribution based on an assigned distribution criteria;

determining, by the interaction server, availability of at least one target capable of handling the work item;

in response to determining availability of the at least one target, transmitting, by the interaction server, a routing request for the work item to a routing server coupled to the interaction server, the routing server being separate from the interaction server and being coupled to a second data structure different from the first data structure, the interaction server removing the work item from the first data structure and storing the work item in the second data structure, wherein in response to the request, the routing server is configured to execute a routing strategy, identify a specific target for handling the work item based on the executed routing strategy, remove the work item from the second data structure, and route the work item to the identified specific target; and in response to determining that the target is not available, refraining, by the interaction server, from transmitting the routing request for the work item to the routing server and modifying, by the interaction server, the distribution criteria for the work item.

2. The method of claim 1, wherein the distribution criteria comprise at least one of a priority value, a business value, a creation date, or a due date for the work item.

3. The method of claim 1 further comprising receiving, by the interaction server, a request for the specific target, wherein the determining of the availability of the at least one target includes determining the availability of the specific target.

4. The method of claim 1, wherein the determining the availability of the at least one target includes evaluating, by the interaction server, information about occupancy, skills, or location of targets.

5. The method of claim 1, wherein the determining the availability of the at least one target comprises determining whether one or more resources associated with the at least one target and eligible to receive the work item are available.

6. The method of claim 1, wherein the determining the availability of the at least one target comprises identifying, by the interaction server, capacity of the at least one target to handle the work item.

7. The method of claim 1, wherein the interaction server and the routing server are coupled over a local area network.

8. The method of claim 1, wherein the modifying the distribution criteria includes modifying priority of the work item.

9. The method of claim 8, wherein a work item with a lower priority is not immediately selected for distribution.

10. The method of claim 1 further comprising:
- applying a first rule to the work item to obtain additional task related information, and associating the additional task related information to the work item, wherein the routing server is configured to select the specific target based on the additional task related information associated with the work item.

11. The method of claim 1, wherein the at least one target includes a group of contact center agents with skills for handling the work item.

12. A system for workload distribution for a contact center, the system comprising:
- an interaction server being configured to:
  - receive a plurality of work items from a plurality of sources;
  - store the plurality of work items in a first data structure maintained by the interaction server;
  - identify a work item from the plurality of work items for distribution based on an assigned distribution criteria;
  - determine availability of at least one target capable of handling the work item;
  - in response to determining availability of the at least one target, transmit a routing request for the work item over a data communications network, remove the work item from the first data structure, and store the work item in a second data structure different from the first data structure; and
  - in response to determining that the target is not available, refrain from transmitting the routing request for the work item to the routing server and modify the distribution criteria for the work item; and
- a routing server coupled to the interaction server over the data communications network, the routing server being separate from the interaction server and being coupled to the second data structure, wherein in response to the request, the routing server is configured to:
  - execute a routing strategy;
  - identify a specific target for handling the work item based on the executed routing strategy; and
  - remove the work item from the second data structure and route the work item to the identified specific target.

13. The system of claim 12, wherein the distribution criteria comprise at least one of a priority value, a business value, a creation date, or a due date for the work item.

14. The system of claim 12, wherein the interaction server if further configured to receive a request for the specific target, wherein the instructions that cause the processor to determine the availability of the at least one target includes instructions that cause the processor to determine the availability of the specific target.

15. The system of claim 12, wherein the determining the availability of the at least one target includes evaluating information about occupancy, skills, or location of targets.

16. The system of claim 12, wherein the determining the availability of the at least one target comprise determining whether one or more resources associated with the at least one target and eligible to receive the work item are available.

17. The system of claim 12, wherein the determining the availability of the at least one target comprises identifying capacity of the at least one target to handle the work item.

18. The system of claim 12, wherein the modifying the distribution criteria includes modifying priority of the work item.

19. The system of claim 18, wherein a work item with a lower priority is not immediately selected for distribution.

20. The system of claim 12, wherein the work item is a non telephony interaction with an end user.

* * * * *